US011503565B2

(12) United States Patent
Gao et al.

(10) Patent No.: US 11,503,565 B2
(45) Date of Patent: Nov. 15, 2022

(54) METHOD FOR TRANSMITTING PAGING MESSAGE, TERMINAL DEVICE, AND NETWORK DEVICE

(71) Applicant: Huawei Technologies Co., Ltd., Shenzhen (CN)

(72) Inventors: Kuandong Gao, Chengdu (CN); Huang Huang, Chengdu (CN); Mao Yan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 242 days.

(21) Appl. No.: 16/875,626

(22) Filed: May 15, 2020

(65) Prior Publication Data
US 2020/0280957 A1 Sep. 3, 2020

Related U.S. Application Data

(63) Continuation of application No. PCT/CN2018/111394, filed on Oct. 23, 2018.

(30) Foreign Application Priority Data

Nov. 17, 2017 (CN) .......................... 201711149121.2
Aug. 10, 2018 (CN) .......................... 201810909824.9
Aug. 20, 2018 (CN) .......................... 201810950111.7

(51) Int. Cl.
*H04W 72/04* (2009.01)
*H04W 68/00* (2009.01)
(Continued)

(52) U.S. Cl.
CPC ......... *H04W 68/005* (2013.01); *H04L 5/0094* (2013.01); *H04W 72/0446* (2013.01); *H04W 76/28* (2018.02)

(58) Field of Classification Search
CPC ........... H04W 68/005; H04W 72/0446; H04W 76/28; H04W 68/02; H04L 5/0094;
(Continued)

(56) References Cited

U.S. PATENT DOCUMENTS 10,680,699 B2 * 6/2020 Lee ...................... H04B 7/0639
2010/0248752 A1 9/2010 Yu
(Continued)

FOREIGN PATENT DOCUMENTS

CN 101060713 A 10/2007
CN 101453788 A 6/2009
(Continued)

OTHER PUBLICATIONS

NTT Docomo, "Discussion on paging design for NR", 3GPP TSG RAN WG1 Meeting #90bis, R1-1718182, Prague, Czech Republic, Oct. 9-13, 2017, 3 pages.
(Continued)

Primary Examiner — Lan-Huong Truong
(74) Attorney, Agent, or Firm — Slater Matsil, LLP

(57) ABSTRACT

This application provides a method for transmitting a paging message, a terminal device, and a network device. The method includes: determining, by a terminal device, a target paging resource, where the target paging resource includes at least one of the following types of information: position information of a target paging occasion, position information of a target paging frame, and position information of a target monitoring window; and receiving, by the terminal device, a target paging message on the target paging resource, where the target paging message is a paging message sent by a network device to the terminal device. The terminal device and the network device can be used in a communications system applying a beamforming technol-
(Continued)

ogy, so that the terminal device can receive a paging message sent by the network device to the terminal device.

25 Claims, 3 Drawing Sheets

(51) Int. Cl.
*H04W 76/28* (2018.01)
*H04L 5/00* (2006.01)

(58) Field of Classification Search
CPC ... H04L 5/0053; H04L 5/0007; H04L 5/0023; H04B 7/0617; H04B 7/0408
See application file for complete search history.

(56) References Cited

U.S. PATENT DOCUMENTS

| | | | |
|---|---|---|---|
| 2015/0215989 A1* | 7/2015 | Bangolae | H04J 3/00 370/311 |
| 2017/0303236 A1 | 10/2017 | Sun et al. | |
| 2018/0007658 A1 | 1/2018 | Shen et al. | |
| 2018/0063786 A1 | 3/2018 | Yu | |
| 2018/0098312 A1* | 4/2018 | Lin | H04L 5/0044 |
| 2018/0317180 A1 | 11/2018 | Li et al. | |
| 2018/0324750 A1 | 11/2018 | Byun et al. | |
| 2021/0385789 A1* | 12/2021 | Jung | H04L 5/0053 |

FOREIGN PATENT DOCUMENTS

| | | |
|---|---|---|
| CN | 101998257 A | 3/2011 |
| CN | 102804883 A | 11/2012 |
| CN | 103391153 A | 11/2013 |
| CN | 104936290 A | 9/2015 |
| CN | 105813199 A | 7/2016 |
| CN | 105828436 A | 8/2016 |
| CN | 106961721 A | 7/2017 |
| CN | 106961729 A | 7/2017 |
| CN | 107027091 A | 8/2017 |
| RU | 2541939 C2 | 2/2015 |
| WO | 2013177964 A1 | 12/2013 |
| WO | 2016022651 A1 | 2/2016 |
| WO | 2016107520 A1 | 7/2016 |
| WO | 2017078323 A1 | 5/2017 |

OTHER PUBLICATIONS

Huawei et al., "Finalization of NR Paging", 3GPP TSG RAN WG1 Meeting #91, R1-1719373, Reno, NV, US, Nov. 27-Dec. 1, 2017, 7 pages.
Zte et al., "Calculation of paging occasion in NR", 3GPP TSG RAN WG2 Meeting #101, R2-1802028, Athens, Greece, Feb. 26-Mar. 2, 2018, 3 pages.
RAN2, "Reply LS on Agreements on Paging", 3GPP TSG RAN WG1 Meeting #94, R1-1808028, Gothenburg, Sweden, Aug. 20-24, 2018, 2 pages.
Huawei et al., "Finalization of NR Paging," 3GPP TSG RAN WG1 Meeting 90bis, R1-1717052, Prague, Czech Republic, Oct. 9-13, 2017, 5 pages.
Huawei et al., "Offline summary for AI 7.1.3 on Paging for NR," 3GPP TSG RAN WG1 Meeting 90bis,R1-1718771, Prague, Czech Republic, Oct. 9-13, 2017, 5 pages.
Mediatek, "Further discussion on paging design," 3GPP TSG RAN WG1 Meeting 90bis, R1-1718332, Prague, Czech Republic, Oct. 9-13, 2017, 9 pages.
3rd Generation Partnership Project; Technical Specification Group Radio Access Network; NR; Physical layer procedures for control (Release 15), 3GPP TS 38.213 V1.0.0 (Sep. 2017), 16 pages.
NTT Docomo, Inc., "Discussion on paging design for NR," 3GPP TSG RAN WG1 Meeting #90, R1-1713901, Prague, Czech Republic, Aug. 21-25, 2017, 6 pages.
3rd Generation Partnership Project; Technical Specification Group Radio Access Network; New Generation Radio Access Network; User Equipment (UE) procedures in Idle mode (Release 15), 3GPP TS 38.304 v0.0.6 (Nov. 2017) 12 pages.
Intel Corp., "Scheduling and UCI feedback for carrier aggregation," 3GPP TSG-RAN WG1 #90, R1-1712603, Prague, Czech Republic, Aug. 21-25, 2017, 5 pages.
Xiaomi, "Discussion on NR paging design," 3GPP TSG RAN WG1 NR AH meeting, R1-1700865, Reno, NV, USA, Jan. 16-20, 2017, 3 pages.

* cited by examiner

| 0 | 1 | 2 | 3 | 4 | 5 | 6 | 7 | 8 | 9 |
FIG. 1
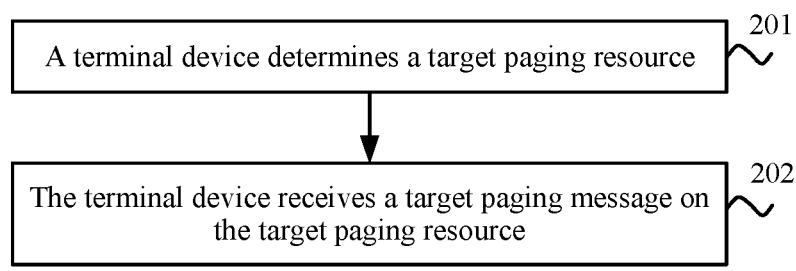
FIG. 2
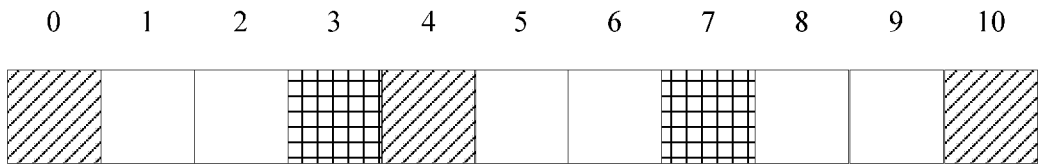
FIG. 3
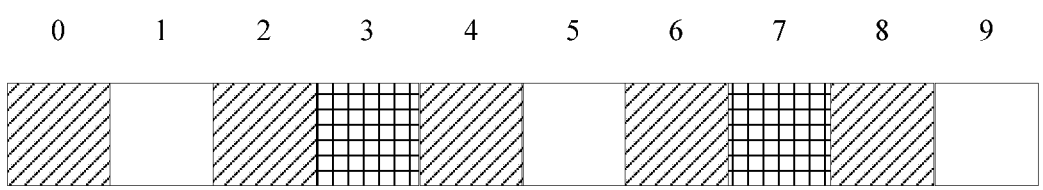
FIG. 4
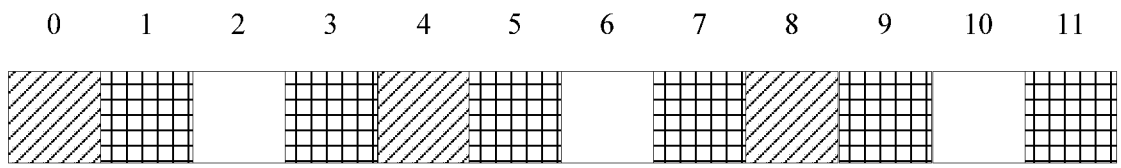
FIG. 5

METHOD FOR TRANSMITTING PAGING MESSAGE, TERMINAL DEVICE, AND NETWORK DEVICE

CROSS-REFERENCE TO RELATED APPLICATIONS

This application is a continuation of International Application No. PCT/CN2018/111394, filed on Oct. 23, 2018, which claims priority to Chinese Patent Application No. 201711149121.2, filed on Nov. 17, 2017, Chinese Patent Application No. 201810909824.9 filed on Aug. 10, 2018, and Chinese Patent Application No. 201810950111.7, filed on Aug. 20, 2018, The disclosures of the aforementioned applications are hereby incorporated by reference in their entireties.

TECHNICAL FIELD

This application relates to the communications field, and more specifically, to a method for transmitting a paging message, a terminal device, and a network device.

BACKGROUND

A network device may send paging to a terminal device that is in idle mode or connected mode. A purpose of paging may be: sending paging information to the terminal device that is in idle mode, notifying the terminal device that is in idle mode or connected mode that system information changes, instructing the terminal device to receive earthquake and tsunami warning system (ETWS) information or commercial mobile alert service (CMAS) information, or the like. For ease of description, in embodiments of this application, all information sent in a paging manner is collectively referred to as paging information, and a message carrying the paging information is referred to as a paging message.

In a long term evolution (LTE) system, one frame may include a maximum of four paging occasions, each paging occasion is a subframe, and each paging occasion is used to send a paging message. Positions of the four paging occasions are respectively subframe 0, subframe 4, subframe 5, and subframe 9.

In a future wireless communications system, a beamforming technology is used to confine energy of a transmitted signal in a beam direction to improve efficiency of signal reception. The beamforming technology can effectively expand a transmission range of a radio signal, and reduce signal interference, thereby achieving higher communication efficiency and obtaining a larger network capacity.

A network device in a system applying the beamforming technology may provide a plurality of beams simultaneously. Therefore, the network device needs to send a plurality of paging messages within a paging occasion, so that terminal devices located in different beams can receive corresponding paging messages.

Therefore, a problem urgently to be resolved is to determine time domain resources on which paging messages are transmitted in the system applying the beamforming technology.

SUMMARY

This application provides a method for transmitting a paging message, a terminal device, and a network device, so that in a communications system applying a beamforming technology, a terminal device can receive a paging message sent by a network device to the terminal device.

According to a first aspect, an embodiment of this application provides a method for transmitting a paging message, where the method includes: determining, by a terminal device, a target paging resource, where the target paging resource includes at least one of the following types of information: position information of a target paging occasion, position information of a target paging frame, and position information of a target monitoring window; and receiving, by the terminal device, a target paging message on the target paging resource, where the target paging message is a paging message sent by a network device to the terminal device.

With reference to the first aspect, in a first possible implementation of the first aspect, the target paging resource includes the position information of the target paging occasion, the paging frame includes N paging occasions, the N paging occasions are located on M time domain resources, and the target paging occasion is one of the N target paging occasions, where N is a positive integer greater than or equal to 1, and M is a positive integer greater than or equal to 1 and less than or equal to N; and a position of the target paging occasion in the paging frame is related to at least one of a subcarrier spacing, a time domain position of a synchronization signal block actually sent by the network device, and a time domain position of a candidate synchronization signal block.

With reference to the first possible implementation of the first aspect, in a second possible implementation of the first aspect, the determining, by a terminal device, a target paging resource includes: determining, by the terminal device, the position of the target paging occasion in the paging frame based on a value of M.

With reference to the second possible implementation of the first aspect, in a third possible implementation of the first aspect, a time domain position or start position of the target paging occasion in the paging frame is at least one of the following: time domain unit 0 in the paging frame, time domain unit $K_1/2$ in the paging frame, a time domain unit for receiving a synchronization signal block in the paging frame by the terminal device, a time domain unit next to a time domain unit for receiving a last synchronization signal block in the paging frame by the terminal device, time domain unit $K_2/4$ in the paging frame, time domain unit $3 \times K_2/4$ in the paging frame, time domain unit 3 in the paging frame, time domain unit 5 in the paging frame, and time domain unit 8 in the paging frame, where $K_1$ and $K_2$ are positive integers that are greater than 2 and can be exactly divided by 2.

With reference to the third possible implementation of the first aspect, in a fourth possible implementation of the first aspect, values of $K_1$ and $K_2$ are quantities of time domain units included in one paging frame.

With reference to the first possible implementation of the first aspect, in a fifth possible implementation of the first aspect, the method further includes: receiving, by the terminal device, paging position information sent by the network device, where the paging position information is used to indicate a time domain position of the target paging occasion in the paging frame; and the determining, by a terminal device, a target paging resource includes: determining, by the terminal device, a start position and duration of the target paging occasion in the paging frame based on the paging position information.

With reference to the fifth possible implementation of the first aspect, in a sixth possible implementation of the first aspect, the paging position information includes at least one of a start position of the first one of the M time domain resources in the paging frame and duration of the M time domain resources; or the paging position information includes at least one of a start position and duration of the target paging occasion in the paging frame; or the paging position information includes a time domain position of each of the M time domain resources in the paging frame; or the paging position information includes a paging position index, where the paging position index is used to indicate a time domain resource of each of the M time domain resources in the paging frame or a time domain position of the target paging occasion in the paging frame.

With reference to any one of the first possible implementation of the first aspect to the sixth possible implementation of the first aspect, in a seventh possible implementation of the first aspect, when M is a positive integer greater than 1, the M time domain resources are M consecutive time domain resources or M inconsecutive time domain resources.

With reference to any one of the first aspect or the foregoing possible implementations of the first aspect, in an eighth possible implementation of the first aspect, the target paging resource includes the position information of the target paging frame, and the position information of the target paging frame includes a frame number of the target paging frame; and the determining, by a terminal device, a target paging resource includes: determining, by the terminal device, the frame number of the target paging frame based on a paging frame offset.

With reference to the eighth possible implementation of the first aspect, in a ninth possible implementation of the first aspect, the paging frame offset is related to at least one of the following: a period of a synchronization signal block, the time domain position of the synchronization signal block actually sent by the network device, and the time domain position of the candidate synchronization signal block.

With reference to the eighth possible implementation of the first aspect or the ninth possible implementation of the first aspect, in a tenth possible implementation of the first aspect, the determining, by the terminal device, the frame number of the target paging frame based on a paging frame offset includes: determining, by the terminal device, the frame number of the target paging frame based on a discontinuous reception DRX cycle, a quantity of paging occasions included in the DRX cycle, identification information of the terminal device, and the paging frame offset.

With reference to any one of the first aspect or the foregoing possible implementations of the first aspect, in an eleventh possible implementation of the first aspect, the target paging resource includes the position information of the target monitoring window, and the position information of the target monitoring window is a start position of the target monitoring window, where one paging occasion includes Q monitoring windows, the target monitoring window is one of the Q monitoring windows, and Q is a positive integer greater than or equal to 1; and the determining, by a terminal device, a target paging resource includes: determining, by the terminal device, the start position of the target monitoring window based on a monitoring window offset.

With reference to the eleventh possible implementation of the first aspect, in a twelfth possible implementation of the first aspect, before the determining, by the terminal device, the start position of the target monitoring window based on a monitoring window offset, the method further includes: determining, by the terminal device, that the target monitoring window is located in the $$\left\lceil \frac{Q_d}{Q_{max}} \right\rceil_{th}$$

paging frame, where Qmax denotes a maximum quantity of monitoring windows included in a paging frame, $\lceil \; \rceil$ denotes a round-up operation, and $Q_d$ denotes an index of the target monitoring window.

With reference to the twelfth possible implementation of the first aspect, in a thirteenth possible implementation of the first aspect, $Q_{max}$ is determined based on at least one of duration of each of the Q monitoring windows, a quantity of synchronization signals blocks, a quantity of paging messages, and the subcarrier spacing; or $Q_{max}$ is a preset value; or $Q_{max}$ is determined based on an indication of the network device.

With reference to any one of the tenth possible implementation of the first aspect to the thirteenth possible implementation of the first aspect, in a fourteenth possible implementation of the first aspect, time domain resources occupied by the Q monitoring windows are consecutive time domain resources or inconsecutive time domain resources.

According to a second aspect, an embodiment of this application provides a method for transmitting a paging message, where the method includes: determining, by a network device, a paging resource, where the paging resource includes at least one of the following types of information: position information of N paging occasions, position information of a paging frame, and position information of a monitoring window; and sending, by the network device, a paging message in the paging resource to a terminal device.

With reference to the second aspect, in a first possible implementation of the second aspect, the paging resource includes the position information of the N paging occasions, and the N paging occasions are located on M time domain resources, where N is a positive integer greater than or equal to 1, M is a positive integer greater than or equal to 1 and less than or equal to N, and a position of each of the M time domain resources in the paging frame is related to at least one of a subcarrier spacing, a time domain position of a synchronization signal block actually sent by the network device, and a time domain position of a candidate synchronization signal block.

With reference to the first possible implementation of the second aspect, in a second possible implementation of the second aspect, the determining, by a network device, a paging resource includes: determining, by the network device, the position of each of the M time domain resources in the paging frame based on a value of M.

With reference to the second possible implementation of the second aspect, in a third possible implementation of the second aspect, a time domain position or start position of one of the M time domain resources in the paging frame is time domain unit 0 in the paging frame, time domain unit $K_1/2$ in the paging frame, a time domain unit for receiving a synchronization signal block in the paging frame by the terminal device, a time domain unit next to a time domain unit for receiving a last synchronization signal block in the paging frame by the terminal device, time domain unit $K_2/4$ in the paging frame, time domain unit $3 \times K_2/4$ in the paging frame, time domain unit 3 in the paging frame, time domain unit 5 in the paging frame, or time domain unit 8 in the paging frame, where $K_1$ and $K_2$ are positive integers that are greater than 2 and can be exactly divided by 2.

With reference to the second possible implementation of the second aspect, in a fourth possible implementation of the second aspect, a time domain position or start position of each of the M time domain resources in the paging frame includes: when M is equal to 1, time domain positions or start positions of the M time domain resources in the paging frame are at least one of the following time domain units: time domain unit 0 in the paging frame, time domain unit $K_1/2$ in the paging frame, a time domain unit for sending a synchronization signal block in the paging frame by the network device, and a time domain unit next to a time domain unit for sending a last synchronization signal block in the paging frame by the network device, where $K_1$ is a positive integer and can be exactly divided by 2; or when M is equal to 2, a time domain position or start position of the first one of the M time domain resources in the paging frame is time domain unit 0 in the paging frame, and a time domain position or start position of the second one of the M time domain resources in the paging frame is time domain unit $K_2/2$ in the paging frame, where $K_2$ is a positive integer that is greater than 2 and can be exactly divided by 2; or when M is equal to 4, a time domain position or start position of the first one of the M time domain resources in the paging frame is time domain unit 0 in the paging frame, a time domain position or start position of the second one of the M time domain resources in the paging frame is time domain unit $K_2/4$ in the paging frame, a time domain position or start position of the third one of the M time domain resources in the paging frame is time domain unit $K_2/2$ in the paging frame, and a time domain position or start position of the fourth one of the M time domain resources is time domain unit $3 \times K_2/4$ in the paging frame; or when M is equal to 4 and the paging frame includes to time domain units, a time domain position or start position of the first one of the M time domain resources in the paging frame is time domain unit 0 in the paging frame, a time domain position or start position of the second one of the M time domain resources in the paging frame is time domain unit 3 in the paging frame, a time domain position or start position of the third one of the M time domain resources in the paging frame is time domain unit 5 in the paging frame, and a time domain position or start position of the fourth one of the M time domain resources is time domain unit 8 in the paging frame.

With reference to the third possible implementation or the fourth possible implementation of the second aspect, in a fifth possible implementation of the second aspect, values of $K_1$ and $K_2$ are quantities of time domain units included in one paging frame.

With reference to any one of the first possible implementation of the second aspect to the fifth possible implementation of the second aspect, in a sixth possible implementation of the second aspect, the method further includes: sending, by the network device, paging position information to the terminal device, where the paging position information is used to indicate start positions of the M time domain resources in the paging frame.

With reference to the sixth possible implementation of the second aspect, in a seventh possible implementation of the second aspect, the paging position information includes at least one of the start position of the first one of the M time domain resources in the paging frame and duration of the M time domain resources; or the paging position information includes at least one of a start position and duration of a paging occasion of the terminal device in the paging frame; or the paging position information includes the time domain position of each of the M time domain resources in the paging frame; or the paging position information includes a paging position index, where the paging position index is used to indicate the time domain position of each of the M time domain resources in the paging frame or a time domain position of a paging occasion of the terminal device in the paging frame.

With reference to any one of the first possible implementation of the second aspect to the seventh possible implementation of the second aspect, in an eighth possible implementation of the second aspect, when M is a positive integer greater than 1, the M time domain resources are M consecutive time domain resources or M inconsecutive time domain resources.

With reference to any one of the second aspect or the foregoing possible implementations of the second aspect, in a ninth possible implementation of the second aspect, the paging resource includes the position information of the paging frame, and the position information of the paging frame includes a frame number of the paging frame; and the determining, by a network device, a paging resource includes: determining, by the network device, the frame number of the paging frame based on a paging frame offset.

With reference to the ninth possible implementation of the second aspect, in a tenth possible implementation of the second aspect, the paging frame offset is related to at least one of the following: a period of a synchronization signal block, the time domain position of the synchronization signal block actually sent by the network device, and the time domain position of the candidate synchronization signal block.

With reference to the ninth possible implementation of the second aspect or the tenth possible implementation of the second aspect, in an eleventh possible implementation of the second aspect, the determining, by the network device, the frame number of the paging frame based on a paging frame offset includes: determining, by the network device, the frame number of the paging frame based on a discontinuous reception DRX cycle, a quantity of paging occasions included in the DRX cycle, identification information of the terminal device, and the paging frame offset.

With reference to any one of the second aspect or the foregoing possible implementations of the second aspect, in a twelfth possible implementation of the second aspect, the paging resource includes the position information of the monitoring window, and the position information of the monitoring window includes a start position of each of Q monitoring windows, where one paging occasion includes the Q monitoring windows, and Q is a positive integer greater than or equal to 1; and the determining, by a network device, a paging resource includes: determining, by the network device, the start position of each of the Q monitoring windows based on a monitoring window offset.

With reference to the twelfth possible implementation of the second aspect, in a thirteenth possible implementation of the second aspect, before the determining, by the network device, the start position of each of the Q monitoring windows based on a monitoring window offset, the method further includes: determining, by the network device, that the $q^{th}$ monitoring window in the Q monitoring windows is located in the $$\left\lceil \frac{q}{Q_{max}} \right\rceil_{th}$$

paging frame, where $Q_{max}$ denotes a maximum quantity of monitoring windows included in a paging frame, ⌈ ⌉ denotes a round-up operation, and q=1, . . . , Q.

With reference to the thirteenth possible implementation of the second aspect, in a fourteenth possible implementation of the second aspect, $Q_{max}$ is determined based on at least one of duration of each of the Q monitoring windows, a quantity of synchronization signal blocks, a quantity of paging messages, and the subcarrier spacing; or $Q_{max}$ is a preset value.

With reference to any one of the twelfth possible implementation of the second aspect to the fourteenth possible implementation of the second aspect, in a fifteenth possible implementation of the second aspect, time domain resources occupied by the Q monitoring windows are consecutive time domain resources or inconsecutive time domain resources.

According to a third aspect, an embodiment of this application further provides a terminal device, where the terminal device includes units for implementing any one of the first aspect or the foregoing possible implementations of the first aspect.

According to a fourth aspect, an embodiment of this application further provides a network device, where the network device includes units for implementing any one of the second aspect or the foregoing possible implementations of the second aspect.

According to a fifth aspect, an embodiment of this application provides a terminal device, where the terminal device includes: a memory, configured to store a program; and a processor, configured to execute the program stored in the memory, where when the program is executed, the processor is configured to perform the method in any one of the first aspect or the foregoing possible implementations of the first aspect. Optionally, the terminal device is a chip or an integrated circuit.

According to a sixth aspect, an embodiment of this application provides a network device, where the network device includes: a memory, configured to store a program; and a processor, configured to execute the program stored in the memory, where when the program is executed, the processor is configured to perform the method in any one of the second aspect or the foregoing possible implementations of the second aspect. Optionally, the network device is a chip or an integrated circuit.

According to a seventh aspect, an embodiment of this application provides a chip configured to perform the method in any one of the first aspect or the foregoing possible implementations of the first aspect.

According to an eighth aspect, an embodiment of this application provides a chip configured to perform the method in any one of the second aspect or the foregoing possible implementations of the second aspect.

According to a ninth aspect, an embodiment of this application provides a computer-readable storage medium, where the computer-readable storage medium stores an instruction, and when the instruction is run on a computer, the computer is enabled to perform the method in each of the foregoing aspects.

According to a tenth aspect, an embodiment of this application provides a computer program product including an instruction, where when the computer program product is run on a computer, the computer is enabled to perform the method in each of the foregoing aspects.

BRIEF DESCRIPTION OF THE DRAWINGS

FIG. 1 is a schematic diagram of a paging occasion in a long term evolution system;

FIG. 2 is a schematic flowchart of a method for transmitting a paging message according to an embodiment of this application;

FIG. 3 is a schematic diagram of a paging frame offset according to an embodiment of this application;

FIG. 4 is a schematic diagram of another paging frame offset according to an embodiment of this application;

FIG. 5 is a schematic diagram of another paging frame offset according to an embodiment of this application;

DETAILED DESCRIPTION OF ILLUSTRATIVE EMBODIMENTS

Figure 6:
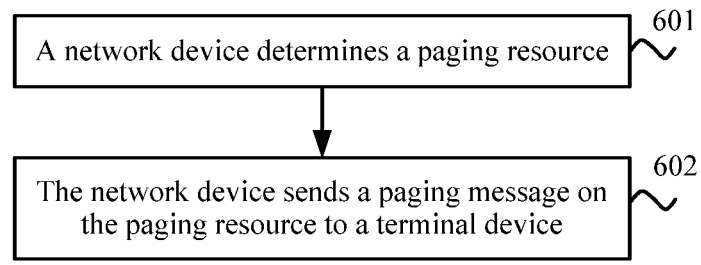
FIG. 6 is a schematic flowchart of another method for transmitting a paging message according to an embodiment of this application.

The following describes technical solutions of this application with reference to accompanying drawings.

It should be understood that, the technical solutions in embodiments of this application may be applied to various communications systems applying a beamforming technology, for example, a 5G communications system, or new radio (NR).

A terminal device in the technical solutions in the embodiments of this application is a device having a communication function, and may include a handheld device having a wireless communication function, a vehicle-mounted device, a wearable device, a computing device, another processing device connected to a wireless modem, or the like. In different networks, a terminal may have different names, for example, an access terminal, user equipment (UE), a subscriber unit, a subscriber station, a mobile station, a remote station, a remote terminal, a mobile device, a user terminal, a terminal, a wireless communications device, a user agent, a user apparatus, a handheld device having a wireless communication function, a computing device, another processing device connected to a wireless modem, a vehicle-mounted device, a wearable device, or a terminal device in a future 5G network. The terminal device may communicate with one or more core networks through a radio access network (RAN), or may access a distributed network in a self-organizing or grant-free manner. The terminal device may further access a wireless network in another manner to perform communication, or the terminal device may directly perform wireless communication with another terminal device. This is not limited in the embodiments of this application.

A network device in the embodiments of this application is a device deployed in a radio access network and configured to provide a wireless communication function. In different radio access systems, a base station may have different names. For example, a base station in a universal mobile telecommunications system (UMTS) network is referred to as a NodeB, but a base station in an LTE network is referred to as an evolved NodeB (eNB or eNodeB), and a base station in a new radio (NR) network is referred to as a transmission reception point (TRP) or a next generation NodeB (gNB), or a base station in another network integrating a plurality of technologies or a base station in other various evolved networks may have other names. The present invention is not limited thereto.

A synchronization signal block (SSB) in the embodiments of this application may also be referred to as a physical broadcast channel (PBCH) block. A synchronization signal (SS) burst set may also be referred to as a PBCH burst set. One synchronization signal burst set may include one or more SSBs. One synchronization signal burst set needs to be completely transmitted within 5 ms.

A paging message in the embodiments of this application may be a downlink control channel (for example, a physical downlink control channel (PDCCH)) of the paging message, a downlink shared channel (for example, a physical downlink shared channel (PDSCH)) of the paging message, a control resource set (CORESET) of the paging message, downlink control information (DCI) of the paging message, or data information of the paging message.

A start position of a paging occasion (PO) in the embodiments of this application may also be a first time domain unit of a time domain resource. A start position of the paging message may also be a start position of the control resource set (CORESET) of the paging message, or may be a start position of the downlink control channel (for example, the PDCCH) of the paging message, or may be a start position of the downlink shared channel (for example, the PDSCH) of the paging message, or may be a start position of the DCI of the paging message, or may be a start position of the data information of the paging message. The start position of the PO may also be a time domain position of the PO or a time domain position of the time domain resource. A time domain position of the paging message may also be a time domain position of the control resource set (CORESET) of the paging message, or may be a time domain position of the downlink control channel (for example, the PDCCH) of the paging message, or may be a time domain position of the downlink shared channel (for example, the PDSCH) of the paging message, or may be a time domain position of the DCI of the paging message, or may be a time domain position of the data information of the paging message. Unless otherwise specified, all positions in the embodiments of this application are time domain positions.

A monitoring window in the embodiments of this application may also be referred to as a window for monitoring (Monitor) the paging message, a window for detecting the paging message, a window for monitoring the CORESET of the paging message, a window for monitoring the DCI of the paging message, a window for monitoring the PDCCH of the paging message, a window for monitoring the PDSCH of the paging message, or the like. One monitoring window may include a plurality of slots, or a plurality of symbols, or a plurality of subframes. An association relationship exists between each monitoring window and an SSB.

It should be noted that, in the embodiments of this application, information (for example, paging position information, a half-frame indication, or $Q_{max}$) sent by the network device to the terminal device may be carried in any one of the following messages: a master information block (MIB), remaining minimum system information (RMSI), a new radio system information block NR-SIB1, an NR-SIB2, system information, downlink control information (DCI), radio resource control (RRC) signaling, and a media access control-control element (MAC-CE).

Quasi co-location (QCL): Optionally, quasi co-location indicates that at least one of the following parameters is the same or has a determined correspondence: an angle of arrival (AoA), a dominant angle of arrival AoA, an average angle of arrival, a power angular spectrum of an angle of arrival (PAS of AoA), an angle of departure (AoD), a dominant angle of departure, an average angle of departure, a power angular spectrum of an angle of departure, terminal transmit beamforming, terminal receive beamforming, spatial channel correlation, base station transmit beamforming, base station receive beamforming, an average channel gain, an average channel delay, delay spread, Doppler spread, and the like.

Same downlink signals/base station beams/terminal beams have a same spatial receiving parameter and/or antenna port. For example, at least one of the following parameters is the same or has a determined correspondence: an angle of arrival, a dominant angle of arrival, an average angle of arrival, a power angular spectrum of an angle of arrival, an angle of departure, a dominant angle of departure, an average angle of departure, a power angular spectrum of an angle of departure, terminal transmit beamforming, terminal receive beamforming, spatial channel correlation, base station transmit beamforming, base station receive beamforming, an average channel gain, an average channel delay, delay spread, Doppler spread, and the like.

An association relationship in the embodiments of this application and an association relationship between a paging message and an SSB in the embodiments of this application may be QCL relationships, or may be relationships of having a same beam, or relationships of having a same antenna port.

FIG. 1 is a schematic diagram of a paging occasion in a long term evolution (LTE) system. A paging frame in the LTE system may include four paging occasions. A length of a time domain resource occupied by each paging occasion is one subframe. As shown in FIG. 1, distribution of positions of the four paging occasions is: subframe 0, subframe 4, subframe 5, and subframe 9. To be specific, a network device may send a paging message in each of the subframe 0, the subframe 4, the subframe 5, and the subframe 9. A terminal device may perform monitoring in the four subframes to obtain a paging message corresponding to the terminal device.

In a future wireless communications system, a beamforming technology is used to confine energy of a transmitted signal in a beam direction to improve efficiency of signal reception. The beamforming technology can effectively expand a transmission range of a radio signal, and reduce signal interference, thereby achieving higher communication efficiency and obtaining a larger network capacity.

A network device in a system applying the beamforming technology may provide a plurality of beams simultaneously. Therefore, the network device needs to send a plurality of paging messages within a paging occasion, so that terminal devices located in different beams can receive corresponding paging messages. The plurality of paging messages within the paging occasion has consecutive time domain units, where each time domain unit is used to send a paging message. The time domain unit may be a subframe.

For example, assuming that the network device may provide two beams simultaneously, within a paging occasion, the network device uses two consecutive subframes to send two paging messages. Apparently, a position of the paging occasion in the LTE system and a quantity of subframes included in each paging occasion are not suitable for sending a paging message in a system applying the beamforming technology.

FIG. 2 is a schematic flowchart of a method for transmitting a paging message according to an embodiment of this application.

201. A terminal device determines a target paging resource, where the target paging resource includes at least one of the following types of information: position information of a target paging occasion, position information of a target paging frame, and position information of a target monitoring window.

202. The terminal device receives a target paging message on the target paging resource, where the target paging message is a paging message sent by a network device to the terminal device.

FIG. 2 provides a method for receiving a paging message by the terminal device in a communications system applying a beamforming technology.

The network device may send the paging message to the terminal device in a broadcast manner, or may directly send the paging message to the terminal device. This is not limited in this embodiment of this application.

Optionally, in some embodiments, the target paging resource includes the position information of the target paging occasion, the position information of the target paging occasion is a start position of the target paging occasion in the paging frame, the paging frame includes N paging occasions, the N paging occasions are located on M time domain resources, and the target paging occasion is one of the N paging occasions, where N is a positive integer greater than or equal to 1, and M is a positive integer greater than or equal to 1 and less than or equal to N.

When M is equal to N, each PO is located on a time domain resource. For example, N=M=4. A PO 1 may be located on the first time domain resource, a PO 2 may be located on the second time domain resource, a PO 3 may be located on the third time domain resource, and a PO 4 may be located on the fourth time domain resource.

When M is less than N, at least two POs use one time domain resource in a frequency division multiplexing manner. For example, N=4, and M=2. In this case, the PO 1 and the PO 2 may use the first time domain resource, and the PO 3 and the PO 4 may use the second time domain resource. For another example, the PO 1, the PO 2, the PO 3, and the PO 4 may use a same time domain resource in a time division multiplexing manner.

Each of the M time domain resources may include at least two time domain units. The time domain unit may be a subframe, a slot, a mini-slot, a non-slot unit, or the like. The non-slot unit may include a plurality of consecutive symbols. For example, the non-slot unit may include four consecutive symbols. For another example, the non-slot unit may include two consecutive symbols. For another example, the non-slot unit may include seven consecutive symbols. It may be understood that, a specific quantity of symbols included in the non-slot unit is merely intended to help a person skilled in the art better understand a meaning of the non-slot unit, but not intended to specifically limit the non-slot unit.

For example, in some embodiments, the time domain unit may be a subframe. A quantity of subframes included in each of the M time domain resources is the same, and each time domain resource may include at least two subframes.

For another example, in some embodiments, the time domain unit may be a slot. A quantity of slots included in each of the M time domain resources is the same, and each time domain resource may include at least two slots.

For another example, in some embodiments, the time domain unit may be a mini-slot. A quantity of mini-slots included in each of the M time domain resources is the same, and each time domain resource may include at least two mini-slots.

For another example, in some embodiments, a quantity of non-slot units included in each of the M time domain resources is the same, and each time domain resource may include at least two non-slot units. Quantities of symbols included in any two of the at least two non-slot units are the same.

To help a person skilled in the art better understand the technical solutions of this application, some specific examples are provided in the specification of this application. The specific examples are all described by using an example in which the time domain unit is a slot or a subframe. Based on the specific examples, a person skilled in the art may also obtain an implementation in which the time domain unit is another unit, for example, a subframe, a mini-slot, or a non-slot unit.

Optionally, in some embodiments, a position of the target paging occasion in the paging frame is related to at least one of a subcarrier spacing, a time domain position of a synchronization signal block actually sent by the network device, and a time domain position of a candidate synchronization signal block.

That a position of each of the M time domain resources in the paging frame is related to a subcarrier spacing may be that the position of each time domain resource in the paging frame also varies when the subcarrier spacing is different.

For example, it is assumed that M is equal to 1 and that the time domain unit is a slot. When the subcarrier spacing is 15 kHz, a start position or time domain position of the first time domain resource may be located in slot 5 in the paging frame. When the subcarrier spacing is 30 kHz, the start position or time domain position of the first time domain resource may be located in slot to in the paging frame. When the subcarrier spacing is 60 kHz, the start position or time domain position of the first time domain resource may be located in slot 20 in the paging frame. When the subcarrier spacing is 120 kHz, the start position or time domain position of the first time domain resource may be located in slot 40 in the paging frame.

That a position of each of the M time domain resources in the paging frame is related to a start position of a synchronization signal burst set may be that the start position of the synchronization signal burst set is the same as a start position of each time domain resource in the paging frame.

For example, it is assumed that M is equal to 1 and that the time domain unit is a slot. When the subcarrier spacing is 15 kHz, the start position or time domain position of the first time domain resource and a start position of a synchronization signal burst set may be both located in the slot 5 in the paging frame. When the subcarrier spacing is 30 kHz, the start position or time domain position of the first time domain resource and a start position of a synchronization signal burst set may be both located in the slot to in the paging frame. When the subcarrier spacing is 60 kHz, the start position or time domain position of the first time domain resource and a start position of a synchronization signal burst set may be both located in the slot 20 in the paging frame. When the subcarrier spacing is 120 kHz, the start position or time domain position of the first time domain resource and a start position of a synchronization signal burst set may be both located in the slot 40 in the paging frame.

Optionally, in some embodiments, the terminal device itself may determine information about the paging occasion. Specifically, the terminal device may determine the start position of the target paging occasion in the paging frame based on a value of M.

Optionally, in some embodiments, that the terminal device determines a position of a time domain resource of the target paging occasion in the paging frame may be determining a position of a first time domain unit in the time domain resource of the target paging occasion in the paging frame. In other words, that the terminal device determines a position of a time domain resource of the target paging occasion in the paging frame may be determining a start position of the time domain resource of the target paging occasion in the paging frame. A quantity of time domain units included in each of the M time domain resources is known to the terminal device. In other words, a length of each time domain resource is known to the terminal device. Therefore, after determining the position of the first time domain unit in the time domain resource of the target paging occasion in the paging frame, the terminal device may determine a specific position of the time domain resource of the target paging occasion in the paging frame.

Optionally, in some embodiments, M=1. In this case, only one time domain resource is included. In this case, the start position of the target paging occasion in the paging frame is time domain unit 0 in the paging frame.

Optionally, in other embodiments, M=1, and the start position of the target paging occasion in the paging frame is time domain unit $K_1/2$ in the paging frame. $K_1$ is a positive integer, and K can be exactly divided by 2.

It may be understood that, a value of $K_1$ should be not greater than twice a quantity of time domain units included in one paging frame.

For example, when the subcarrier spacing is 15 kHz, a quantity of slots included in a frame is 10. To be specific, the paging frame may include slot 0 to slot 9. In this case, the start position of the target paging occasion in the paging frame may be any one of the slot 1 to the slot 9 in the paging frame.

For another example, when the subcarrier spacing is 30 kHz, a quantity of slots included in a frame is 20. To be specific, the paging frame may include slot 0 to slot 19. In this case, the start position of the target paging occasion in the paging frame may be any one of the slot 1 to the slot 19 in the paging frame.

For another example, when the subcarrier spacing is 60 kHz, a quantity of slots included in a frame is 40. To be specific, the paging frame may include slot 0 to slot 39. In this case, the start position of the target paging occasion in the paging frame may be any one of the slot 1 to the slot 39 in the paging frame.

For another example, when the subcarrier spacing is 120 kHz, a quantity of slots included in a frame is 80. To be specific, the paging frame may include slot 0 to slot 79. In this case, the start position of the target paging occasion in the paging frame may be any one of the slot 0 to the slot 79 in the paging frame.

Optionally, in some embodiments, $K_1$ is a quantity of time domain units included in one paging frame. For example, it is assumed that the time domain unit is a slot. When the subcarrier spacing is 15 kHz, the start position of the target paging occasion in the paging frame may be the slot 5 in the paging frame. When the subcarrier spacing is 30 kHz, the start position of the target paging occasion in the paging frame may be the slot to in the paging frame. When the subcarrier spacing is 60 kHz, the start position of the target paging occasion in the paging frame may be the slot 20 in the paging frame. When the subcarrier spacing is 120 kHz, the start position of the target paging occasion in the paging frame may be the slot 40 in the paging frame.

It may be understood that, slot x in this embodiment of this application may also be referred to as a slot x, and denotes a slot whose slot index is x (x is a positive integer greater than or equal to 0). For example, the slot 0 may also be referred to as a slot 0, and denotes a slot whose index is 0; and the slot 5 may also be referred to as a slot 5, and denotes a slot whose index is 5. Similarly, time domain unit x in this embodiment of this application may also be referred to as a time domain unit x, and denotes a time domain unit whose index is x; subframe x may also be referred to as a subframe x, and denotes a subframe whose subframe index is x; mini-slot x may also be referred to as a mini-slot x, and denotes a mini-slot whose mini-slot index is x; and a non-slot unit x may also be referred to as a non-slot unit x, and denotes a non-slot unit whose non-slot unit index is x.

It may be understood that, the slot x in the paging frame is the $(x+1)^{th}$ slot in the paging frame. For example, the slot 0 in the paging frame is the first slot in the paging frame, and the slot 5 in the paging frame is the sixth slot in the paging frame. Similarly, the time domain unit x in the paging frame is the $(x+1)^{th}$ time domain unit in the paging frame; the subframe x in the paging frame is the $(x+1)^{th}$ subframe in the paging frame; the mini-slot x in the paging frame is the $(x+1)^{th}$ mini-slot in the paging frame; and the non-slot unit x in the paging frame is the $(x+1)^{th}$ non-slot unit in the paging frame.

Optionally, in some embodiments, M=1, and the start position of the target paging occasion in the paging frame may be a time domain unit for receiving a synchronization signal block in the paging frame by the terminal device. In other words, the PO and the synchronization signal block may use a same time domain unit. This can reduce occupation of time domain resources by the PO. In this way, a saved time domain resource can be used for transmitting other information.

Optionally, in some embodiments, M=1, and the start position of the target paging occasion in the paging frame may be a time domain unit next to a time domain unit for receiving a last synchronization signal block in the paging frame by the terminal device. Still for example, the time domain unit is a slot. It is assumed that the subcarrier spacing is 15 kHz. If the last synchronization signal block received by the terminal device is located in the slot 6, the first time domain unit is the slot 7.

The terminal device may determine the time domain unit position of the candidate SSB and the time domain unit position of the actually transmitted SSB based on SSB position indication information sent by the network device. It may be understood that, the actually transmitted SSB is an SSB actually sent by the network device. The candidate SSB may also be referred to as an SSB that can be transmitted. The terminal device may receive the SSB in the position in which the candidate SSB is located. The actually transmitted SSB may also be referred to as a received SSB. The terminal device finally receives the SSB in the time domain position in which the network device actually sends the SSB.

The network device may indicate the position of the SSB by using RMSI bit mapping information.

For example, for a frequency band higher than 6 GHz, one synchronization signal burst set has a maximum of 64 SSBs. The 64 SSBs may be grouped into eight groups. The network device may use 8-bit information to indicate whether each group of SSBs are sent. Each group of SSBs may include eight SSB. The network device may use 8-bit information to indicate whether the eight SSBs are sent. States about whether SSBs in each group of SSBs are sent are consistent. Therefore, the network device may use SSB position indication information whose length is 16 bits to indicate the time domain unit position for transmitting the SSB and the time domain unit position of the actually transmitted SSB. For example, the SSB position indication information is 1101100110100011. The first eight bits in the 16 bits may indicate group information. The group information is 11011001, which may indicate that SSBs in a group 0, a group 1, a group 3, a group 4, and a group 7 are actually sent. Last eight bits in the 16 bits may indicate intra-group information. The intra-group information is 1010001, which indicates that SSBs 0, 2, 6, and 7 in a group are sent.

The terminal device may determine two types of SSBs, where one type is an SSB actually sent by the network device, and the other type is a candidate SSB. Still using 110100110100011 as an example of the SSB position indication information, the SSBs actually sent by the network device are SSBs 0, 2, 6, and 7 in groups 0, 1, 3, 4, and 7. The candidate SSBs are all SSBs in groups 0 to 7.

The network device may also send a time index of the SSB to the terminal device. The time index of the SSB is used to indicate the time domain resource position that can be used by the network device to send the SSB. In this way, the terminal device determines, based on the SSB time index and the SSB position indication information, the time domain resource position of the SSB actually sent by the network device and the time domain resource position of the candidate SSB.

Optionally, in some embodiments, M is equal to 2, the start position of the first one of the M time domain resources may be the time domain unit 0 in the paging frame, and a start position of the second one of the M time domain resources may be time domain unit $K_2/2$ in the paging frame, where $K_2$ is a positive integer that is greater than 2 and can be exactly divided by 2. Optionally, in some embodiments, a time domain resource on which the target paging occasion is located may be the first time domain resource. Optionally, in other embodiments, a time domain resource on which the target paging occasion is located may be the second time domain resource. In other words, the start position of the target paging occasion in the paging frame may be the start position of the first time domain resource or the start position of the second time domain resource. To be specific, the start position of the target paging occasion in the paging frame is the time domain unit 0 in the paging frame or the time domain unit $K_2/2$ in the paging frame.

Similar to $K_1$, a value of $K_2$ should be not greater than twice a quantity of time domain units included in one paging frame.

Optionally, in some embodiments, M is equal to 2, at least one time domain unit may be included between a first time domain unit in the first one of the M time domain resources and a first time domain unit in the second one of the M time domain resources.

Using the 15 kHz subcarrier spacing as an example, when the start position or time domain position of the first time domain resource is the slot 0, the start position or time domain position of the second time domain resource may be any one of slots 2 to 8. It may be understood that, if the first time domain unit in the second time domain resource is the slot 9, when a next subframe is also a paging frame, start positions or time domain positions of two time domain units in different paging frames may be consecutive. Similarly, when the start position or time domain position of the first time domain resource is the slot 1, the start position or time domain position of the second time domain resource may be any one of slots 3 to 8. Similarly, when the start position or time domain position of the first time domain resource is the slot 2, the start position or time domain position of the second time domain resource may be any one of slots 4 to 8. Similarly, when the start position or time domain position of the first time domain resource is the slot 3, the start position or time domain position of the second time domain resource may be any one of slots 5 to 8. Similarly, when the start position or time domain position of the first time domain resource is the slot 4, the start position or time domain position of the second time domain resource may be any one of slots numbered 6 to 8. Similarly, when the start position of the first time domain resource is the slot 5, the start position or time domain position of the second time domain resource may be either of slots numbered 7 and 8. Similarly, when the start position or time domain position of the first time domain resource is the slot 6, the start position or time domain position of the second time domain resource may be the slot 8.

A person skilled in the art may understand that, specific implementations in which the subcarrier spacing is 30 kHz, 60 kHz, or 120 kHz is similar to the implementation in which the subcarrier spacing is 15 kHz. To avoid repetition, details are not described herein.

Optionally, in some embodiments, $K_2$ is a quantity of time domain units included in one paging frame. For example, it is assumed that the time domain unit is a slot. When the subcarrier spacing is 15 kHz, the start position or time domain position of the first time domain resource may be located in the slot 0 in the paging frame, and the start position or time domain position of the second time domain resource may be located in the slot 5 in the paging frame. When the subcarrier spacing is 30 kHz, the start position or time domain position of the first time domain resource may be located in the slot 0 in the paging frame, and the start position or time domain position of the second time domain resource may be located in the slot to in the paging frame. When the subcarrier spacing is 60 kHz, the start position or time domain position of the first time domain resource may be located in the slot 0 in the paging frame, and the start position or time domain position of the second time domain resource may be located in the slot 20 in the paging frame. When the subcarrier spacing is 120 kHz, the start position or time domain position of the first time domain resource may be located in the slot 0 in the paging frame, and the start position or time domain position of the second time domain resource may be located in the slot 40 in the paging frame.

Optionally, in some embodiments, M is equal to 4, and the terminal device determines that the start position or time domain position of the first one of the M time domain resources is the time domain unit 0 in the paging frame, the start position or time domain position of the second one of the M time domain resources is time domain unit $K_2/4$ in the paging frame, a start position or time domain position of the third one of the M time domain resources is the time domain unit $K_2/2$ in the paging frame, and a start position or time domain position of the fourth one of the M time domain resources is time domain unit $3 \times K_2/4$ in the paging frame. Optionally, in some embodiments, the time domain resource on which the target paging occasion is located may be the first time domain resource. Optionally, in other embodiments, the time domain resource on which the target paging occasion is located may be the second time domain resource. Optionally, in other embodiments, the time domain resource on which the target paging occasion is located may be the third time domain resource. Optionally, in other embodiments, the time domain resource on which the target paging occasion is located may be the fourth time domain resource. In other words, the start position of the target paging occasion in the paging frame may be the start position of the first time domain resource, the start position of the second time domain resource, the start position of the third time domain resource, or the start position of the fourth time domain resource. To be specific, the start position of the target paging occasion in the paging frame is the time domain unit 0 in the paging frame, the time domain unit $K_2/4$ in the paging frame, the time domain unit $K_2/2$ in the paging frame, or the time domain unit $3 \times K_2/4$ in the paging frame. In other words, a time domain position of the target paging occasion in the paging frame may be the time domain position of the first time domain resource, the time domain position of the second time domain resource, the time domain position of the third time domain resource, or the time domain position of the fourth time domain resource. To be specific, the time domain position of the target paging occasion in the paging frame is the time domain unit 0 in the paging frame, the time domain unit $K_2/4$ in the paging frame, the time domain unit $K_2/2$ in the paging frame, or the time domain unit $3 \times K_2/4$ in the paging frame.

At least one time domain unit may be included between start positions of two adjacent time domain resources in the M time domain resources, or start positions of two adjacent time domain resources may be separated by at least one time domain unit, similarly to the case in which M is equal to 2.

Using the 15 kHz subcarrier spacing as an example, when the start position or time domain position of the first time domain resource is the slot 0, the start position or time domain position of the second time domain resource may be the slot 2, the start position or time domain position of the third time domain resource may be the slot 4, and the start position or time domain position of the fourth time domain resource may be any one of slots 6 to 8.

Still using the 15 kHz subcarrier spacing as an example, when the start position or time domain position of the first time domain resource is the slot 0, the start position or time domain position of the second time domain resource may be the slot 3, the start position or time domain position of the third time domain resource may be the slot 5, and the start position or time domain position of the fourth time domain resource may be either of slots 7 and 8.

Still using the 15 kHz subcarrier spacing as an example, when the start position of the first time domain resource is the slot 0, the start position or time domain position of the second time domain resource may be the slot 3, the start position or time domain position of the third time domain resource may be the slot 6, and the start position or time domain position of the fourth time domain resource may be the slot 8.

Still using the 15 kHz subcarrier spacing as an example, when the start position or time domain position of the first time domain resource is the slot 0, the start position or time domain position of the second time domain resource may be the slot 4, the start position or time domain position of the third time domain resource may be the slot 6, and the start position or time domain position of the fourth time domain resource may be the slot 8.

Still using the 15 kHz subcarrier spacing as an example, when the start position or time domain position of the first time domain resource is the slot 1, the start position or time domain position of the second time domain resource may be the slot 3, the start position or time domain position of the third time domain resource may be the slot 5, and the start position or time domain position of the fourth time domain resource may be the slot 7 or the slot 8.

Still using the 15 kHz subcarrier spacing as an example, when the start position or time domain position of the first time domain resource is the slot 1, the start position or time domain position of the second time domain resource may be the slot 3, the start position or time domain position of the third time domain resource may be the slot 6, and the start position or time domain position of the fourth time domain resource may be the slot 8.

Still using the 15 kHz subcarrier spacing as an example, when the start position or time domain position of the first time domain resource is the slot 1, the start position or time domain position of the second time domain resource may be the slot 4, the start position or time domain position of the third time domain resource may be the slot 6, and the start position or time domain position of the fourth time domain resource may be the slot 8.

Still using the 15 kHz subcarrier spacing as an example, when the start position or time domain position of the first time domain resource is the slot 2, the start position or time domain position of the second time domain resource may be the slot 4, the start position or time domain position of the third time domain resource may be the slot 6, and the start position or time domain position of the fourth time domain resource may be the slot 8.

A person skilled in the art may understand that, specific implementations in which the subcarrier spacing is 30 kHz, 60 kHz, or 120 kHz is similar to the implementation in which the subcarrier spacing is 15 kHz. To avoid repetition, details are not described herein.

Optionally, in some embodiments, $K_2$ is a quantity of time domain units included in one paging frame.

Using the 30 kHz subcarrier spacing as an example, the start position or time domain position of the first time domain resource may be located in the slot 0 in the paging frame, the start position or time domain position of the second time domain resource may be located in the slot 5 in the paging frame, the start position or time domain position of the third time domain resource may be located in the slot 100 in the paging frame, and the start position or time domain position of the fourth time domain resource may be located in the slot 15 in the paging frame.

Using the 60 kHz subcarrier spacing as an example, the start position or time domain position of the first time domain resource may be located in the slot 0 in the paging frame, the start position or time domain position of the second time domain resource may be located in the slot 100 in the paging frame, the start position or time domain position of the third time domain resource may be located in the slot 20 in the paging frame, and the start position or time domain position of the fourth time domain resource may be located in the slot 30 in the paging frame.

Using the 120 kHz subcarrier spacing as an example, the start position or time domain position of the first time domain resource may be located in the slot 0 in the paging frame, the start position or time domain position of the second time domain resource may be located in the slot 20 in the paging frame, the start position or time domain position of the third time domain resource may be located in the slot 40 in the paging frame, and the start position or time domain position of the fourth time domain resource may be located in the slot 60 in the paging frame.

Optionally, in some embodiments, when M is equal to 4 and one paging frame includes K' time domain units, a start position or time domain position of one of the four time domain resources is the time domain unit 0, and a start position or time domain position of another one of the four time domain resources is time domain unit K'/2. Start positions or time domain positions of the rest of the four time domain resources may be located in positions separated from the first time domain unit in the foregoing two time domain resources by a plurality of time domain units. This may facilitate use of a time domain unit with an SSB in a time division multiplexing manner.

It may be understood that, start positions or time domain positions of only two of the four time domain resources need to be the time domain unit 0 and the time domain unit K'/2 respectively. The time domain unit K'/2 may be the start position of the second one of the four time domain resources; the time domain unit K'/2 may be the start position of the third time domain resource; or the time domain unit K'/2 may be the start position of the fourth time domain resource.

Using the 15 kHz subcarrier spacing as an example, the start position or time domain position of the first time domain resource may be located in the slot 0 in the paging frame, the start position or time domain position of the second time domain resource may be located in the slot 3 in the paging frame, the start position or time domain position of the third time domain resource may be located in the slot 5 in the paging frame, and the start position or time domain position of the fourth time domain resource may be located in the slot 8 in the paging frame.

Still using the 15 kHz subcarrier spacing as an example, the start position or time domain position of the first time domain resource may be located in the slot 0 in the paging frame, the start position or time domain position of the second time domain resource may be located in the slot 2 in the paging frame, the start position or time domain position of the third time domain resource may be located in the slot 5 in the paging frame, and the start position or time domain position of the fourth time domain resource may be located in the slot 7 in the paging frame.

Using the 30 kHz subcarrier spacing as an example, the start position or time domain position of the first time domain resource may be located in the slot 0 in the paging frame, the start position or time domain position of the second time domain resource may be located in the slot 5 in the paging frame, the start position or time domain position of the third time domain resource may be located in the slot to in the paging frame, and the start position or time domain position of the fourth time domain resource may be located in the slot 15 in the paging frame.

Still using the 30 kHz subcarrier spacing as an example, the start position or time domain position of the first time domain resource may be located in the slot 0 in the paging frame, the start position or time domain position of the second time domain resource may be located in the slot to in the paging frame, the start position or time domain position of the third time domain resource may be located in the slot 13 in the paging frame, and the start position or time domain position of the fourth time domain resource may be located in the slot 15 in the paging frame.

Using the 60 kHz subcarrier spacing as an example, the start position or time domain position of the first time domain resource may be located in the slot 0 in the paging frame, the start position or time domain position of the second time domain resource may be located in the slot to in the paging frame, the start position or time domain position of the third time domain resource may be located in the slot 20 in the paging frame, and the start position or time domain position of the fourth time domain resource may be located in the slot 30 in the paging frame.

Still using the 60 kHz subcarrier spacing as an example, the start position or time domain position of the first time domain resource may be located in the slot 0 in the paging frame, the start position or time domain position of the second time domain resource may be located in the slot 20 in the paging frame, the start position or time domain position of the third time domain resource may be located in the slot 25 in the paging frame, and the start position or time domain position of the fourth time domain resource may be located in the slot 30 in the paging frame.

Using the 120 kHz subcarrier spacing as an example, the start position or time domain position of the first time domain resource may be located in the slot 0 in the paging frame, the start position or time domain position of the second time domain resource may be located in the slot 20 in the paging frame, the start position or time domain position of the third time domain resource may be located in the slot 40 in the paging frame, and the start position or time domain position of the fourth time domain resource may be located in the slot 60 in the paging frame.

Still using the 120 kHz subcarrier spacing as an example, the start position or time domain position of the first time domain resource may be located in the slot 0 in the paging frame, the start position or time domain position of the second time domain resource may be located in the slot 40 in the paging frame, the start position or time domain position of the third time domain resource may be located in the slot 50 in the paging frame, and the start position or time domain position of the fourth time domain resource may be located in the slot 60 in the paging frame.

Still using the 120 kHz subcarrier spacing as an example, the start position or time domain position of the first time domain resource may be located in the slot 0 in the paging frame, the start position or time domain position of the second time domain resource may be located in the slot to in the paging frame, the start position or time domain position of the third time domain resource may be located in the slot 20 in the paging frame, and the start position or time domain position of the fourth time domain resource may be located in the slot 40 in the paging frame.

Optionally, in some embodiments, M is equal to 4. The terminal device determines that the start position or time domain position of the first one of the M time domain resources is the time domain unit 0 in the paging frame, the start position or time domain position of the second one of the M time domain resources is time domain unit 3 in the paging frame, the start position or time domain position of the third one of the M time domain resources is time domain unit 5 in the paging frame, and the start position or time domain position of the fourth one of the M time domain resources is time domain unit 8 in the paging frame, where the paging frame includes to time domain units. In other words, the start position of the target paging occasion in the paging frame may be the start position of the first time domain resource, the start position of the second time domain resource, the start position of the third time domain resource, or the start position of the fourth time domain resource. To be specific, the start position of the target paging occasion in the paging frame is the time domain unit 0 in the paging frame, the time domain unit 3 in the paging frame, the time domain unit 5 in the paging frame, or the time domain unit 8 in the paging frame.

Table 1 to Table 20 show a position of each paging resource in the paging frame when the time domain unit is a subframe or a slot and values of M are different. A person skilled in the art may also obtain, based on Table 1 to Table 19, a position of each paging resource in the paging frame when the time domain unit is a mini-slot or a non-slot unit.

Optionally, in some embodiments, positions listed in Table 1 to Table 20 are start positions of paging resources.

Optionally, in other embodiments, positions listed in Table 1 to Table 20 are time domain positions of paging resources.

Table 1 shows positions of subframe-based time domain resources when one paging frame includes four time domain resources.

TABLE 1

| PO 0 | PO 1 | PO 2 | PO 3 | PO 0 | PO 1 | PO 2 | PO 3 |
|---|---|---|---|---|---|---|---|
| 0 | 2 | 4 | 6 | 0 | 3 | 6 | 8 |
| 0 | 2 | 4 | 7 | 0 | 4 | 6 | 8 |
| 0 | 2 | 4 | 8 | 1 | 3 | 5 | 7 |
| 0 | 2 | 5 | 7 | 1 | 3 | 5 | 8 |
| 0 | 2 | 5 | 8 | 1 | 3 | 6 | 8 |
| 0 | 2 | 6 | 8 | 1 | 4 | 6 | 8 |
| 0 | 3 | 5 | 7 | 2 | 4 | 6 | 8 |
| 0 | 3 | 5 | 8 | | | | |

In Table 1, the PO 0 indicates a subframe index of a position of the first one of the four paging resources in the paging frame, the PO 1 indicates a subframe index of a position of the second one of the four paging resources in the paging frame, the PO 3 indicates a subframe index of a position of the third one of the four paging resources in the paging frame, and the PO 4 indicates a subframe index of a position of the fourth one of the four paging resources in the paging frame.

Table 2 shows positions of subframe-based time domain resources when one paging frame includes two time domain resources.

TABLE 2

| PO 0 | PO 1 | PO 0 | PO 1 | PO 0 | PO 1 | PO 0 | PO 1 |
|---|---|---|---|---|---|---|---|
| 0 | 2 | 1 | 4 | 2 | 7 | 4 | 8 |
| 0 | 3 | 1 | 5 | 2 | 8 | 5 | 7 |
| 0 | 4 | 1 | 6 | 3 | 5 | 5 | 8 |
| 0 | 5 | 1 | 7 | 3 | 6 | 6 | 8 |
| 0 | 6 | 1 | 8 | 3 | 7 | | |
| 0 | 7 | 2 | 4 | 3 | 8 | | |
| 0 | 8 | 2 | 5 | 4 | 6 | | |
| 1 | 3 | 2 | 6 | 4 | 7 | | |

In Table 2, the PO 0 indicates a subframe index of a position of the first one of the two paging resources in the paging frame, and the PO 1 indicates a subframe index of a position of the second one of the two paging resources in the paging frame.

Table 3 shows positions of slot-based time domain resources when one paging frame includes four time domain resources and the subcarrier spacing is 15 kHz.

TABLE 3

| PO 0 | PO 1 | PO 2 | PO 3 | PO 0 | PO 1 | PO 2 | PO 3 |
|---|---|---|---|---|---|---|---|
| 0 | 2 | 4 | 6 | 0 | 3 | 6 | 8 |
| 0 | 2 | 4 | 7 | 0 | 4 | 6 | 8 |
| 0 | 2 | 4 | 8 | 1 | 3 | 5 | 7 |
| 0 | 2 | 5 | 7 | 1 | 3 | 5 | 8 |
| 0 | 2 | 5 | 8 | 1 | 3 | 6 | 8 |
| 0 | 2 | 6 | 8 | 1 | 4 | 6 | 8 |
| 0 | 3 | 5 | 7 | 2 | 4 | 6 | 8 |
| 0 | 3 | 5 | 8 | | | | |

In Table 3, the PO 0 indicates a slot index of a position of the first one of the four paging resources in the paging frame, the PO 1 indicates a slot index of a position of the second one of the four paging resources in the paging frame, the PO 3 indicates a slot index of a position of the third one of the four paging resources in the paging frame, and the PO 4 indicates a slot index of a position of the fourth one of the four paging resources in the paging frame.

Table 4 shows positions of slot-based time domain resources when one paging frame includes two time domain resources and the subcarrier spacing is 15 kHz.

TABLE 4

| PO 0 | PO 1 | PO 0 | PO 1 | PO 0 | PO 1 | PO 0 | PO 1 |
|---|---|---|---|---|---|---|---|
| 0 | 2 | 1 | 4 | 2 | 7 | 4 | 8 |
| 0 | 3 | 1 | 5 | 2 | 8 | 5 | 7 |
| 0 | 4 | 1 | 6 | 3 | 5 | 5 | 8 |
| 0 | 5 | 1 | 7 | 3 | 6 | 6 | 8 |
| 0 | 6 | 1 | 8 | 3 | 7 | | |
| 0 | 7 | 2 | 4 | 3 | 8 | | |
| 0 | 8 | 2 | 5 | 4 | 6 | | |
| 1 | 3 | 2 | 6 | 4 | 7 | | |

In Table 4, the PO 0 indicates a slot index of a position of the first one of the two paging resources in the paging frame, and the PO 1 indicates a slot index of a position of the second one of the two paging resources in the paging frame.

Table 5 to Table 7 show positions of slot-based time domain resources when one paging frame includes four time domain resources and the subcarrier spacing is 30 kHz.

TABLE 5

| PO 0 | PO 1 | PO 2 | PO 3 | PO 0 | PO 1 | PO 2 | PO 3 | PO 0 | PO 1 | PO 2 | PO 3 |
|---|---|---|---|---|---|---|---|---|---|---|---|
| 0 | 4 | 8 | 12 | 0 | 5 | 9 | 16 | 1 | 5 | 9 | 14 |
| 0 | 4 | 8 | 13 | 0 | 5 | 10 | 14 | 1 | 5 | 9 | 15 |
| 0 | 4 | 8 | 14 | 0 | 5 | 10 | 15 | 1 | 5 | 9 | 16 |
| 0 | 4 | 8 | 15 | 0 | 5 | 10 | 16 | 1 | 5 | 10 | 14 |
| 0 | 4 | 8 | 16 | 0 | 5 | 11 | 15 | 1 | 5 | 10 | 15 |
| 0 | 4 | 9 | 13 | 0 | 5 | 11 | 16 | 1 | 5 | 10 | 16 |
| 0 | 4 | 9 | 14 | 0 | 5 | 12 | 16 | 1 | 5 | 11 | 15 |
| 0 | 4 | 9 | 15 | 0 | 6 | 10 | 14 | 1 | 5 | 11 | 16 |
| 0 | 4 | 9 | 16 | 0 | 6 | 10 | 15 | 1 | 5 | 12 | 16 |
| 0 | 4 | 10 | 14 | 0 | 6 | 10 | 16 | 1 | 6 | 10 | 14 |

TABLE 6

| PO 0 | PO 1 | PO 2 | PO 3 | PO 0 | PO 1 | PO 2 | PO 3 | PO 0 | PO 1 | PO 2 | PO 3 |
|---|---|---|---|---|---|---|---|---|---|---|---|
| 1 | 8 | 12 | 16 | 0 | 4 | 10 | 16 | 1 | 6 | 10 | 16 |
| 2 | 6 | 10 | 14 | 0 | 4 | 11 | 15 | 1 | 6 | 11 | 15 |
| 2 | 6 | 10 | 15 | 0 | 4 | 11 | 16 | 1 | 6 | 11 | 16 |
| 2 | 6 | 10 | 16 | 0 | 4 | 12 | 16 | 1 | 6 | 12 | 16 |

TABLE 6-continued

| PO 0 | PO 1 | PO 2 | PO 3 | PO 0 | PO 1 | PO 2 | PO 3 | PO 0 | PO 1 | PO 2 | PO 3 |
|---|---|---|---|---|---|---|---|---|---|---|---|
| 2 | 6 | 11 | 15 | 0 | 5 | 9 | 13 | 1 | 7 | 11 | 15 |
| 2 | 6 | 11 | 16 | 0 | 5 | 9 | 14 | 1 | 7 | 11 | 16 |
| 2 | 6 | 12 | 16 | 0 | 5 | 9 | 15 | 1 | 7 | 12 | 16 |
| 2 | 7 | 11 | 15 | 0 | 6 | 11 | 16 | 0 | 7 | 12 | 16 |
| 2 | 7 | 11 | 16 | 0 | 6 | 12 | 16 | 0 | 8 | 12 | 16 |
| 2 | 7 | 12 | 16 | 0 | 7 | 11 | 15 | 1 | 5 | 9 | 13 |

TABLE 7

| PO 0 | PO 1 | PO 2 | PO 3 |
|---|---|---|---|
| 3 | 7 | 11 | 15 |
| 3 | 7 | 11 | 16 |
| 3 | 7 | 12 | 16 |
| 3 | 8 | 12 | 16 |
| 4 | 8 | 12 | 16 |
| 0 | 7 | 11 | 16 |
| 2 | 8 | 12 | 16 |
| 1 | 6 | 10 | 15 |
| 0 | 6 | 11 | 15 |
| 0 | 4 | 10 | 15 |

In Table 5 to Table 7, the PO 0 indicates a slot index of a position of the first one of the four paging resources in the paging frame, the PO 1 indicates a slot index of a position of the second one of the four paging resources in the paging frame, the PO 3 indicates a slot index of a position of the third one of the four paging resources in the paging frame, and the PO 4 indicates a slot index of a position of the fourth one of the four paging resources in the paging frame.

Table 8 and Table 9 show positions of slot-based time domain resources when one paging frame includes two time domain resources and the subcarrier spacing is 30 kHz.

TABLE 8

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 0 | 4 | 0 | 16 | 1 | 16 | 3 | 7 | 4 | 10 | 5 | 14 |
| 0 | 5 | 1 | 5 | 2 | 6 | 3 | 8 | 4 | 11 | 5 | 15 |
| 0 | 6 | 1 | 6 | 2 | 7 | 3 | 9 | 4 | 12 | 5 | 16 |
| 0 | 7 | 1 | 7 | 2 | 8 | 3 | 10 | 4 | 13 | 6 | 10 |
| 0 | 8 | 1 | 8 | 2 | 9 | 3 | 11 | 4 | 14 | 6 | 11 |
| 0 | 9 | 1 | 9 | 2 | 10 | 3 | 12 | 4 | 15 | 6 | 12 |
| 0 | 10 | 1 | 10 | 6 | 14 | 6 | 15 | 6 | 16 | 7 | 11 |

TABLE 9

| PO 0 | PO 1 | PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|---|---|
| 7 | 13 | 9 | 16 | 0 | 11 | 1 | 11 | 2 | 12 | 3 | 14 | 5 | 9 |
| 7 | 14 | 10 | 14 | 0 | 12 | 1 | 12 | 2 | 13 | 3 | 15 | 5 | 10 |
| 7 | 15 | 10 | 15 | 0 | 13 | 1 | 13 | 2 | 14 | 3 | 16 | 5 | 11 |
| 7 | 16 | 10 | 16 | 0 | 14 | 1 | 14 | 2 | 15 | 4 | 8 | 5 | 12 |
| 8 | 12 | 11 | 15 | 0 | 15 | 1 | 15 | 2 | 16 | 4 | 9 | 5 | 13 |
| 8 | 13 | 11 | 16 | 2 | 11 | 3 | 13 | 4 | 16 | 6 | 13 | 8 | 14 |
| 7 | 12 | 12 | 16 | | | | | | | | | | |

In Table 8 and Table 9, the PO 0 indicates a slot index of a position of the first one of the two paging resources in the paging frame, and the PO 1 indicates a slot index of a position of the second one of the two paging resources in the paging frame.

Table to and Table 11 show positions of slot-based time domain resources when one paging frame includes four time domain resources and the subcarrier spacing is 60 kHz.

TABLE 10

| PO 0 | PO 1 | PO 2 | PO 3 | PO 0 | PO 1 | PO 2 | PO 3 | PO 0 | PO 1 | PO 2 | PO 3 |
|---|---|---|---|---|---|---|---|---|---|---|---|
| 0 | 8 | 16 | 24 | 0 | 9 | 17 | 29 | 0 | 11 | 19 | 31 |
| 0 | 8 | 16 | 25 | 0 | 9 | 17 | 30 | 0 | 11 | 19 | 32 |
| 0 | 8 | 16 | 26 | 0 | 9 | 17 | 31 | 1 | 9 | 17 | 25 |
| 0 | 8 | 16 | 27 | 0 | 9 | 17 | 32 | 1 | 9 | 17 | 26 |
| 0 | 8 | 16 | 28 | 0 | 9 | 18 | 26 | 1 | 9 | 17 | 27 |
| 0 | 8 | 16 | 29 | 0 | 9 | 18 | 27 | 1 | 9 | 17 | 28 |
| 0 | 8 | 16 | 30 | 0 | 9 | 18 | 28 | 1 | 9 | 17 | 29 |
| 0 | 8 | 16 | 31 | 0 | 9 | 18 | 29 | 1 | 9 | 17 | 30 |
| 0 | 8 | 16 | 32 | 0 | 9 | 18 | 30 | 1 | 9 | 17 | 31 |
| 0 | 8 | 17 | 25 | 0 | 9 | 18 | 31 | 1 | 9 | 17 | 32 |
| 0 | 8 | 17 | 26 | 0 | 9 | 18 | 32 | 1 | 9 | 18 | 26 |
| 0 | 8 | 17 | 27 | 0 | 9 | 19 | 27 | 1 | 9 | 18 | 27 |
| 0 | 8 | 17 | 28 | 0 | 9 | 19 | 28 | 1 | 9 | 18 | 28 |
| 0 | 8 | 17 | 29 | 0 | 9 | 19 | 29 | 1 | 9 | 18 | 29 |
| 0 | 8 | 17 | 30 | 0 | 9 | 19 | 30 | 1 | 9 | 18 | 30 |
| 0 | 8 | 17 | 31 | 0 | 9 | 19 | 31 | 1 | 9 | 18 | 31 |
| 0 | 8 | 17 | 32 | 0 | 9 | 19 | 32 | 1 | 9 | 18 | 32 |
| 0 | 8 | 18 | 26 | 0 | 10 | 18 | 26 | 1 | 9 | 19 | 27 |
| 0 | 8 | 18 | 27 | 0 | 10 | 18 | 27 | 1 | 9 | 19 | 28 |
| 0 | 8 | 18 | 28 | 0 | 10 | 18 | 28 | 1 | 9 | 19 | 29 |
| 0 | 8 | 18 | 29 | 0 | 10 | 18 | 29 | 1 | 9 | 19 | 30 |
| 0 | 8 | 18 | 30 | 0 | 10 | 18 | 30 | 1 | 9 | 19 | 31 |
| 0 | 8 | 18 | 31 | 0 | 10 | 18 | 31 | 1 | 9 | 19 | 32 |
| 0 | 8 | 18 | 32 | 0 | 10 | 18 | 32 | 1 | 10 | 18 | 26 |
| 0 | 8 | 19 | 27 | 0 | 10 | 19 | 27 | 1 | 10 | 18 | 27 |
| 0 | 8 | 19 | 28 | 0 | 10 | 19 | 28 | 1 | 10 | 18 | 28 |
| 3 | 11 | 19 | 28 | 3 | 11 | 19 | 29 | 3 | 11 | 19 | 30 |

TABLE 11

| PO 0 | PO 1 | PO 2 | PO 3 | PO 0 | PO 1 | PO 2 | PO 3 |
|---|---|---|---|---|---|---|---|
| 1 | 10 | 19 | 31 | 0 | 8 | 19 | 29 |
| 1 | 10 | 19 | 32 | 0 | 8 | 19 | 30 |
| 1 | 11 | 19 | 27 | 0 | 8 | 19 | 31 |
| 1 | 11 | 19 | 28 | 0 | 8 | 19 | 32 |
| 1 | 11 | 19 | 29 | 0 | 9 | 17 | 25 |
| 1 | 11 | 19 | 30 | 0 | 9 | 17 | 26 |
| 1 | 11 | 19 | 31 | 0 | 9 | 17 | 27 |
| 1 | 11 | 19 | 32 | 0 | 9 | 17 | 28 |
| 2 | 10 | 18 | 26 | 0 | 10 | 19 | 29 |
| 2 | 10 | 18 | 27 | 0 | 10 | 19 | 30 |
| 2 | 10 | 18 | 28 | 0 | 10 | 19 | 31 |
| 2 | 10 | 18 | 29 | 0 | 10 | 19 | 32 |
| 2 | 10 | 18 | 30 | 0 | 11 | 19 | 27 |
| 2 | 10 | 18 | 31 | 0 | 11 | 19 | 28 |
| 2 | 10 | 18 | 32 | 0 | 11 | 19 | 29 |
| 2 | 10 | 19 | 27 | 0 | 11 | 19 | 30 |
| 2 | 10 | 19 | 28 | 1 | 10 | 18 | 29 |
| 2 | 10 | 19 | 29 | 1 | 10 | 18 | 30 |
| 2 | 10 | 19 | 30 | 1 | 10 | 18 | 31 |
| 2 | 10 | 19 | 31 | 1 | 10 | 18 | 32 |
| 2 | 10 | 19 | 32 | 1 | 10 | 19 | 27 |

TABLE 11-continued

| PO 0 | PO 1 | PO 2 | PO 3 | PO 0 | PO 1 | PO 2 | PO 3 |
|---|---|---|---|---|---|---|---|
| 2 | 11 | 19 | 27 | 1 | 10 | 19 | 28 |
| 2 | 11 | 19 | 28 | 1 | 10 | 19 | 29 |
| 2 | 11 | 19 | 29 | 1 | 10 | 19 | 30 |
| 2 | 11 | 19 | 30 | 2 | 11 | 19 | 32 |
| 2 | 11 | 19 | 31 | 3 | 11 | 19 | 27 |
| 3 | 11 | 19 | 31 | 3 | 11 | 19 | 32 |

In Table to and Table 11, the PO 0 indicates a slot index of a position of the first one of the four paging resources in the paging frame, the PO 1 indicates a slot index of a position of the second one of the four paging resources in the paging frame, the PO 3 indicates a slot index of a position of the third one of the four paging resources in the paging frame, and the PO 4 indicates a slot index of a position of the fourth one of the four paging resources in the paging frame.

Table 12 and Table 13 show positions of slot-based time domain resources when one paging frame includes two time domain resources and the subcarrier spacing is 60 kHz.

TABLE 12

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 0 | 8 | 1 | 17 | 2 | 27 | 4 | 17 | 5 | 30 | 7 | 26 |
| 0 | 9 | 1 | 18 | 2 | 28 | 4 | 18 | 5 | 31 | 7 | 27 |
| 0 | 10 | 1 | 19 | 2 | 29 | 4 | 19 | 5 | 32 | 7 | 28 |
| 0 | 11 | 1 | 20 | 2 | 30 | 4 | 20 | 6 | 14 | 7 | 29 |
| 0 | 12 | 1 | 21 | 2 | 31 | 4 | 21 | 6 | 15 | 7 | 30 |
| 0 | 13 | 1 | 22 | 2 | 32 | 4 | 22 | 6 | 16 | 7 | 31 |
| 0 | 14 | 1 | 23 | 3 | 11 | 4 | 23 | 6 | 17 | 7 | 32 |
| 0 | 15 | 1 | 24 | 3 | 12 | 4 | 24 | 6 | 18 | 8 | 16 |
| 0 | 16 | 1 | 25 | 3 | 13 | 4 | 25 | 6 | 19 | 8 | 17 |
| 0 | 17 | 1 | 26 | 3 | 14 | 4 | 26 | 6 | 20 | 8 | 18 |
| 0 | 18 | 1 | 27 | 3 | 15 | 4 | 27 | 6 | 21 | 8 | 19 |
| 0 | 19 | 1 | 28 | 3 | 16 | 4 | 28 | 6 | 22 | 8 | 20 |
| 0 | 20 | 1 | 29 | 3 | 17 | 4 | 29 | 6 | 23 | 8 | 21 |
| 0 | 21 | 1 | 30 | 3 | 18 | 4 | 30 | 6 | 24 | 8 | 22 |
| 0 | 22 | 1 | 31 | 3 | 19 | 4 | 31 | 6 | 25 | 8 | 23 |
| 0 | 23 | 1 | 32 | 3 | 20 | 4 | 32 | 6 | 26 | 8 | 24 |

TABLE 12-continued

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 0 | 24 | 2 | 10 | 3 | 21 | 5 | 13 | 6 | 27 | 8 | 25 |
| 0 | 25 | 2 | 11 | 3 | 22 | 5 | 14 | 6 | 28 | 8 | 26 |
| 0 | 26 | 2 | 12 | 3 | 23 | 5 | 15 | 6 | 29 | 8 | 27 |
| 0 | 27 | 2 | 13 | 3 | 24 | 5 | 16 | 6 | 30 | 8 | 28 |
| 0 | 28 | 2 | 14 | 3 | 25 | 5 | 17 | 6 | 31 | 8 | 29 |
| 0 | 29 | 2 | 15 | 3 | 26 | 5 | 18 | 6 | 32 | 8 | 30 |
| 0 | 30 | 2 | 16 | 3 | 27 | 5 | 19 | 7 | 15 | 8 | 31 |
| 0 | 31 | 2 | 17 | 3 | 28 | 5 | 20 | 7 | 16 | 8 | 32 |
| 0 | 32 | 2 | 18 | 3 | 29 | 5 | 21 | 7 | 17 | 9 | 17 |
| 1 | 9 | 2 | 19 | 3 | 30 | 5 | 22 | 7 | 18 | 9 | 18 |
| 1 | 10 | 2 | 20 | 3 | 31 | 5 | 23 | 7 | 19 | 9 | 19 |
| 1 | 11 | 2 | 21 | 3 | 32 | 5 | 24 | 7 | 20 | 9 | 20 |
| 1 | 12 | 2 | 22 | 4 | 12 | 5 | 25 | 7 | 21 | 9 | 21 |
| 1 | 13 | 2 | 23 | 4 | 13 | 5 | 26 | 7 | 22 | 9 | 22 |
| 1 | 14 | 2 | 24 | 4 | 14 | 5 | 27 | 7 | 23 | 9 | 23 |
| 1 | 15 | 2 | 25 | 4 | 15 | 5 | 28 | 7 | 24 | 9 | 24 |
| 1 | 16 | 2 | 26 | 4 | 16 | 5 | 29 | 7 | 25 | 9 | 25 |

TABLE 13

| PO 0 | PO 1 | PO 0 | PO 1 | PO 0 | PO 1 | PO 0 | PO 1 |
|---|---|---|---|---|---|---|---|
| 9 | 26 | 11 | 30 | 14 | 27 | 18 | 26 |
| 9 | 27 | 11 | 31 | 14 | 28 | 18 | 27 |
| 9 | 28 | 11 | 32 | 14 | 29 | 18 | 28 |
| 9 | 29 | 12 | 20 | 14 | 30 | 18 | 29 |
| 9 | 30 | 12 | 21 | 14 | 31 | 18 | 30 |
| 9 | 31 | 12 | 22 | 14 | 32 | 18 | 31 |
| 9 | 32 | 12 | 23 | 15 | 23 | 18 | 32 |
| 10 | 18 | 12 | 24 | 15 | 24 | 19 | 27 |
| 10 | 19 | 12 | 25 | 15 | 25 | 19 | 28 |
| 10 | 20 | 12 | 26 | 15 | 26 | 19 | 29 |
| 10 | 21 | 12 | 27 | 15 | 27 | 19 | 30 |
| 10 | 22 | 12 | 28 | 15 | 28 | 19 | 31 |
| 10 | 23 | 12 | 29 | 15 | 29 | 19 | 32 |
| 10 | 24 | 12 | 30 | 15 | 30 | 20 | 28 |
| 10 | 25 | 12 | 31 | 15 | 31 | 20 | 29 |
| 10 | 26 | 12 | 32 | 15 | 32 | 20 | 30 |
| 10 | 27 | 13 | 21 | 16 | 24 | 20 | 31 |
| 10 | 28 | 13 | 22 | 16 | 25 | 20 | 32 |
| 10 | 29 | 13 | 23 | 16 | 26 | 21 | 29 |
| 10 | 30 | 13 | 24 | 16 | 27 | 21 | 30 |
| 10 | 31 | 13 | 25 | 16 | 28 | 21 | 31 |
| 10 | 32 | 13 | 26 | 16 | 29 | 21 | 32 |
| 11 | 19 | 13 | 27 | 16 | 30 | 22 | 30 |
| 11 | 20 | 13 | 28 | 16 | 31 | 22 | 31 |
| 11 | 21 | 13 | 29 | 16 | 32 | 22 | 32 |
| 11 | 22 | 13 | 30 | 17 | 25 | 23 | 31 |
| 11 | 23 | 13 | 31 | 17 | 26 | 23 | 32 |
| 11 | 24 | 13 | 32 | 17 | 27 | 24 | 32 |
| 11 | 25 | 14 | 22 | 17 | 28 | | |
| 11 | 26 | 14 | 23 | 17 | 29 | | |
| 11 | 27 | 14 | 24 | 17 | 30 | | |
| 11 | 28 | 14 | 25 | 17 | 31 | | |
| 11 | 29 | 14 | 26 | 17 | 32 | | |

In Table 12 and Table 13, the PO 0 indicates a slot index of a position of the first one of the two paging resources in the paging frame, and the PO 1 indicates a slot index of a position of the second one of the two paging resources in the paging frame.

Table 14 to Table 20 show positions of slot-based time domain resources when one paging frame includes two time domain resources and the subcarrier spacing is 1200 kHz.

TABLE 14

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 2 | 44 | 5 | 32 | 8 | 29 | 11 | 35 | 14 | 50 | 18 | 43 |
| 2 | 45 | 5 | 33 | 8 | 30 | 11 | 36 | 14 | 51 | 18 | 44 |
| 2 | 46 | 5 | 34 | 8 | 31 | 11 | 37 | 14 | 52 | 18 | 45 |

TABLE 14-continued

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 2 | 47 | 5 | 35 | 8 | 32 | 11 | 38 | 14 | 53 | 18 | 46 |
| 2 | 48 | 5 | 36 | 8 | 33 | 11 | 39 | 14 | 54 | 18 | 47 |
| 2 | 49 | 5 | 37 | 8 | 34 | 11 | 40 | 14 | 55 | 18 | 48 |
| 2 | 50 | 5 | 38 | 8 | 35 | 11 | 41 | 14 | 56 | 18 | 49 |
| 2 | 51 | 5 | 39 | 8 | 36 | 11 | 42 | 14 | 57 | 18 | 50 |
| 2 | 52 | 5 | 40 | 8 | 37 | 11 | 43 | 14 | 58 | 18 | 51 |
| 2 | 53 | 5 | 41 | 8 | 38 | 11 | 44 | 14 | 59 | 18 | 52 |
| 2 | 54 | 5 | 42 | 8 | 39 | 11 | 45 | 14 | 60 | 18 | 53 |
| 2 | 55 | 5 | 43 | 8 | 40 | 11 | 46 | 14 | 61 | 18 | 54 |
| 2 | 56 | 5 | 44 | 8 | 41 | 11 | 47 | 14 | 62 | 18 | 55 |
| 2 | 57 | 5 | 45 | 8 | 42 | 11 | 48 | 14 | 63 | 18 | 56 |
| 2 | 58 | 5 | 46 | 8 | 43 | 11 | 49 | 14 | 64 | 18 | 57 |

TABLE 15

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 2 | 59 | 5 | 47 | 8 | 44 | 11 | 50 | 15 | 31 | 18 | 58 |
| 2 | 60 | 5 | 48 | 8 | 45 | 11 | 51 | 15 | 32 | 18 | 59 |
| 2 | 61 | 5 | 49 | 8 | 46 | 11 | 52 | 15 | 33 | 18 | 60 |
| 2 | 62 | 5 | 50 | 8 | 47 | 11 | 53 | 15 | 34 | 18 | 61 |
| 2 | 63 | 5 | 51 | 8 | 48 | 11 | 54 | 15 | 35 | 18 | 62 |
| 2 | 64 | 5 | 52 | 8 | 49 | 11 | 55 | 15 | 36 | 18 | 63 |
| 3 | 19 | 5 | 53 | 8 | 50 | 11 | 56 | 15 | 37 | 18 | 64 |
| 3 | 20 | 5 | 54 | 8 | 51 | 11 | 57 | 15 | 38 | 19 | 35 |
| 3 | 21 | 5 | 55 | 8 | 52 | 11 | 58 | 15 | 39 | 19 | 36 |
| 3 | 22 | 5 | 56 | 8 | 53 | 11 | 59 | 15 | 40 | 19 | 37 |
| 3 | 23 | 5 | 57 | 8 | 54 | 11 | 60 | 15 | 41 | 19 | 38 |
| 3 | 24 | 5 | 58 | 8 | 55 | 11 | 61 | 15 | 42 | 19 | 39 |
| 3 | 25 | 5 | 59 | 8 | 56 | 11 | 62 | 15 | 43 | 19 | 40 |
| 3 | 26 | 5 | 60 | 8 | 57 | 11 | 63 | 15 | 44 | 19 | 41 |
| 3 | 27 | 5 | 61 | 8 | 58 | 11 | 64 | 15 | 45 | 19 | 42 |
| 3 | 28 | 5 | 62 | 8 | 59 | 12 | 28 | 15 | 46 | 19 | 43 |
| 3 | 29 | 5 | 63 | 8 | 60 | 12 | 29 | 15 | 47 | 19 | 44 |
| 3 | 30 | 5 | 64 | 8 | 61 | 12 | 30 | 15 | 48 | 19 | 45 |
| 3 | 31 | 6 | 22 | 8 | 62 | 12 | 31 | 15 | 49 | 19 | 46 |
| 3 | 32 | 6 | 23 | 8 | 63 | 12 | 32 | 15 | 50 | 19 | 47 |
| 3 | 33 | 6 | 24 | 8 | 64 | 12 | 33 | 15 | 51 | 19 | 48 |
| 3 | 34 | 6 | 25 | 9 | 25 | 12 | 34 | 15 | 52 | 19 | 49 |
| 3 | 35 | 6 | 26 | 9 | 26 | 12 | 35 | 15 | 53 | 19 | 50 |
| 3 | 36 | 6 | 27 | 9 | 27 | 12 | 36 | 15 | 54 | 19 | 51 |
| 3 | 37 | 6 | 28 | 9 | 28 | 12 | 37 | 15 | 55 | 19 | 52 |
| 3 | 38 | 6 | 29 | 9 | 29 | 12 | 38 | 15 | 56 | 19 | 53 |
| 3 | 39 | 6 | 30 | 9 | 30 | 12 | 39 | 15 | 57 | 19 | 54 |
| 3 | 40 | 6 | 31 | 9 | 31 | 12 | 40 | 15 | 58 | 19 | 55 |
| 3 | 41 | 6 | 32 | 9 | 32 | 12 | 41 | 15 | 59 | 19 | 56 |
| 3 | 42 | 6 | 33 | 9 | 33 | 12 | 42 | 15 | 60 | 19 | 57 |
| 3 | 43 | 6 | 34 | 9 | 34 | 12 | 43 | 15 | 61 | 19 | 58 |
| 3 | 44 | 6 | 35 | 9 | 35 | 12 | 44 | 15 | 62 | 19 | 59 |

TABLE 15-continued

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 3 | 45 | 6 | 36 | 9 | 36 | 12 | 45 | 15 | 63 | 19 | 60 |
| 3 | 46 | 6 | 37 | 9 | 37 | 12 | 46 | 15 | 64 | 19 | 61 |
| 3 | 47 | 6 | 38 | 9 | 38 | 12 | 47 | 16 | 32 | 19 | 62 |
| 3 | 48 | 6 | 39 | 9 | 39 | 12 | 48 | 16 | 33 | 19 | 63 |
| 3 | 49 | 6 | 40 | 9 | 40 | 12 | 49 | 16 | 34 | 19 | 64 |
| 3 | 50 | 6 | 41 | 9 | 41 | 12 | 50 | 16 | 35 | 20 | 36 |
| 3 | 51 | 6 | 42 | 9 | 42 | 12 | 51 | 16 | 36 | 20 | 37 |
| 3 | 52 | 6 | 43 | 9 | 43 | 12 | 52 | 16 | 37 | 20 | 38 |
| 3 | 53 | 6 | 44 | 9 | 44 | 12 | 53 | 16 | 38 | 20 | 39 |
| 3 | 54 | 6 | 45 | 9 | 45 | 12 | 54 | 16 | 39 | 20 | 40 |
| 3 | 55 | 6 | 46 | 9 | 46 | 12 | 55 | 16 | 40 | 20 | 41 |
| 3 | 56 | 6 | 47 | 9 | 47 | 12 | 56 | 16 | 41 | 20 | 42 |
| 3 | 57 | 6 | 48 | 9 | 48 | 12 | 57 | 16 | 42 | 20 | 43 |
| 3 | 58 | 6 | 49 | 9 | 49 | 12 | 58 | 16 | 43 | 20 | 44 |

TABLE 16

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 3 | 59 | 6 | 50 | 9 | 50 | 12 | 59 | 16 | 44 | 20 | 45 |
| 3 | 60 | 6 | 51 | 9 | 51 | 12 | 60 | 16 | 45 | 20 | 46 |
| 3 | 61 | 6 | 52 | 9 | 52 | 12 | 61 | 16 | 46 | 20 | 47 |
| 3 | 62 | 6 | 53 | 9 | 53 | 12 | 62 | 16 | 47 | 20 | 48 |
| 3 | 63 | 6 | 54 | 9 | 54 | 12 | 63 | 16 | 48 | 20 | 49 |
| 3 | 64 | 6 | 55 | 9 | 55 | 12 | 64 | 16 | 49 | 20 | 50 |
| 4 | 20 | 6 | 56 | 9 | 56 | 13 | 29 | 16 | 50 | 20 | 51 |
| 4 | 21 | 6 | 57 | 9 | 57 | 13 | 30 | 16 | 51 | 20 | 52 |
| 4 | 22 | 6 | 58 | 9 | 58 | 13 | 31 | 16 | 52 | 20 | 53 |
| 4 | 23 | 6 | 59 | 9 | 59 | 13 | 32 | 16 | 53 | 20 | 54 |
| 4 | 24 | 6 | 60 | 9 | 60 | 13 | 33 | 16 | 54 | 20 | 55 |
| 4 | 25 | 6 | 61 | 9 | 61 | 13 | 34 | 16 | 55 | 20 | 56 |
| 4 | 26 | 6 | 62 | 9 | 62 | 13 | 35 | 16 | 56 | 20 | 57 |
| 4 | 27 | 6 | 63 | 9 | 63 | 13 | 36 | 16 | 57 | 20 | 58 |
| 4 | 28 | 6 | 64 | 9 | 64 | 13 | 37 | 16 | 58 | 20 | 59 |
| 4 | 29 | 7 | 23 | 10 | 26 | 13 | 38 | 16 | 59 | 20 | 60 |
| 4 | 30 | 7 | 24 | 10 | 27 | 13 | 39 | 16 | 60 | 20 | 61 |
| 4 | 31 | 7 | 25 | 10 | 28 | 13 | 40 | 16 | 61 | 20 | 62 |
| 4 | 32 | 7 | 26 | 10 | 29 | 13 | 41 | 16 | 62 | 20 | 63 |
| 4 | 33 | 7 | 27 | 10 | 30 | 13 | 42 | 16 | 63 | 20 | 64 |
| 4 | 34 | 7 | 28 | 10 | 31 | 13 | 43 | 16 | 64 | 21 | 37 |
| 4 | 35 | 7 | 29 | 10 | 32 | 13 | 44 | 17 | 33 | 21 | 38 |
| 4 | 36 | 7 | 30 | 10 | 33 | 13 | 45 | 17 | 34 | 21 | 39 |
| 4 | 37 | 7 | 31 | 10 | 34 | 13 | 46 | 17 | 35 | 21 | 40 |
| 4 | 38 | 7 | 32 | 10 | 35 | 13 | 47 | 17 | 36 | 21 | 41 |
| 4 | 39 | 7 | 33 | 10 | 36 | 13 | 48 | 17 | 37 | 21 | 42 |

TABLE 17

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 22 | 52 | 27 | 55 | 34 | 52 | 2 | 20 | 4 | 52 | 7 | 46 | 10 | 49 |
| 22 | 53 | 27 | 56 | 34 | 53 | 2 | 21 | 4 | 53 | 7 | 47 | 10 | 50 |
| 22 | 54 | 27 | 57 | 34 | 54 | 2 | 22 | 4 | 54 | 7 | 48 | 10 | 51 |
| 22 | 55 | 27 | 58 | 34 | 55 | 2 | 23 | 4 | 55 | 7 | 49 | 10 | 52 |
| 22 | 56 | 27 | 59 | 34 | 56 | 2 | 24 | 4 | 56 | 7 | 50 | 10 | 53 |
| 22 | 57 | 27 | 60 | 34 | 57 | 2 | 25 | 4 | 57 | 7 | 51 | 10 | 54 |
| 22 | 58 | 27 | 61 | 34 | 58 | 2 | 26 | 4 | 58 | 7 | 52 | 10 | 55 |
| 22 | 59 | 27 | 62 | 34 | 59 | 2 | 27 | 4 | 59 | 7 | 53 | 10 | 56 |
| 22 | 60 | 27 | 63 | 34 | 60 | 2 | 28 | 4 | 60 | 7 | 54 | 10 | 57 |
| 22 | 61 | 27 | 64 | 34 | 61 | 2 | 29 | 4 | 61 | 7 | 55 | 10 | 58 |
| 22 | 62 | 28 | 44 | 34 | 62 | 2 | 30 | 4 | 62 | 7 | 56 | 10 | 59 |
| 22 | 63 | 28 | 45 | 34 | 63 | 2 | 31 | 4 | 63 | 7 | 57 | 10 | 60 |
| 22 | 64 | 28 | 46 | 34 | 64 | 2 | 32 | 4 | 64 | 7 | 58 | 10 | 61 |
| 23 | 39 | 28 | 47 | 35 | 51 | 2 | 33 | 5 | 21 | 7 | 59 | 10 | 62 |
| 23 | 40 | 28 | 48 | 35 | 52 | 2 | 34 | 5 | 22 | 7 | 60 | 10 | 63 |

TABLE 18

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 23 | 41 | 28 | 49 | 35 | 53 | 2 | 35 | 5 | 23 | 7 | 61 | 10 | 64 |
| 23 | 42 | 28 | 50 | 35 | 54 | 2 | 36 | 5 | 24 | 7 | 62 | 11 | 27 |
| 23 | 43 | 28 | 51 | 35 | 55 | 2 | 37 | 5 | 25 | 7 | 63 | 11 | 28 |
| 23 | 44 | 28 | 52 | 35 | 56 | 2 | 38 | 5 | 26 | 7 | 64 | 11 | 29 |
| 23 | 45 | 28 | 53 | 35 | 57 | 2 | 39 | 5 | 27 | 8 | 24 | 11 | 30 |
| 23 | 46 | 28 | 54 | 35 | 58 | 2 | 40 | 5 | 28 | 8 | 25 | 11 | 31 |
| 23 | 47 | 28 | 55 | 35 | 59 | 2 | 41 | 5 | 29 | 8 | 26 | 11 | 32 |
| 23 | 48 | 28 | 56 | 35 | 60 | 2 | 42 | 5 | 30 | 8 | 27 | 11 | 33 |
| 23 | 49 | 28 | 57 | 35 | 61 | 2 | 43 | 5 | 31 | 8 | 28 | 11 | 34 |
| 23 | 50 | 28 | 58 | 35 | 62 | 13 | 61 | 17 | 50 | 21 | 55 | 26 | 53 |
| 23 | 51 | 28 | 59 | 35 | 63 | 13 | 62 | 17 | 51 | 21 | 56 | 26 | 54 |
| 23 | 52 | 28 | 60 | 35 | 64 | 13 | 63 | 17 | 52 | 21 | 57 | 26 | 55 |
| 23 | 53 | 28 | 61 | 36 | 52 | 13 | 64 | 17 | 53 | 21 | 58 | 26 | 56 |
| 23 | 54 | 28 | 62 | 36 | 53 | 14 | 30 | 17 | 54 | 21 | 59 | 26 | 57 |
| 23 | 55 | 28 | 63 | 36 | 54 | 14 | 31 | 17 | 55 | 21 | 60 | 26 | 58 |
| 23 | 56 | 28 | 64 | 36 | 55 | 14 | 32 | 17 | 56 | 21 | 61 | 26 | 59 |
| 23 | 57 | 29 | 45 | 36 | 56 | 14 | 33 | 17 | 57 | 21 | 62 | 26 | 60 |
| 23 | 58 | 29 | 46 | 36 | 57 | 14 | 34 | 17 | 58 | 21 | 63 | 26 | 61 |
| 23 | 59 | 29 | 47 | 36 | 58 | 14 | 35 | 17 | 59 | 21 | 64 | 26 | 62 |
| 23 | 60 | 29 | 48 | 36 | 59 | 14 | 36 | 17 | 60 | 22 | 38 | 26 | 63 |
| 23 | 61 | 29 | 49 | 36 | 60 | 14 | 37 | 17 | 61 | 22 | 39 | 26 | 64 |
| 23 | 62 | 29 | 50 | 36 | 61 | 14 | 38 | 17 | 62 | 22 | 40 | 27 | 43 |
| 23 | 63 | 29 | 51 | 36 | 62 | 14 | 39 | 17 | 63 | 22 | 41 | 27 | 44 |
| 23 | 64 | 29 | 52 | 36 | 63 | 14 | 40 | 17 | 64 | 22 | 42 | 27 | 45 |
| 24 | 40 | 29 | 53 | 36 | 64 | 14 | 41 | 18 | 34 | 22 | 43 | 27 | 46 |
| 24 | 41 | 29 | 54 | 37 | 53 | 14 | 42 | 18 | 35 | 22 | 44 | 27 | 47 |
| 24 | 42 | 29 | 55 | 37 | 54 | 14 | 43 | 18 | 36 | 22 | 45 | 27 | 48 |
| 24 | 43 | 29 | 56 | 37 | 55 | 14 | 44 | 18 | 37 | 22 | 46 | 27 | 49 |
| 24 | 44 | 29 | 57 | 37 | 56 | 14 | 45 | 18 | 38 | 22 | 47 | 27 | 50 |
| 24 | 45 | 29 | 58 | 37 | 57 | 14 | 46 | 18 | 39 | 22 | 48 | 27 | 51 |
| 24 | 46 | 29 | 59 | 37 | 58 | 14 | 47 | 18 | 40 | 22 | 49 | 27 | 52 |
| 24 | 47 | 29 | 60 | 37 | 59 | 14 | 48 | 18 | 41 | 22 | 50 | 27 | 53 |
| 24 | 48 | 29 | 61 | 37 | 60 | 14 | 49 | 18 | 42 | 22 | 51 | 27 | 54 |
| 24 | 49 | 29 | 62 | 37 | 61 | 32 | 59 | 43 | 61 | 4 | 45 | 7 | 39 |
| 24 | 50 | 29 | 63 | 37 | 62 | 32 | 60 | 43 | 62 | 4 | 46 | 7 | 40 |
| 24 | 51 | 29 | 64 | 37 | 63 | 32 | 61 | 43 | 63 | 10 | 42 | 13 | 54 |
| 24 | 52 | 30 | 46 | 37 | 64 | 32 | 62 | 43 | 64 | 10 | 43 | 13 | 55 |
| 24 | 53 | 30 | 47 | 38 | 54 | 32 | 63 | 44 | 60 | 17 | 43 | 21 | 48 |
| 24 | 54 | 30 | 48 | 38 | 55 | 32 | 64 | 44 | 61 | 17 | 44 | 21 | 49 |
| 24 | 55 | 30 | 49 | 38 | 56 | 33 | 49 | 44 | 62 | 26 | 46 | 32 | 52 |
| 24 | 56 | 30 | 50 | 38 | 57 | 33 | 50 | 44 | 63 | 26 | 47 | 32 | 53 |
| 24 | 57 | 30 | 51 | 38 | 58 | 33 | 51 | 44 | 64 | 42 | 60 | 42 | 61 |
| 24 | 58 | 30 | 52 | 38 | 59 | 33 | 52 | 45 | 61 | 4 | 40 | 7 | 34 |
| 24 | 59 | 30 | 53 | 38 | 60 | 33 | 53 | 45 | 62 | 4 | 41 | 7 | 35 |
| 24 | 60 | 30 | 54 | 38 | 61 | 33 | 54 | 45 | 63 | 4 | 42 | 7 | 36 |
| 24 | 61 | 30 | 55 | 38 | 62 | 33 | 55 | 45 | 64 | 4 | 43 | 7 | 37 |

TABLE 19

| PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|
| 24 | 62 | 30 | 56 | 38 | 63 | 33 | 56 | 46 | 62 | 4 | 44 | 7 | 38 |
| 24 | 63 | 30 | 57 | 38 | 64 | 33 | 57 | 46 | 63 | 10 | 37 | 13 | 49 |
| 24 | 64 | 30 | 58 | 39 | 55 | 33 | 58 | 46 | 64 | 10 | 38 | 13 | 50 |
| 25 | 41 | 30 | 59 | 39 | 56 | 33 | 59 | 47 | 63 | 10 | 39 | 13 | 51 |
| 25 | 42 | 30 | 60 | 39 | 57 | 33 | 60 | 47 | 64 | 10 | 40 | 13 | 52 |
| 25 | 43 | 30 | 61 | 39 | 58 | 33 | 61 | 48 | 64 | 10 | 41 | 13 | 53 |
| 25 | 44 | 30 | 62 | 39 | 59 | 33 | 62 | 4 | 47 | 17 | 38 | 21 | 43 |
| 25 | 45 | 30 | 63 | 39 | 60 | 33 | 63 | 4 | 48 | 17 | 39 | 21 | 44 |
| 25 | 46 | 30 | 64 | 39 | 61 | 33 | 64 | 4 | 49 | 17 | 40 | 21 | 45 |
| 25 | 47 | 31 | 47 | 39 | 62 | 34 | 50 | 4 | 50 | 17 | 41 | 21 | 46 |
| 25 | 48 | 31 | 48 | 39 | 63 | 34 | 51 | 4 | 51 | 17 | 42 | 21 | 47 |
| 25 | 49 | 31 | 49 | 39 | 64 | 7 | 41 | 10 | 44 | 25 | 64 | 31 | 64 |
| 25 | 50 | 31 | 50 | 40 | 56 | 7 | 42 | 10 | 45 | 26 | 42 | 32 | 48 |
| 25 | 51 | 31 | 51 | 40 | 57 | 7 | 43 | 10 | 46 | 26 | 43 | 32 | 49 |
| 25 | 52 | 31 | 52 | 40 | 58 | 7 | 44 | 10 | 47 | 26 | 44 | 32 | 50 |
| 25 | 53 | 31 | 53 | 40 | 59 | 7 | 45 | 10 | 48 | 26 | 45 | 32 | 51 |
| 25 | 54 | 31 | 54 | 40 | 60 | 13 | 56 | 17 | 45 | 41 | 62 | 32 | 54 |
| 25 | 55 | 31 | 55 | 40 | 61 | 13 | 57 | 17 | 46 | 41 | 63 | 32 | 55 |
| 25 | 56 | 31 | 56 | 40 | 62 | 13 | 58 | 17 | 47 | 41 | 64 | 32 | 56 |
| 25 | 57 | 31 | 57 | 40 | 63 | 13 | 59 | 17 | 48 | 42 | 58 | 32 | 57 |
| 25 | 58 | 31 | 58 | 40 | 64 | 13 | 60 | 17 | 49 | 42 | 59 | 32 | 58 |
| 25 | 59 | 31 | 59 | 41 | 57 | 21 | 50 | 26 | 48 | 42 | 62 | 0 | 33 |

TABLE 19-continued

| PO 0 | PO 1 | PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|---|---|
| 25 | 60 | 31 | 60 | 41 | 58 | 21 | 51 | 26 | 49 | 42 | 63 | 0 | 41 |
| 25 | 61 | 31 | 61 | 41 | 59 | 21 | 52 | 26 | 50 | 42 | 64 | 0 | 43 |
| 25 | 62 | 31 | 62 | 41 | 60 | 21 | 53 | 26 | 51 | 43 | 59 | 0 | 45 |
| 25 | 63 | 31 | 63 | 41 | 61 | 21 | 54 | 26 | 52 | 43 | 60 | | |

TABLE 20

| PO 0 | PO 1 | PO 0 | PO 1 | PO 0 | PO 1 | PO 0 | PO 1 | PO 0 | PO 1 | PO 0 | PO 1 | PO 0 | PO 1 |
|---|---|---|---|---|---|---|---|---|---|---|---|---|---|
| 0 | 16 | 0 | 46 | 1 | 29 | 1 | 59 | 0 | 62 | 1 | 45 | 2 | 29 |
| 0 | 17 | 0 | 47 | 1 | 30 | 1 | 60 | 0 | 63 | 1 | 46 | 2 | 30 |
| 0 | 18 | 0 | 48 | 1 | 31 | 1 | 61 | 1 | 17 | 1 | 47 | 2 | 31 |
| 0 | 19 | 0 | 49 | 1 | 32 | 1 | 62 | 1 | 18 | 1 | 48 | 2 | 32 |
| 0 | 20 | 0 | 50 | 1 | 33 | 1 | 63 | 1 | 19 | 1 | 49 | 2 | 33 |
| 0 | 21 | 0 | 51 | 1 | 34 | 2 | 18 | 1 | 20 | 1 | 50 | 2 | 34 |
| 0 | 22 | 0 | 52 | 1 | 35 | 2 | 19 | 1 | 21 | 1 | 51 | 2 | 35 |
| 0 | 23 | 0 | 53 | 1 | 36 | 2 | 20 | 1 | 22 | 1 | 52 | 2 | 36 |
| 0 | 24 | 0 | 54 | 1 | 37 | 2 | 21 | 1 | 23 | 1 | 53 | 2 | 37 |
| 0 | 25 | 0 | 55 | 1 | 38 | 2 | 22 | 1 | 24 | 1 | 54 | 2 | 38 |
| 0 | 26 | 0 | 56 | 1 | 39 | 2 | 23 | 1 | 25 | 1 | 55 | 2 | 39 |
| 0 | 27 | 0 | 57 | 1 | 40 | 2 | 24 | 1 | 26 | 1 | 56 | 2 | 40 |
| 0 | 28 | 0 | 58 | 1 | 41 | 2 | 25 | 1 | 27 | 1 | 57 | 2 | 41 |
| 0 | 29 | 0 | 59 | 1 | 42 | 2 | 26 | 1 | 28 | 1 | 58 | 2 | 42 |
| 0 | 30 | 0 | 60 | 1 | 43 | 2 | 27 | 0 | 34 | 0 | 36 | 0 | 38 |
| 0 | 31 | 0 | 61 | 1 | 44 | 2 | 28 | 0 | 35 | 0 | 37 | 0 | 39 |
| 0 | 32 | 0 | 40 | 0 | 42 | 0 | 44 | | | | | | |

In Table 14 to Table 20, the PO 0 indicates a slot index of a position of the first one of the two paging resources in the paging frame, and the PO 1 indicates a slot index of a position of the second one of the two paging resources in the paging frame.

In addition, in the foregoing embodiment, the terminal device may directly determine a location of the start position or time domain position of the target paging occasion in the paging frame. The quantity of time domain units included in each of the M time domain resources is known to the terminal device. Therefore, in other embodiments, the terminal device may also determine a position of any time domain unit in each time domain resource in the paging frame. In this way, the terminal device can indirectly determine the location of the start position or time domain position of the target paging occasion in the paging frame.

The 15 kHz subcarrier spacing is used as an example. M is equal to 1. It is assumed that each time domain resource includes three time domain units. Each time domain unit is a slot. If the terminal device determines that a second time domain unit in the time domain resource is the slot 1, the terminal device may determine that the start position of the target paging occasion is the slot 0.

Optionally, in some embodiments, positions of the M time domain resources may also be related to a half-frame indication. When the terminal device itself determines the start position or time domain position of the target paging occasion in the paging frame, the terminal device may also determine the start position or time domain position of the target paging occasion in the paging frame based on the half-frame indication sent by the network device. The half-frame indication is used to indicate a position of an SSB or a synchronization signal burst set.

Optionally, in some embodiments, the positions of the M time domain resources may also be related to a frequency division multiplexing indication of the paging message and the SS block. When the terminal device itself determines the start position or time domain position of the target paging occasion in the paging frame, the terminal device may also determine the start position or time domain position of the target paging occasion in the paging frame based on the frequency division multiplexing indication sent by the network device.

For example, if the half-frame indication is 0, a start position of the SSB or the synchronization signal burst set is in the second half-frame of the paging frame. Correspondingly, the start position or time domain position of the target paging occasion in the paging frame may be located in the second half-frame. For another example, if the half-frame indication is 1, a start position of the SSB or the synchronization signal burst set is in the first half-frame of the paging frame. Correspondingly, the start position or time domain position of the target paging occasion in the paging frame may be located in the first half-frame.

For example, if the half-frame indication is 0, the start position of the SSB or the synchronization signal burst set is in the first half-frame of the paging frame. Correspondingly, the start position or time domain position of the target paging occasion in the paging frame may be located in the first half-frame. For another example, if the half-frame indication is 1, the start position of the SSB or the synchronization signal burst set is in the second half-frame of the paging frame. Correspondingly, the start position or time domain position of the target paging occasion in the paging frame may be located in the second half-frame.

Optionally, in some embodiments, when a plurality of paging occasions exist in one paging frame, an index of a PO in frequency division multiplexing with an SSB in the frame may be predefined. For example, the first PO in frequency division multiplexing with the SSB in the frame may be defined; the second PO in frequency division multiplexing with the SSB in the frame may be defined; the third PO in frequency division multiplexing with the SSB in the frame may be defined; or the fourth PO in frequency division multiplexing with the SSB in the frame may be defined. Further, the definition may be based on a position of the SSB. For example, when the SSB is in the first half-frame, and a quantity of POs is 4, the first PO whose index is 0 or the second PO whose index is 1 may be defined as a PO in frequency division multiplexing with the SSB; or when the SSB is in the second half-frame, and a quantity of POs is 4, the third PO whose index is 2 or the fourth PO whose index is 3 may be defined as a PO in frequency division multiplexing with the SSB. When a quantity of POs in the frame is 2, the first PO whose index is 0 or the second PO whose index is 1 may be defined as a PO in frequency division multiplexing with the SSB. Further, the definition may be based on the position of the SSB. For example, when the SSB is in the first half-frame, the first PO whose index is 0 may be defined as a PO in frequency division multiplexing with the SSB. For example, when the SSB is in the second half-frame, the second PO whose index is 1 may be defined as a PO in frequency division multiplexing with the SSB.

Optionally, in some embodiments, when the start position or time domain position of the target paging occasion in the paging frame is in the first half-frame, the start position or time domain position of the target paging occasion in the paging frame may start from subframe 0 (for example, may be the subframe 0). When the start position or time domain position of the target paging occasion in the paging frame is in the second half-frame, the start position or time domain position of the target paging occasion in the paging frame may start from subframe 5 (for example, may be the subframe 5). Optionally, in other embodiments, when the subcarrier spacing is 15 kHz, when the start position or time domain position of the target paging occasion in the paging frame is in the first half-frame, the start position or time domain position of the target paging occasion in the paging frame may start from the slot 0 (for example, may be the slot 0); or when the start position or time domain position of the target paging occasion in the paging frame is in the second half-frame, the start position or time domain position of the target paging occasion in the paging frame may start from the slot 5 (for example, may be the slot 5). When the subcarrier spacing is 30 kHz, when the start position or time domain position of the target paging occasion in the paging frame is in the first half-frame, the start position or time domain position of the target paging occasion in the paging frame may start from the slot 0 (for example, may be the slot 0); or when the start position or time domain position of the target paging occasion in the paging frame is in the second half-frame, start positions of the M time domain resources may start from the slot to (for example, may be the slot 10). When the subcarrier spacing is 60 kHz, when the start position or time domain position of the target paging occasion in the paging frame is in the first half-frame, the start position or time domain position of the target paging occasion in the paging frame may start from the slot 0 (for example, may be the slot 0); or when the start position or time domain position of the target paging occasion in the paging frame is in the second half-frame, the start positions of the M time domain resources may start from the slot 20 (for example, may be the slot 20). When the subcarrier spacing is 1200 kHz, when the start position or time domain position of the target paging occasion in the paging frame is in the first half-frame, the start position or time domain position of the target paging occasion in the paging frame may start from the slot 0 (for example, may be the slot 0); or when the start position or time domain position of the target paging occasion in the paging frame is in the second half-frame, the start position or time domain position of the target paging occasion in the paging frame may start from the slot 40 (for example, may be the slot 40).

Certainly, the start position or time domain position of the target paging occasion in the paging frame may also start from another subframe, and is not related to the half-frame indication.

Optionally, in some embodiments, when a period of the synchronization signal burst set in the system is 5 ms, the start position or time domain position of the target paging occasion in the paging frame may start from the subframe 0 (for example, may be the subframe 0), or the start position or time domain position of the target paging occasion in the paging frame may start from the subframe 5 (for example, may be the subframe 5). Optionally, in other embodiments, when the subcarrier spacing is 15 kHz, the start position or time domain position of the target paging occasion in the paging frame may start from the slot 0 (for example, may be the slot 0), or the start position or time domain position of the target paging occasion in the paging frame may start from the slot 5 (for example, may be the slot 5). When the subcarrier spacing is 30 kHz, the start position or time domain position of the target paging occasion in the paging frame may start from the slot 0 (for example, may be the slot 0), or the start positions of the M time domain resources may start from the slot to (for example, may be the slot 10). When the subcarrier spacing is 60 kHz, the start position or time domain position of the target paging occasion in the paging frame may start from the slot 0 (for example, may be the slot 0), or the start positions of the M time domain resources may start from the slot 20 (for example, may be the slot 20).

When the subcarrier spacing is 120 kHz, the start position or time domain position of the target paging occasion in the paging frame may start from the slot 0 (for example, may be the slot 0), or the start position or time domain position of the target paging occasion in the paging frame may start from the slot 40 (for example, may be the slot 40).

By using the half-frame indication, the terminal device may also determine the start position of the SSB or the synchronization signal burst set, and the PO may use a same time domain resource as the SSB or the synchronization signal burst set in a time division multiplexing manner.

Optionally, in other embodiments, the terminal device may further determine the start position or duration of the target paging occasion in the paging frame based on paging position information sent by the network device. The paging position information is used to indicate the time domain position of the target paging occasion in the paging frame.

The paging position information is related to at least one of the subcarrier spacing, the time domain position of the synchronization signal block actually sent by the network device, and the time domain position of the candidate synchronization signal block; or in other words, time domain positions of the M time domain resources in the paging frame are related to at least one of the subcarrier spacing, the time domain position of the synchronization signal block actually sent by the network device, and the time domain position of the candidate synchronization signal block.

Optionally, in some embodiments, the paging position information may include a location of the start position of the first one of the M time domain resources in the paging frame. When M is a positive integer greater than 1, quantities of time domain units included in any two of the M time domain resources are the same. In other words, the paging position information may indicate, by indicating the time domain positions of the M time domain resources in the paging frame, the time domain position of the target paging occasion in the paging frame.

Optionally, in some embodiments, the value of M and the quantity of time domain units included in each of the M time domain resources are known to the terminal device.

Optionally, in some embodiments, the specific time domain position of the target paging occasion in the M time domain positions is also known to the terminal device.

The "known" in this application may be that configuration information is notified in advance to the terminal device by the network device, or information is agreed upon by the network device and the terminal device, or specified in a protocol, or derived by the terminal device based on a configuration parameter.

Optionally, in other embodiments, the value of M and a total length of the M time domain resources are known to the terminal device. In this way, the terminal device can determine, based on the value of M and the total length of the M time domain resources, the quantity of time domain units included in each time domain resource.

When M is equal to 1, the paging position information is the start position of the target paging occasion in the paging frame. The terminal device may directly determine the start position of the target paging occasion in the paging frame based on the paging position information.

When M is equal to 2 or equal to 4, when the terminal device determines the start position of the first time domain resource in the paging frame, the terminal device may determine the start position of the target paging occasion in the paging frame based on the time domain resource on which the target paging occasion is located.

Optionally, in some embodiments, the M time domain resources may be consecutive time domain resources. In this way, when the location of the start position of the first time domain resource in the paging frame is determined, the terminal device may determine a location of the start position of each time domain resource in the paging frame by using the following formula:

$$PO_{i\_s} = O + i\_s \times Length\_PO \qquad \text{Formula 1.1}$$

where $PO_{i\_s}$ denotes a location of a start position of a time domain resource whose index is i_s in the paging frame, O denotes the location of the start position of the first time domain resource in the paging frame, i_s is an index of a time domain resource, and Length_PO is a quantity of time domain units included in one time domain resource. An index of the $m^{th}$ time domain resource in the M time domain resources is m−1, where m=1, . . . , M. For example, an index of the first time domain resource is 0, an index of the second time domain resource is 1, an index of the third time domain resource is 2, and an index of the fourth time domain resource is 3. It may be understood that, if i_s in Formula 1.1 is an index of the time domain resource on which the target paging occasion is located, the terminal device may directly determine the position of the target paging occasion in the paging frame by using Formula 1.1.

The 15 kHz subcarrier spacing is used as an example. It is assumed that M is equal to 2, and that each time domain resource includes two time domain units. The two time domain resources are consecutive time domain resources. It is assumed that the paging position information indicates that the start position of the first time domain resource is the slot 0. According to Formula 1.1, O is equal to 0, Length_PO is equal to 2, and i_s is equal to 1. In this way, the terminal device can determine that the start position of the second time domain resource is the slot 2.

Optionally, in other embodiments, the M time domain resources may be M inconsecutive time domain resources. The M inconsecutive time domain resources are M time domain resources in P consecutive time domain resources. Other time domain resources in the P consecutive time domain resources than the M time domain resources have been determined for transmitting information other than a paging message. The information other than the paging message may be uplink information or may be other downlink information (for example, an SSB). P is a positive integer greater than M.

In this way, when the location of the start position of the first time domain resource in the paging frame is determined, the terminal device may determine a location of the start position of each time domain resource in the paging frame by using the following formula:

$$PO_{i\_s} = O + i\_s \times Length\_PO + Length\_offset_{i\_s} \qquad \text{Formula 1.2}$$

where $PO_{i\_s}$ denotes a location of a start position of a time domain resource whose index is i_s in the paging frame, O denotes the location of the start position of the first time domain resource in the paging frame, i_s is an index of a time domain resource, Length_PO is a quantity of time domain units included in one time domain resource, and Length_offset$_{i\_s}$ denotes a quantity of time domain units that are between the start position of the time domain resource whose index is i_s and a time domain resource whose index is i_s−1 and are used for transmitting other information. It may be understood that, if i_s in Formula 1.2 is an index of the time domain resource on which the target paging occasion is located, the terminal device may directly determine the position of the target paging occasion in the paging frame by using Formula 1.2.

The 15 kHz subcarrier spacing is still used as an example. It is assumed that M is equal to 2, and that each time domain resource includes two time domain units. The terminal device has determined that the slot 2 to the slot 5 are used for transmitting information other than a paging message. It is assumed that the paging position information indicates that the start position of the first time domain resource is the slot 0. According to Formula 1.2, O is equal to 0, Length_PO is equal to 2, and Length_offset$_{i\_s}$ is equal to 4. In this way, the terminal device can determine that the start position of the second time domain resource is the slot 6.

Optionally, in some embodiments, the paging position information may include the total length of the M time domain resources. In addition, the location of the start position or time domain position of the first time domain resource is known to the terminal device. In addition, when M is a positive integer greater than 1, quantities of time domain units included in any two of the M time domain resources are the same.

Optionally, in some embodiments, the value of M is known to the terminal device. In this way, the terminal device can determine, based on the total length of the M time domain resources and the value of M, the quantity of time domain units included in each time domain resource. In this case, the start positions or time domain positions of the M time domain resources, the quantity of time domain units included in each time domain resource, and indexes of the time domain resources are all known to the terminal device. When the M time domain resources are M consecutive time domain resources, the terminal device may determine the time domain position of the target paging occasion in the paging frame by using Formula 1.1. When the M time domain resources are M inconsecutive time domain resources, the terminal device may determine the time domain position of the target paging occasion in the paging frame by using Formula 1.2.

Optionally, in other embodiments, the quantity of time domain units included in each of the M time domain resources is known to the terminal device. In this way, the terminal device can determine an index of each time domain resource based on the total length of the M time domain resources and the quantity of time domain units included in each of the M time domain resources. In this case, the start positions or time domain positions of the M time domain resources, the quantity of time domain units included in each time domain resource, and indexes of the time domain resources are all known to the terminal device. When the M time domain resources are M consecutive time domain resources, the terminal device may determine the time domain position of the target paging occasion in the paging frame by using Formula 1.1. When the M time domain resources are M inconsecutive time domain resources, the terminal device may determine the time domain position of the target paging occasion in the paging frame by using Formula 1.2.

Optionally, in some embodiments, the paging position information may include the total length of the M time domain resources and the location of the start position or time domain position of the first one of the M time domain resources in the paging frame. The value of M or the quantity of time domain units included in each time domain resource is known to the terminal device. In addition, when M is a positive integer greater than 1, quantities of time domain units included in any two of the M time domain resources are the same.

In this case, the terminal device may determine the start positions of the M time domain resources, the quantity of time domain units included in each of the M time domain resources, and the indexes of the time domain resources. When the M time domain resources are M consecutive time domain resources, the terminal device may determine the time domain position of the target paging occasion in the paging frame by using Formula 1.1. When the M time domain resources are M inconsecutive time domain resources, the terminal device may determine the time domain position of the target paging occasion in the paging frame by using Formula 1.2.

When the paging position information includes the total length of the M time domain resources and/or the location of the start position of the first one of the M time domain resources in the paging frame, the network device may indicate the positions of the M time domain resources in the paging frame by using fewer bits.

Optionally, in other embodiments, the paging position information may include the location of the start position or time domain position of each of the M time domain resources in the paging frame. In this way, the terminal device can directly determine the position of each time domain resource in the paging frame, without calculating the position of each time domain resource in the paging frame by itself. In this case, the configured position of the paging occasion in the paging frame may be determined based on a quantity of paging occasions in a discontinuous reception cycle. For example, when the quantity of paging occasions is 4, $k_1$ bits are required for indicating a position of each PO, where $k_1$ is a positive integer greater than or equal to 1. A value of $k_1$ is related to the subcarrier spacing. When the quantity of paging occasions is 4, the paging position information may include $4*k_1$ bits (* denotes a multiplication sign). For example, if the subcarrier spacing is 15 kHz, the value of $k_1$ may be 2 bits; or if the subcarrier spacing is 30 kHz, the value of $k_1$ may be 3 or 4. When the subcarrier spacing is 60 kHz or 120 kHz, the value of $k_1$ may be 3 or 4.

It may be understood that, a length of the paging position information is related to a maximum quantity of candidate positions for a start position or time domain position of each slot in the paging frame, and the value of M.

The 15 kHz subcarrier spacing is used as an example. It is assumed that the value of M is 4.

Optionally, in some embodiments, the start position or time domain position of the first time domain resource may be the slot 0 to the slot 6. The start position or time domain position of the second time domain resource may be located in the slot 1 to the slot 7. The start position or time domain position of the third time domain resource may be located in the slot 2 to the slot 8. The start position or time domain position of the fourth time domain resource may be located in the slot 2 to the slot 8. As can be seen, in the paging frame, there are six candidate positions for each time domain resource. In this case, the location of the start position or time domain position of each time domain resource in the paging frame may be indicated by using three bits.

Optionally, in other embodiments, the start position or time domain position of the first time domain resource may be located in the slot 0 to the slot 3. The start position or time domain position of the second time domain resource may be located in the slot 2 to the slot 5. The start position or time domain position of the third time domain resource may be located in the slot 4 to the slot 7. The start position or time domain position of the fourth time domain resource may be located in the slot 5 to the slot 8. As can be seen, in the paging frame, there are four candidate positions for each time domain resource. In this case, the location of the start position or time domain position of each time domain resource in the paging frame may be indicated by using two bits.

Optionally, in some embodiments, the position of each of the M time domain resources may also be related to the half-frame indication. In other words, the location of the start position or time domain position of each of the M time domain resources in the paging frame may be indicated by using the half-frame indication and a specific position indication jointly.

For example, in some embodiments, the paging position information may include three bits. The first one of the three bits is the half-frame indication. The half-frame indication is used to indicate that the start position or time domain position of the time domain resource is located in the first half-frame or the second half-frame, and the last two of the three bits are the specific position indication. The specific position indication may be used to indicate a specific time domain unit of a half-frame in which the start position or time domain position of the time domain resource is located.

Optionally, in some embodiments, the half-frame indication and the specific position indication may be a plurality of consecutive bits. In other words, the network device may use a message to carry the half-frame indication and the specific position indication.

Optionally, in other embodiments, the half-frame indication and the specific position indication may be indicated to the terminal device separately. In other words, the network device may indicate the half-frame indication and the specific position indication to the terminal device by using two messages.

Specifically, if the half-frame indication is 0, the indicated start position or time domain position of the time domain resource is located in the first half-frame of the paging frame, that is, the slot 0 to the slot 4; or if the half-frame indication is 1, the indicated start position or time domain position of the time domain resource is located in the second half-frame of the paging frame, that is, the slot 5 to the slot 9. If the specific position indication is 00, the indicated start position or time domain position of the time domain resource is located in the first slot; if the specific position indication is 0, the indicated start position or time domain position of the time domain resource is located in the second slot; if the specific position indication is to, the indicated start position or time domain position of the time domain resource is located in the third slot; or if the specific position indication is 11, the indicated start position or time domain position of the time domain resource is located in the fourth slot.

For example, if the paging position information is 010, the indicated start position or time domain position of the time domain resource is the third slot in the first half-frame, that is, the slot 2. For another example, if the paging position information is 110, the indicated start position or time domain position of the time domain resource is the third slot in the second half-frame, that is, the slot 7.

The 15 kHz subcarrier spacing is still used as an example. It is assumed that the value of M is 2.

Optionally, in some embodiments, the start position or time domain position of the first time domain resource may be the slot 0 to the slot 8, and the start position or time domain position of the second time domain resource may be the slot 2 to the slot 8. As can be seen, in the paging frame, there are a maximum of nine candidate positions for each time domain resource. In this case, the location of the start position or time domain position of each time domain resource in the paging frame may be indicated by using four bits.

Optionally, in other embodiments, the start position or time domain position of the first time domain resource may be the slot 0 to the slot 3. The start position or time domain position of the second time domain resource may be located in the slot 5 to the slot 8. As can be seen, in the paging frame, there are four candidate positions for each time domain resource. In this case, the location of the start position or time domain position of each time domain resource in the paging frame may be indicated by using two bits.

Similarly, when the value of M is 2, the start position or time domain position of each time domain resource in the paging frame may also be indicated by using the half-frame indication and the specific position indication jointly. A specific implementation is similar to the implementation in which the value of M is 4. Details are not described herein again.

Optionally, in other embodiments, locations of start positions or time domain positions of the two time domain resources in the paging frame may be specified in advance. For example, it is specified in advance that the start position or time domain position of either of the two time domain resources in the paging frame is located in the slot 0 to the slot 3. In this way, two bits can be used to indicate the location of the start position or time domain position of either of the two time domain resources in the paging frame. For another example, it is specified in advance that the start position or time domain position of either of the two time domain resources is located in the first half-frame of the paging frame, that is, the slot 0 to the slot 4. In this way, three bits can be used to indicate the location of the start position or time domain position of either of the two time domain resources in the paging frame. For another example, it is specified in advance that the start position or time domain position of either of the two time domain resources is located in the second half-frame of the paging frame, that is, the slot 5 to the slot 9. In this way, three bits can be used to indicate the location of the start position or time domain position of either of the two time domain resources in the paging frame. For another example, it is specified in advance that the start position or time domain position of the first one of the two time domain resources is located in the first half-frame of the paging frame, that is, the slot 0 to the slot 4. In this way, three bits can be used to indicate the location of the start position or time domain position of the first time domain resource in the paging frame. In addition, it is specified in advance that the start position or time domain position of the second one of the two time domain resources is located in the second half-frame of the paging frame, that is, the slot 5 to the slot 9. In this way, three bits can be used to indicate the location of the start position or time domain position of the second time domain resource in the paging frame.

The start position of the paging occasion is related to the frequency division multiplexing indication of the SSB. When there is only one PO, a start position of the PO may not be configured. When there are two POs, a start position of one PO may be configured.

The 15 kHz subcarrier spacing is still used as an example. It is assumed that the value of M is 1.

Optionally, in some embodiments, the start position or time domain position of the first time domain resource may be the slot 0 to the slot 8. As can be seen, in the paging frame, there are a maximum of nine candidate positions for each time domain resource. In this case, the location of the start position or time domain position of each time domain resource in the paging frame may be indicated by using four bits.

Optionally, in other embodiments, the start position or time domain position of the first time domain resource may be the slot 0 to the slot 7. As can be seen, in the paging frame, there are eight candidate positions for each time domain resource. In this case, the location of the start position or time domain position of each time domain resource in the paging frame may be indicated by using two bits.

Optionally, in other embodiments, the start position or time domain position of the first time domain resource may be the slot 0 to the slot 3. As can be seen, in the paging frame, there are four candidate positions for each time domain resource. In this case, the location of the start position or time domain position of each time domain resource in the paging frame may be indicated by using two bits.

The 30 kHz subcarrier spacing is used as an example. It is assumed that the value of M is 1.

Optionally, in some embodiments, the start position or time domain position of the first time domain resource may be located in the slot 0 to the slot 18. The paging position information may directly indicate the position of the first time domain resource. In this case, the length of the paging position information is five bits.

Optionally, in some embodiments, the paging position information may indicate the position of the first time domain resource by using the half-frame indication and the specific position indication jointly. For a specific implementation, refer to the example in which the subcarrier spacing is 15 kHz and the value of M is 4. Details are not described herein again.

Optionally, in other embodiments, the location of the start position or time domain position of the time domain resource in the paging frame may be preset. For example, it is specified in advance that the start position or time domain position of the time domain resource in the paging frame is located in the slot 0 to the slot 7. In this way, three bits can be used to indicate the location of the start position or time domain position of the time domain resource in the paging frame. For another example, it is specified in advance that the start position or time domain position of the time domain resource in the paging frame is located in the slot 10 to the slot 17. In this way, three bits can be used to indicate the location of the start position or time domain position of the time domain resource in the paging frame.

An implementation in which the subcarrier spacing is 30 kHz and the value of M is 2 is similar to the specific implementation in which the subcarrier spacing is 15 kHz and the value of M is 2. Details are not described herein again. An implementation in which the subcarrier spacing is 30 kHz and the value of M is 4 is similar to the specific implementation in which the subcarrier spacing is 15 kHz and the value of M is 4. Details are not described herein again.

An implementation in which the subcarrier spacing is 60 kHz or 1200 kHz is similar to the implementation in which the subcarrier spacing is 15 kHz or 30 kHz. Details are not described herein again.

Optionally, in some embodiments, the paging position information includes a paging position index, where the paging position index is used to indicate the time domain positions of the M time domain resources in the paging frame. More specifically, the paging position index is used to indicate the location of the start position of each of the M time domain resources in the paging frame.

In the positions of the time domain resources shown in Table 1 to Table 20, positions of time domain resources in each group may correspond to one index. One group of time domain resources indicates all of M time domain resources. One paging position index may be allocated to each group of time domain resources based on Table 1 to Table 21. Each paging position index corresponds to positions of M time domain resources in a paging frame. For example, Table 21 is a result obtained by adding a paging position index based on Table 1.

TABLE 21

| Index | PO 0 | PO 1 | PO 2 | PO 3 |
|---|---|---|---|---|
| 0 | 0 | 2 | 4 | 6 |
| 1 | 0 | 2 | 4 | 7 |
| 2 | 0 | 2 | 4 | 8 |
| 3 | 0 | 2 | 5 | 7 |
| 4 | 0 | 2 | 5 | 8 |
| 5 | 0 | 2 | 6 | 8 |
| 6 | 0 | 3 | 5 | 7 |
| 7 | 0 | 3 | 5 | 8 |
| 8 | 0 | 3 | 6 | 8 |
| 9 | 0 | 4 | 6 | 8 |
| 10 | 1 | 3 | 5 | 7 |
| 11 | 1 | 3 | 5 | 8 |
| 12 | 1 | 3 | 6 | 8 |
| 13 | 1 | 4 | 6 | 8 |
| 14 | 2 | 4 | 6 | 8 |
| 15 | 1 | 3 | 6 | 8 |

As shown in Table 21, when the paging position index received by the terminal device is 4, the terminal device may determine that the start positions of the four time domain resources are distributed in subframes 0, 2, 5, and 8.

The paging position information includes at least one of the start position and duration of the target paging occasion in the paging frame.

When a control resource set of a paging message is the same as a control resource set of RMSI, a maximum quantity of paging occasions in one frame or two frames is 1. This is to satisfy a requirement of beam sweeping. When a multiplexing manner of the SSB and the RMSI is frequency division multiplexing, a maximum quantity of paging occasions in the paging message in the DRX cycle may be determined based on a period of the SSB or a period of the RMSI. The frequency division multiplexing manner may be a pattern 1 and a pattern 2. To be specific, the pattern 1 is frequency division multiplexing of a PDSCH of the RMSI with the SSB. To be specific, the pattern 2 is frequency division multiplexing of a PDSCH and a PDCCH of the RMSI with the SSB. The RMSI may also be a SIB1. When the multiplexing manner of the SSB and the RMSI is time division multiplexing, a maximum quantity of paging occasions in the paging message in the DRX cycle may be determined based on the period of the RMSI. In time division multiplexing, a maximum quantity of paging occasions or paging frames in the DRX cycle is T/2, where T is the DRX cycle. In some implementations, the DRX cycle T is determined, for example, defined in the system, preconfigured, configured by a base station or sent by a base station. In this case, a quantity of frames included in the DRX cycle T is also determined. Alternatively, two frames may be one paging frame or two frames include one paging occasion. In frequency division multiplexing, maximum quantities of paging occasions or paging frames in the DRX cycle are 2T, T, T/2, T/4, T/8, and T/16. When the period of the SSB is 5 ms, a maximum quantity of paging occasions or paging frames in the DRX cycle is 2T. When the period of the SSB is to ms, a maximum quantity of paging occasions or paging frames in the DRX cycle is T. When the period of the SSB is 20 ms, a maximum quantity of paging occasions or paging frames in the DRX cycle is T/2. When the period of the SSB is 40 ms, a maximum quantity of paging occasions or paging frames in the DRX cycle is T/4. When the period of the SSB is 80 ms, a maximum quantity of paging occasions or paging frames in the DRX cycle is T/8. When the period of the SSB is 160 ms, a maximum quantity of paging occasions or paging frames in the DRX cycle is T/16. In frequency division multiplexing, quantities of paging occasions or paging frames in the DRX cycle are 2T, T, T/2, T/4, T/8, and T/16. When the period of the SSB is 5 ms, a quantity of paging occasions or paging frames in the DRX cycle is 2T. When the period of the SSB is to ms, a quantity of paging occasions or paging frames in the DRX cycle is T. When the period of the SSB is 20 ms, a quantity of paging occasions or paging frames in the DRX cycle is T/2. When the period of the SSB is 40 ms, a quantity of paging occasions or paging frames in the DRX cycle is T/4. When the period of the SSB is 800 ms, a quantity of paging occasions or paging frames in the DRX cycle is T/8. When the period of the SSB is 160 ms, a quantity of paging occasions or paging frames in the DRX cycle is T/16.

When control information of the paging message indicates that a separate search space exists, the start position of the paging occasion may also be configured separately. The start position of the paging occasion may be configured separately, and a configuration parameter may be configured based on the subcarrier spacing. For example, when one paging frame includes one paging occasion, when the subcarrier spacing is 15 kHz, slot indexes that may be configured include some or all values of 0, 1, 2, 3, 4, 5, 6, 7, and 8, or some or all values of 0, 1, 2, 3, 4, 5, 6, and 7. For example, when one paging frame includes one paging occasion, when the subcarrier spacing is 30 kHz, indexes that may be configured include some or all values of 0, 1, 2, 3, 4, 5, 6, 7, 8, 9, 10, 11, 12, 13, 14, 15, 16, 17, and 18, or some or all values of 0, 1, 2, 3, 4, 5, 6, 7, 8, 9, 10, 11, 12, 13, 14, and 15. For example, when one paging frame includes one paging occasion, when the subcarrier spacing is 60 kHz, indexes that may be configured include some or all values of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39. For example, when one paging frame includes one paging occasion, when the subcarrier spacing is 120 kHz, indexes that may be configured include some or all values of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 50, 61, 62, 63, 64, 65, 66, 67, 68, 69, 70, 71, 72, 73, 74, 75, 76, 77, 78, and 79. For example, when one paging frame includes two paging occasions, when the subcarrier spacing is 15 kHz, indexes that may be configured for the first paging occasion include some or all values of 0, 1, 2, 3, 4, 5, 6, 7, and 8, and indexes that may be configured for the second paging occasion include some or all values of 1, 2, 3, 4, 5, 6, 7, 8, and 9. For example, when one paging frame includes two paging occasions, when the subcarrier spacing is 30 kHz, indexes that may be configured for the first paging occasion include some or all values of 0, 1, 2, 3, 4, 5, 6, 7, 8, 9, 10, 11, 12, 13, 14, 15, 16, 17, and 18, and indexes that may be configured for the second paging occasion include some or all values of 1, 2, 3, 4, 5, 6, 7, 8, 9, 10, 11, 12, 13, 14, 15, 16, 17, 18, 19, or some or all values of 0, 1, 2, 3, 4, 5, 6, 7, 8, 9, 10, 11, 12, 13, 14, and 15. For example, when one paging frame includes two paging occasions, when the subcarrier spacing is 60 kHz, indexes that may be configured for the first paging occasion include some or all values of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, and 38, and indexes that may be configured for the second paging occasion include some or all values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39. For example, when one paging frame includes two paging occasions, when the subcarrier spacing is 120 kHz, indexes that may be configured for the first paging occasion include some or all values of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 50, 61, 62, 63, 64, 65, 66, 67, 68, 69, 70, 71, 72, 73, 74, 75, 76, 77, and 78, and indexes that may be configured for the second paging occasion include some or all values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 50, 61, 62, 63, 64, 65, 66, 67, 68, 69, 70, 71, 72, 73, 74, 75, 76, 77, 78, and 79. For example, when one paging frame includes four paging occasions, when the subcarrier spacing is 15 kHz, indexes that may be configured for the first paging occasion include some or all values of 0, 1, 2, 3, 4, 5, and 6; indexes that may be configured for the second paging occasion include some or all values of 1, 2, 3, 4, 5, 6, and 7; indexes that may be configured for the third paging occasion include some or all values of 2, 3, 4, 5, 6, 7, and 8; and indexes that may be configured for the fourth paging occasion include some or all values of 3, 4, 5, 6, 7, 8, and 9. For example, when one paging frame includes four paging occasions, when the subcarrier spacing is 30 kHz, indexes that may be configured for the first paging occasion include some or all values of 0, 1, 2, 3, 4, 5, 6, 7, 8, 9, 10, 11, 12, 13, 14, 15, and 16; indexes that may be configured for the second paging occasion include some or all values of 1, 2, 3, 4, 5, 6, 7, 8, 9, 10, 11, 12, 13, 14, 15, 16, and 17; indexes that may be configured for the third paging occasion include some or all values of 2, 3, 4, 5, 6, 7, 8, 9, 10, 11, 12, 13, 14, 15, 16, 17, and 18; and indexes that may be configured for the fourth paging occasion include some or all values of 3, 4, 5, 6, 7, 8, 9, 10, 11, 12, 13, 14, 15, 16, 17, 18, and 19, or some or all values of 0, 1, 2, 3, 4, 5, 6, 7, 8, 9, 10, 11, 12, 13, 14, and 15. For example, when one paging frame includes four paging occasions, when the subcarrier spacing is 60 kHz, indexes that may be configured for the first paging occasion include some or all values of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, and 36; indexes that may be configured for the second paging occasion include some or all values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, and 37; indexes that may be configured for the third paging occasion include some or all values of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, and 38; and indexes that may be configured for the fourth paging occasion include some or all values of 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39. For example, when one paging frame includes four paging occasions, when the subcarrier spacing is 120 kHz, indexes that may be configured for the first paging occasion include some or all values of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 50, 61, 62, 63, 64, 65, 66, 67, 68, 69, 70, 71, 72, 73, 74, 75, and 76; indexes that may be configured for the second paging occasion include some or all values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 50, 61, 62, 63, 64, 65, 66, 67, 68, 69, 70, 71, 72, 73, 74, 75, 76, and 77; indexes that may be configured for the third paging occasion include some or all values of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 50, 61, 62, 63, 64, 65, 66, 67, 68, 69, 70, 71, 72, 73, 74, 75, 76, 77, and 78; and indexes that may be configured for the fourth paging occasion include some or all values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 50, 61, 62, 63, 64, 65, 66, 67, 68, 69, 70, 71, 72, 73, 74, 75, 76, 77, 78, and 79. A quantity of paging occasions in a paging frame may be configured, where values that may be configured include 1, 2, 4, and 8, or 1, 2, 4, and 6, or 1, 2, 3, and 4, or 1, 2, 4, 8, and 16, or are some or all values of 0, 1, 2, 3, 4, 6, 7, 8, 9, 10, 11, 12, 13, 14, 15, and 16, or are 1, 2, and 4, or are 1 and 2. A benefit of using 1, 2, and 4, or 1 and 2, or 1, 2, 4, and 8 is that each of them is a numeric value of 2 raised by an exponent, for ease of representation. For example, when there are eight paging occasions, three bits may be used to indicate an index of each PO. A benefit of using 1 and 2 is that a quantity of paging occasions in a frame is relatively small.

Optionally, in other embodiments, the paging position index may directly indicate the time domain position of the target paging occasion in the paging frame. Still using Table 21 as an example, Table 21 shows that an index is set for each group of time domain resources. In other embodiments, an index may be set for a position of each time domain resource. In this way, the terminal device can directly determine the time domain position or start position of the target paging occasion in the paging frame based on the index.

Optionally, in some embodiments, the target paging resource includes position information of the paging frame, and the position information of the paging frame includes a frame number of the paging frame. In this case, that the terminal device determines a target paging resource includes: the terminal device determines the frame number of the paging frame based on a paging frame offset. A unit of the paging frame offset is a frame.

The paging frame offset is related to at least one of the following: the period of the synchronization signal block, the time domain position of the synchronization signal block actually sent by the network device, and the time domain position of the candidate synchronization signal block. The time domain position of the synchronization signal block actually sent by the network device may be one of a system frame number, a subframe, a slot, or a symbol. Similarly, the time domain position of the candidate synchronization signal block may be one of the system frame number, a subframe, a slot, or a symbol.

Optionally, in some embodiments, the paging frame offset may be determined based on the period of the SSB. Specifically, it is assumed that the period of the SSB is S. In this case, a frame in which the SSB is located is SFN mod S=K, where the SFN denotes the frame number of the paging frame, K denotes an index of a frame in which the SSB is located in the period of the SSB, and mod denotes a modulo operation. When S is less than (T div N), the paging frame offset is K; or when S is greater than (T div N), the paging frame offset is S−K. Optionally, in some embodiments, if S is equal to (T div N), the paging frame offset may be K. Optionally, in other embodiments, if S is equal to (T div N), the paging frame offset may be S−K.

Optionally, in some embodiments, the index of the frame in which the SSB is located in the period may be an actual index of the SSB.

Optionally, in some embodiments, the index of the frame in which the SSB is located in the period may also be a reordered index of the SSB.

The actual index is an index of the SSB in the period. For example, an index of an SSB 0 is 0, an index of an SSB 1 is 1, and an index of an SSB 2 is 2. Even if the SSB 0 and the SSB 1 are not sent, the index of the SSB2 is still 2.

The reordered index is an index of the SSB actually sent by the network device. For example, the index of the SSB 0 is 0, the index of the SSB 1 is 1, the index of the SSB 2 is 2, and an index of an SSB 3 is 3. Assuming that the SSB 0 and the SSB 2 are not sent, the index of the SSB 1 is changed to 0, and the index of the SSB 3 is changed to 1.

Optionally, in other embodiments, the paging frame offset may also be determined based on a period of the synchronization signal burst set. In this case, S may indicate the period of the synchronization signal burst set.

Optionally, in other embodiments, the paging frame offset may also be preset, or is indicated by the network device. For example, the network device may send indication information to the terminal device to indicate the paging frame offset. It may be understood that, the paging frame offset may be a positive number, or may be a negative number, or may be 0. The network device may send the indication information to the terminal device in a plurality of manners that can be identified by the terminal device, to indicate the paging frame offset. For example, an absolute value of the offset may be indicated, or a relative value of the offset may be indicated. In an implementation, the network device may indicate a quantity of frames by which the paging frame is offset, or may indicate a quantity of frames by which the paging frame is offset rightward (by how many frames the paging frame lags), or a quantity of frames by which the paging frame is offset leftward (by how many frames the paging frame is advanced).

Optionally, in other embodiments, the paging frame offset may also be determined based on an index a frame in which the synchronization signal burst set is located, in the period of the synchronization signal burst set. For example, the frame in which the synchronization signal burst set is located is SFN mod S=K, where a value of K is an index of the synchronization signal burst set.

Optionally, in some embodiments, that the terminal device determines the frame number of the paging frame based on a paging frame offset includes: the terminal device may determine the frame number of the paging frame based on the discontinuous reception (Discontinuous Reception, DRX) cycle, the quantity of paging occasions in the DRX cycle, identification information of the terminal device, and the paging frame offset. It may be understood that, the paging frame offset is relative, and may be a left offset, or may be a right offset, or is no offset. To be specific, the paging frame offset may be a positive number, a negative number, or 0.

Optionally, in some embodiments, the terminal device determines the frame number of the paging frame based on the following formula:

$$\text{SFN mod } T = (T \text{ div } N)*(UE\_ID \text{ mod } N) + \text{offset} \qquad \text{Formula 1.3}$$

where the SFN denotes the frame number of the paging frame, T denotes the DRX, N=min(T, nB), nB denotes the quantity of paging occasions in the DRX cycle, div denotes a division operation, min denotes an operation of setting a minimum value, UE_ID denotes the identification information of the terminal device, mod denotes a modulo operation, and the offset denotes the paging frame offset.

Optionally, in some implementations, the paging frame offset may be understood as an offset of a to-be-determined paging frame relative to a reference paging frame $SFN_{ref}$. The offset between the reference paging frame $SFN_{ref}$ and the to-be-determined paging frame SFN may be a left offset by one or more frames, or may be a right offset by one or more frames, or is no offset. To be specific, a value of the offset may be a positive integer, or may be a negative integer, or is 0. As can be seen, the frame numbers of the reference paging frame $SFN_{ref}$ and the to-be-determined frame number SFN satisfy: $SFN_{ref}$=SFN+Offset or $SFN_{ref}$=SFN−Offset, or $SFN_{ref}$=SFN.

For example, the terminal device determines the frame number of the paging frame based on the following formula:

$$(\text{SFN}-\text{offset}) \text{mod } T = (T \text{ div } N)*(UE\_ID \text{ mod } N) \qquad \text{Formula 1.4}$$

For another example, the terminal device determines the frame number SFN of the paging frame, where the frame number SFN of the paging frame satisfies:

$$(\text{SFN}+\text{offset}) \text{mod } T = (T \text{ div } N)*(UE\_ID \text{ mod } N).$$

For another example, if the paging frame offset is 0, the terminal device determines the frame number SFN of the paging frame, where the frame number SFN of the paging frame satisfies: SFN mod T=(T div N)*(UE_ID mod N), where the offset denotes the paging frame offset, the SFN indicates the frame number of the paging frame, T denotes the DRX cycle, N=min(T, nB), nB denotes the quantity of paging occasions in the DRX cycle, div denotes a division operation, min denotes an operation of setting a minimum value, UE_ID denotes the identification information of the terminal device, mod denotes a modulo operation, and N denotes a quantity of paging frames in the DRX cycle.

It should be understood that, Formula 1.4 is intended to determine the frame number of the paging frame based on a frame number (SFN) of an initial paging frame and the paging frame offset. Therefore, the frame number of the paging frame can be determined based on the frame number of the initial paging frame and the paging frame offset. It may be understood that, alternatively, the frame number of the paging frame may be determined based on the frame number of the initial paging frame minus the paging frame offset. Whether to add or subtract the paging frame offset depends on whether the paging frame offset is positive or negative. It may be understood that, the frame number SFN, of the reference paging frame satisfies: $SFN_{ref}$ mod T=(T div N)*(UE_ID mod N). The paging frame offset Offset may be a relative value or an absolute value sent by the network device. For example, if the network device sends a relative value of the offset, where the offset is a negative number (for example, −1), (SFN−offset) in Formula 1.4 is actually SFN+ 1, or SNF plus an absolute value of the paging frame offset. Therefore, a variant of Formula 1.4 may be (SFN+offset) mod T=(T div N)*(UE_ID mod N). In this case, the network device may send the absolute value of the offset. Regardless of addition or subtraction, it may be considered that the frame number of the paging frame is determined based on the frame number of the reference paging frame, where the frame number of the reference paging frame is determined based on the frame number of the initial paging frame plus or minus the paging frame offset.

Optionally, in other embodiments, the terminal device may further calculate a frame number SFN 1 of the initial paging frame by using a method for calculating a frame number of a paging frame in an LTE system, and then add the paging frame offset to the SFN 1 to obtain the frame number of the paging frame.

Optionally, when the value of the offset is configured by the base station, the value of the offset may be a positive integer, or may be a negative integer, or may be 0.

The value of the offset may be determined based on the period and/or position of the SSB, or may be determined based on a period of an SMTC. For example, if the period of the SSB is T, the value of the offset may be 0 to T−1, or −T+1 to 0, or −T/2+1 to T/2−1, or −T/2 to T/2, or −T/2−1 to T/2+1. For example, if the period of the SSB is 5 ms or 10 ms, the offset Offset may be 0. For example, if the period of the SSB is 20 ms, the offset may be either or more of 0 and 1, or either or more of −1 and 0, or may be any one or more of −1, 0, and 1. For example, if the period of the SSB is 40 ms, the offset may be any one or more of 0, 1, 2, and 3, or any one or more of −3, −2, −1, and 0, or may be any one or more of −2, −1, 0, 1, and 2, or may be any one or more of −1, 0, and 1. For example, if the period of the SSB is 800 ms, the offset may be any one or more of 0, 1, 2, 3, 4, 5, 6, and 7, or any one or more of −7, −6, −5, −4, −3, −2, −1, and 0, or may be any one or more of −4, −3, −2, −1, 0, 1, 2, 3, and 4, or may be any one or more of −3, −2, −1, 0, 1, 2, and 3. For example, if the period of the SSB is 800 ms, the offset may be any one or more of 0, 1, 2, 3, 4, 5, 6, 7, 8, 9, 10, 11, 12, 13, 14, and 15, or any one or more of −15, −14, −13, −12, −11, −10, −9, −8, −7, −6, −5, −4, −3, −2, −1, and 0, or may be any one or more of −7, −6, −5, −4, −3, −2, −1, 0, 1, 2, 3, 4, 5, 6, and 7, or may be any one or more of −8, −7, −6, −5, −4, −3, −2, −1, 0, 1, 2, 3, 4, 5, 6, 7, and 8. For example, when T is less than or equal to 10 ms, the value of the offset is 0.

The value of the offset may be determined based on the period and/or a position of the SMTC (SS block based RRM measurement timing configuration). For example, if the period of the SMTC is T, the value of the offset may be 0 to T−1, or −T+1 to 0, or −T/2+1 to T/2−1, or −T/2 to T/2, or −T/2−1 to T/2+1. For example, if the period of the SMTC is 5 ms or 10 ms, the offset Offset may be 0. For example, if the period of the SMTC is 20 ms, the offset may be either or more of 0 and 1, or either or more of −1 and 0, or may be any one or more of −1, 0, and 1. For example, if the period of the SMTC is 40 ms, the offset may be any one or more of 0, 1, 2, and 3, or any one or more of −3, −2, −1, and 0, or may be any one or more of −2, −1, 0, 1, and 2, or may be any one or more of −1, 0, and 1. For example, if the period of the SMTC is 80 ms, the offset may be any one or more of 0, 1, 2, 3, 4, 5, 6, and 7, or any one or more of −7, −6, −5, −4, −3, −2, −1, and 0, or may be any one or more of −4, −3, −2, −1, 0, 1, 2, 3, and 4, or may be any one or more of −3, −2, −1, 0, 1, 2, and 3. For example, if the period of the SMTC is 800 ms, the offset may be any one or more of 0, 1, 2, 3, 4, 5, 6, 7, 8, 9, 10, 11, 12, 13, 14, and 15, or any one or more of −15, −14, −13, −12, −11, −10, −9, −8, −7, −6, −5, −4, −3, −2, −1, and 0, or may be any one or more of −7, −6, −5, −4, −3, −2, −1, 0, 0, 2, 3, 4, 5, 6, and 7, or may be any one or more of −8, −7, −6, −5, −4, −3, −2, −1, 0, 1, 2, 3, 4, 5, 6, 7, and 8. For example, when T is less than or equal to 10 ms, the value of the offset is 0. The network device may also indicate or configure that a position of the PF is offset based on the period or position of the SMTC or SSB.

The network device may configure values of N offsets, where a value of each offset may correspond to one PO, or each offset corresponds to one paging frame. The N values may be some or all values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32. A value of N may be configured based on a quantity of POs or a quantity of PFs in the period of the SSB or the period of the SMTC. For example, if the period of the SSB includes only one PO or PF, the value of the offset may be 1 or is not configured. For example, if the period of the SSB or SMTC includes only two POs or PFs, the value of the offset may be 1 or 2 or is not configured. For example, if the period of the SSB or SMTC includes only three POs or PFs, the value of the offset may be 1 or 2 or 3 or is not configured. For example, if the period of the SSB or SMTC includes only four POs or PFs, the value of the offset may be 1 or 2 or 3 or 4 or is not configured. For example, if the period of the SSB or SMTC includes only five POs or PFs, the value of the offset may be 1 or 2 or 3 or 4 or 5 or is not configured. For example, if the period of the SSB or SMTC includes only six POs or PFs, the value of the offset may be 1 or 2 or 3 or 4 or 5 or 6 or is not configured. For example, if the period of the SSB or SMTC includes only seven POs or PFs, the value of the offset may be 1 or 2 or 3 or 4 or 5 or 6 or 7 or is not configured. For example, if the period of the SSB or SMTC includes only eight POs or PFs, the value of the offset may be 1 or 2 or 3 or 4 or 5 or 6 or 7 or 8 or is not configured. For example, if the period of the SSB or SMTC includes only nine POs or PFs, the value of the offset may be 1 or 2 or 3 or 4 or 5 or 6 or 7 or 8 or 9 or is not configured. For example, if the period of the SSB or SMTC includes only to POs or PFs, the value of the offset may be 1 or 2 or 3 or 4 or 5 or 6 or 7 or 8 or 9 or 10 or is not configured. For example, if the period of the SSB or SMTC includes only 11 POs or PFs, the value of the offset may be 1 or 2 or 3 or 4 or 5 or 6 or 7 or 8 or 9 or 10 or 11 or is not configured. For example, if the period of the SSB or SMTC includes only 15 POs or PFs, the value of the offset may be 1 or 2 or 3 or 4 or 5 or 6 or 7 or 8 or 9 or 10 or 11 or 12 or 13 or 14 or 15 or is not configured. For example, if the period of the SSB or SMTC includes only 16 POs or PFs, the value of the offset may be 1 or 2 or 3 or 4 or 5 or 6 or 7 or 8 or 9 or 10 or 11 or 12 or 13 or 14 or 15 or 16 or is not configured. The configured quantity may be the same as the quantity of POs or PFs in the period of the SSB or SMTC.

Alternatively, the value of the offset may be configured based on maximum values of the periods of the SSB and the SMTC. For example, in a configuration method, values that may be configured for the offset are {0, 1, 2, 3, . . . , max(T1, T2)−1}, where T1 denotes the period of the SSB, and T2 denotes the period of the SMTC. Units of T1 and T2 may be frames. For example, when the period of the SSB is 20 ms, and the period of the SMTC is 40 ms, values that may be configured are {0, 1, 2, 3}.

FIG. 3 is a schematic diagram of a paging frame offset according to an embodiment of this application. As shown in FIG. 3, when there is no paging frame offset, frame numbers of frames in which a paging frame 1, a paging frame 2, and a paging frame 3 are located are 0, 4, and 10 respectively. Frame numbers of frames in which an SS frame 1 and an SS frame 2 are located are 3 and 7 respectively. According to the foregoing method, it may be determined that a paging frame offset is 3. In this case, the frame numbers of the frames in which the paging frame 1, the paging frame 2, and the paging frame 3 are located are updated to 3, 7, and 13 respectively. In this case, the paging frame 1 is in time division multiplexing with the SS frame 1, and the paging frame 2 is in time division multiplexing with the SS frame 2.

FIG. 4 is a schematic diagram of another paging frame offset according to an embodiment of this application. As shown in FIG. 4, when there is no paging frame offset, frame numbers of frames in which a paging frame 1, a paging frame 2, a paging frame 3, a paging frame 4, and a paging frame 5 are located are 0, 2, 4, 6, and 8 respectively. Frame numbers of frames in which SS frames are located are 3 and 7 respectively. According to the foregoing method, it may be determined that a paging frame offset is 1. In this case, the frame numbers of the frames in which the paging frame 1, the paging frame 2, the paging frame 3, the paging frame 4, and the paging frame 5 are located are updated to 1, 3, 5, 7, and 9 respectively. The paging frame 2 is in time division multiplexing with an SS frame 1, and the paging frame 4 is in time division multiplexing with an SS frame 2.

FIG. 5 is a schematic diagram of another paging frame offset according to an embodiment of this application. As shown in FIG. 5, when there is no paging frame offset, frame numbers of frames in which a paging frame 1, a paging frame 2, and a paging frame 3 are located are 0, 4, and 8 respectively. Frame numbers of frames in which SS frames are located are 1, 3, 5, 7, 9, and 11 respectively. According to the foregoing method, it may be determined that a paging frame offset is 1. In this case, the frame numbers of the frames in which the paging frame 1, the paging frame 2, and the paging frame 3 are located are 1, 5, and 9 respectively. The paging frame 2 is in time division multiplexing with an SS frame 1, the paging frame 2 is in time division multiplexing with an SS frame 3, and the paging frame 3 is in time division multiplexing with an SS frame 5.

Because a paging frame and an SS frame are multiplexed, a paging message may be in time division multiplexing with an SSB. This can save time domain resources, so that the saved time domain resources can be used to send other messages.

When frequency division multiplexing is performed on a plurality of POs (or DCI of a plurality of POs), the plurality of POs may be POs on which frequency division multiplexing is performed in a plurality of paging frames. When frequency division multiplexing is performed on the POs in the plurality of frames or frequency division multiplexing is performed on the POs in the plurality of frames and SSBs, one paging frame may include a plurality of POs, or one paging frame includes one PO. When one paging frame includes a plurality of POs, frequency division multiplexing is performed on $N_{FDD}$ POs and SSBs. When a value of $N_{FDD}$ is less than a quantity of POs in one frame, frequency division multiplexing may be directly performed on $N_{FDD}$ POs and SSBs; or when a value of $N_{FDD}$ is greater than a quantity of POs in one frame, frequency division multiplexing may be first performed on POs in each of the plurality of paging frames, and then frequency division multiplexing is performed on the POs in the plurality of paging frames. In other words, the plurality of paging frames may be combined into one paging frame, and then some or all of the paging frames are moved to an SSB frame. When one paging frame includes one PO, frequency division multiplexing may be performed on a plurality of POs in a plurality of paging frames, so that the plurality of POs are located in one paging frame. Frequency division multiplexing may continue to be performed on the plurality of POs with SSBs. In this case, a quantity $K_{PO}$ of POs in one paging frame needs to be configured. The network device may configure a quantity of paging frames in frequency division multiplexing, or may configure a quantity of paging frames in frequency division multiplexing with SSBs, or may further configure a quantity of POs in frequency division multiplexing with SSBs, or may configure a quantity of POs in one paging frame. In this case, N in Formula 1.3 and Formula 1.4 denotes a quantity of paging frames, and $nB/K_{PO}$ may be used to calculate the quantity of paging frames.

Finally, a modulo-1024 operation or a modulo-2048 operation may be performed on a value of a system frame number SFN of a paging message that is calculated based on a UE ID, and a system frame number obtained by performing the modulo operation is a frame number of a frame in which the paging message of the UE ID is located. For example, a modulo operation method is ((SFN+/−offset)mod T)mod 1024=(T div N)*(UE_ID mod N). For example, a modulo operation method is SFN 2 mod 1024=SFN 3, where SFN 2=SFN 1+offset, the SFN 2 is SFN 1+offset, and the SFN 1 is a frame number of an initial paging frame that is calculated by using a method for calculating a frame number of a paging frame in an LTE system.

Optionally, in some embodiments, the target paging resource includes the position information of the monitoring window, where the position information of the monitoring window includes a start position of the target monitoring window corresponding to the terminal device in Q monitoring windows, where one paging occasion includes the Q monitoring windows; and that the terminal device determines a target paging resource includes: the terminal device determines the start position of the target monitoring window based on a monitoring window offset.

Optionally, in some embodiments, Q is a positive integer greater than or equal to 2.

Optionally, in other embodiments, Q is a positive integer less than or equal to 2.

Optionally, in some embodiments, duration of each of the Q monitoring windows is the same.

Optionally, in some embodiments, the monitoring window offset may be determined based on a monitoring window index. At least two monitoring windows whose indexes are different correspond to different monitoring window offsets.

One paging frame includes to slots, where a slot 0 to a slot 4 are slots used for downlink transmission, and a slot 5 to a slot 9 are slots used for uplink transmission. The monitoring window starts from the slot 2, and a value of Q is 4. Duration of each monitoring window is one slot. In this way, first three monitoring windows may be located in the slot 2 to the slot 4 respectively, and the last monitoring window needs to be offset by five slots to a next paging frame. In other words, monitoring window offsets of the first three monitoring windows are 0, and a monitoring window offset of the last monitoring window is 5.

Optionally, in some embodiments, time domain resources in a monitoring window are consecutive.

Optionally, in some embodiments, a quantity of time domain resources in a monitoring window may be configured, and may be some or all values of 0.5 slot, one slot, two slots, and four slots. The paging message is related to frequency division multiplexing of the SSB. For example, in frequency division multiplexing, the quantity may be 0.5 slot.

When paging message monitoring windows overlap, control information of a plurality of paging messages sent in one paging message detection window may correspond to different SSBs.

The paging message monitoring windows may overlap. To be specific, one monitoring window is associated with $k_{monitor}$ SSBs, where a coefficient $k_{monitor}$ may be configured, and a value may be any value of 1, 2, 3, 4, 5, 6, 7, and 8.

When a plurality of paging messages are sent in one slot, it may be specified in advance that control information of the paging messages in a paging message detection window may be sent in a time sequence, or may be sent in a frequency sequence.

For example, it may be prescribed in a protocol or indicated by the network device that, control information of the first paging message is sent on the first symbol in the slot, and control information of the second paging message is sent on the second symbol in the slot.

Alternatively, it may be prescribed in a protocol or indicated by the network device that, control information of the first paging message is sent on the second symbol in the slot, and control information of the second paging message is sent on the third symbol in the slot.

Alternatively, it may be prescribed in a protocol or indicated by the network device that, control information of the first paging message is sent on the first symbol in the slot, and control information of the second paging message is sent on the third symbol in the slot.

Alternatively, it may be prescribed in a protocol or indicated by the network device that, control information of the first paging message is sent on the first symbol in the slot, control information of the second paging message is sent on the second symbol in the slot, and control information of the third piece of paging message is sent on the third symbol in the slot.

Alternatively, it may be prescribed in a protocol or indicated by the network device that, control information of the first paging message is sent on the first or second symbol in the slot, and control information of the second paging message is sent on the third symbol in the slot.

Alternatively, it may be prescribed in a protocol or indicated by the network device that, control information of the first paging message is sent on the first symbol in the slot, and control information of the second paging message is sent on the second or third symbol in the slot.

Alternatively, it may be prescribed in a protocol or indicated by the network device that, control information of the first paging message is sent on the first symbol in the slot, and control information of the second paging message is sent on the seventh symbol in the slot.

The network device sends paging messages by using different beams in different monitoring windows. In the target monitoring window, a paging message is sent by using a beam in which the terminal device is located.

Optionally, in some embodiments, that the terminal device determines the start position of the target monitoring window based on a monitoring window offset includes: the terminal device determines the start position of the target monitoring window based on the following formula:

$$M_d = I + \text{window offset} + x * \text{floor}(SSB/w) \quad \text{Formula 1.5}$$

where $M_d$ denotes the start position of the target monitoring window, I denotes a start time of a time domain resource on which the paging occasion is located, the window offset denotes the monitoring window offset, x denotes duration of each of the Q monitoring windows or a time interval between a start time of each monitoring window and a start time of a next monitoring window, the SSB indicates at least one of the following types of information: a time index of a target synchronization signal block having an association relationship with the target monitoring window, a time index of a candidate synchronization signal block having an association relationship with the target monitoring window, and an index of the target monitoring window, w denotes a quantity of synchronization signal blocks associated with the target monitoring window, and the floor denotes a round-down operation. The monitoring window offset may be a time offset of the first one of the Q monitoring windows relative to a reference position. Alternatively, the monitoring window offset may be a sum of a fixed time offset and a time offset of the first one of the Q monitoring windows relative to a reference position. The fixed time offset may be determined based on information configured by the network device. Because the fixed time offset is used, the monitoring windows can be relatively centralized to facilitate detection by the terminal device.

Optionally, in some embodiments, the monitoring window offset is related to an SSB offset.

Optionally, in some embodiments, the target monitoring window is associated with one or more synchronization signal blocks.

The association relationship may be any one of relationships such as a quasi-co-location (Quasi-Co-Location, QCL) relationship, a relationship of having a same beam, and a relationship of having a same antenna port.

Optionally, in some embodiments, if a value of w is 1, variants of Formula 1.5 may be the following formulas:

$$M_d = I + \text{window offset} + x * SSB \quad \text{Formula 1.6}$$

$$M_d = I + \text{window offset} + \text{floor}(x * SSB) \quad \text{Formula 1.7}$$

$$M_d = I\text{window offset} + \text{floor}(x * SSB) \quad \text{Formula 1.7}$$

The Iwindow offset denotes a start position of a PO. The Iwindow offset may include two parts: for example, Iwindow offset=Iwindow offset 1+Iwindow offset 2, where the first part Iwindow offset 1 may be a time domain position or slot position of a PDCCH of a paging message corresponding to an SS/PBCH block index 0 or the Iwindow offset 1 is a time domain start position of a PDCCH of a paging message corresponding to an SS/PBCH block index i−1. The second part Iwindow offset 2 may include offsets of time domain positions or slot positions of PDCCHs of paging messages corresponding to different SSB indexes relative to positions of SSBs, or is a quantity of uplink slots between the time domain start position of the PDCCH of the paging message corresponding to the SS/PBCH block index i−1 and a time domain start position of the PDCCH of the paging message corresponding to the SS/PBCH block index i, or is a quantity of slots that cannot be used for transmitting a paging message. The offset may be caused by an index of an SSB or may be caused by an uplink/downlink collision. For example, a manner of determining the Iwindow offset 2 is $K_{DU,P} * N_{UP,T}$, where $K_{DU,P}$ is a quantity of slots between a start position of a PO and a slot or time domain resource of the paging message corresponding to the SS/PBCH block index i, $N_{UP,T}$ is a quantity of uplink slots in an downlink-to-uplink switch-point periodicity, a method for calculating $K_{DU,P}$ is floor(floor($x*i$)/$N_{P,slot,T}$), $N_{UP,T}$ is a quantity of uplink slots in the downlink-to-uplink switch-point periodicity or a quantity of slots that cannot be used for transmitting a paging message, and $N_{P,slot,T}$ is a quantity of downlink and/or flexible slots in the downlink-to-uplink switch-point periodicity or a quantity of sots that can be used for transmitting a paging message.

In Formula 1.6, a meaning of each term is the same as that in Formula 1.5. Details are not described herein again.

Optionally, in some embodiments, before the terminal device determines the start position of the target monitoring window based on the monitoring window offset, the method further includes: the terminal device determines that the target monitoring window is located in the $$\left\lceil \frac{Q_d}{Q_{max}} \right\rceil_{th}$$

paging frame, where $Q_{max}$ denotes a maximum quantity of monitoring windows included in a paging frame, and ⌈ ⌉ denotes a round-up operation.

Optionally, in some embodiments, $Q_{max}$ is determined based on at least one of duration of each of the Q monitoring windows, a quantity of synchronization signal blocks, a quantity of paging messages, and a subcarrier spacing.

Optionally, in other embodiments, $Q_{max}$ is a preset value.

Optionally, in other embodiments, $Q_{max}$ is determined based on an indication of the network device.

Optionally, in some embodiments, time domain resources occupied by the Q monitoring windows are consecutive time domain resources or inconsecutive time domain resources. The inconsecutive time domain resources belong to a segment of consecutive time domain resources, and in the segment of consecutive time domain resources, other time domain resources than the time domain resources occupied by the Q monitoring windows have been determined for transmitting information other than the paging message.

Optionally, in some embodiments, a time domain position of each monitoring window may be the same as a slot position of an SSB having an association relationship with the monitoring window. Duration of each monitoring window is the same. A unit of the duration of each monitoring window may be a slot.

Optionally, in some embodiments, identification information of paging messages in at least any two of the N paging occasions is different, where the identification information may be paging-radio network temporary identifiers (Paging-Radio Network Temporary Identifier P-RNTI) or random access preambles.

Optionally, in some embodiments, when a plurality of P-RNTIs exist, the plurality of P-RNTIs may be used to distinguish between paging messages of different POs, or used to distinguish between paging messages of different terminal device groups. A quantity of the plurality of P-RNTIs may be any numeric value of 2, 4, 8, 16, 32, and 64. The terminal device or the network device may select a quantity of P-RNTIs based on at least one of a period of a random access channel occasion, duration of a frame, and a period of a synchronization signal burst set within duration of the DRX cycle. The quantity of the plurality of P-RNTIs may also be configured by the network device.

When the P-RNTIs are used to distinguish between different POs, the P-RNTIs may be related to PO indexes. To be specific, a P-RNTI of a PO whose index is i is P-RNTI0+i, where P-RNTI0 denotes an initial P-RNTI, and i denotes the index of the PO. For example, if a P-RNTI of the PO 0 is P-RNTI0, a P-RNTI of the PO 1 is P-RNTI0+1, a P-RNTI of the PO 2 is P-RNTI0+2, and a P-RNTI of the PO 3 is P-RNTI0+3. The first PO (that is, the PO whose index is 0) may be a PO in a system frame, or may be the first PO in frequency division multiplexing. When the terminal device detects DCI of different POs, P-RNTI values may be used to distinguish between different POs. When the P-RNTIs are used to distinguish between different SSBs, the P-RNTIs may be related to the SSBs. Similarly, a P-RNTI of an SSB whose index is i is P-RNTI0+1, where P-RNTI0 denotes an initial P-RNTI, and i denotes the index of the SSB. For example, if a P-RNTI of the SSB 0 is P-RNTI0, a P-RNTI of the SSB 1 is P-RNTI0+1, a P-RNTI of the SSB 2 is P-RNTI0+2, and a P-RNTI of the SSB 3 is P-RNTI0+3. When the terminal device detects DCI of different SSBs, P-RNTI values may be used to distinguish between different SSBs.

When a plurality of random access preambles are used to distinguish between different POs, index values and a quantity of random access preambles used for a paging message may be related to PO indexes. For example, a random access preamble of the PO whose index is i is i*N to (i+1)*N−1. For example, a random access preamble of the PO 0 is 0 to N−1, a random access preamble of the PO 1 is N to 2N−1, a random access preamble of the PO 2 is 2N to 3N−1, and a random access preamble of the PO 3 is 3N to 4N−1. Alternatively, random access preambles of different POs are inconsecutive, and may be i+K (0 to N−1), where K denotes a quantity of POs. For example, a random access preamble of the PO 0 is 0, K, 2K, . . . , K(N−1); a random access preamble of the PO 1 is i, K+1, 2K+1, . . . , K(N−1)+1; a random access preamble of the PO 2 is 2, K+2, 2K+2, . . . , K(N−1)+2; and a random access preamble of the PO 3 is 3, K+3, 2K+3, . . . , K(N−1)+3. By detecting the random access preambles of different POs, the network device may distinguish between information received within different POs. A quantity of random access preambles used for a paging message may be $K*N_{preamble}$, where K denotes a quantity of POs in a period of a random access channel occasion (Random Access Channel Occasion, RO), and $N_{preamble}$ denotes a quantity of random access preambles used for a paging message. A value of $N_{preamble}$ may be a positive integer greater than or equal to 1. When the value of $N_{preamble}$ is a positive integer greater than 1, the value of $N_{preamble}$ may be related to a group of terminal devices. A quantity of a plurality of random access preambles may be a multiple of a quantity of random access preambles used for paging in an RO. For example, the multiple is any value of 2, 4, 8, 16, 32, and 64. The network device or the terminal device may select a quantity of random access preambles based on at least one of the following: a period of a random access channel occasion, duration of a frame, a period of a synchronization signal burst set in the DRX cycle, a quantity of SSBs, a random access preamble format, a random access preamble length, a carrier frequency of a random access preamble, a frequency band of a random access preamble, a quantity of ROs in a slot, a quantity of downlink signals on a random access resource in a slot, a quantity of corresponding random access response messages in a slot, a quantity of paging occasions in the DRX cycle, a quantity of random access preambles in an RO, a quantity of ROs associated with a downlink signal, a total quantity of random access preambles or resources associated with a downlink signal, a quantity of actually sent downlink signals, duration of an RO, a subcarrier spacing, a bandwidth, a frame structure, a service type, a start time of a random access preamble, duration of the random access preamble, an end time of the random access preamble, time domain position information of a random access response window corresponding to the random access preamble, frequency domain position information of the random access response window corresponding to the random access preamble, an index of the random access preamble, an index of the paging message, an index of a paging user group corresponding to the random access preamble, a time-frequency resource index corresponding to the random access preamble, a synchronization signal block index corresponding to the random access preamble, a total quantity of paging messages, a total quantity of random access channel occasions, a quantity of paging user groups, a quantity of paging messages, a quantity of random access preambles associated with a paging message, a quantity of POs, and duration of the DRX cycle. The quantity may be configured by the network device, or may not be configured but is obtained through calculation based on related parameters. For example, the quantity is calculated based on the quantity of POs in the DRX cycle and the period of the random access channel occasion jointly.

Optionally, in some embodiments, before the terminal device receives the target paging message on the target paging resource, the method further includes: the terminal device receives a paging indication sent by the network device, where the paging indication is used to indicate that the network device will send the target paging message.

The network device may send a system update indication, an ETWS indication, and a CMAS indication together with the paging indication. The system update indication may include one bit, used to indicate whether system information changes. When the terminal device receives the system update indication, the terminal device determines, based on content of the system update indication, whether the system information needs to be updated. The system update indication may also be a plurality of bits, and the system update indication of the plurality of bits is used to indicate which type of system information is updated. For example, 00100 indicates that a system information block 3 is updated.

Optionally, in some embodiments, the method further includes: the terminal device receives time domain unit indication information sent by the network device, where the time domain unit indication information is used to indicate a quantity of time domain units included in the paging frame.

Optionally, in some embodiments, the time domain unit indication information may include the subcarrier spacing. In this way, the terminal device can determine, based on the subcarrier spacing, the quantity of time domain units included in the paging frame.

For example, the subcarrier spacing may be configured on a PBCH, and may be configured by using an index of an SSB and a half-frame indication. For example, in a case of a low frequency (lower than 6 GHz), one bit in the index of the SSB may be used to indicate whether the subcarrier spacing is 15 kHz or 30 kHz; or in a case of a high frequency (higher than 6 GHz), the half-frame indication may be used to indicate whether the subcarrier spacing is 60 kHz or 120 kHz.

Optionally, in other embodiments, the time domain unit indication information may be the quantity of time domain units included in the paging frame.

FIG. 6 is a schematic flowchart of another method for transmitting a paging message according to an embodiment of this application.

601. A network device determines a paging resource, where the paging resource includes at least one of the following types of information: position information of N paging occasions, position information of a paging frame, and position information of a monitoring window.

602. The network device sends a paging message on the paging resource to a terminal device.

Optionally, in some embodiments, the paging resource includes the position information of the N paging occasions, and the N paging occasions are located on M time domain resources, where N is a positive integer greater than or equal to 1, M is a positive integer greater than or equal to 1 and less than or equal to N, and a position of each of the M time domain resources in the paging frame is related to at least one of a subcarrier spacing, a time domain position of a synchronization signal block actually sent by the network device, and a time domain position of a candidate synchronization signal block.

Optionally, in some embodiments, that the network device determines a paging resource includes: the network device determines the position of each of the M time domain resources in the paging frame based on a value of M.

Optionally, in other embodiments, a time domain position or start position of each of the M time domain resources in the paging frame includes: when M is equal to 1, time domain positions or start positions of the M time domain resources in the paging frame are at least one of the following time domain units: time domain unit 0 in the paging frame, time domain unit $K_1/2$ in the paging frame, a time domain unit for sending a synchronization signal block in the paging frame by the network device, and a time domain unit next to a time domain unit for sending a last synchronization signal block in the paging frame by the network device, where $K_1$ is a positive integer and can be exactly divided by 2; when M is equal to 2, a time domain position or start position of the first one of the M time domain resources in the paging frame is time domain unit 0 in the paging frame, and a time domain position or start position of the second one of the M time domain resources in the paging frame is time domain unit $K_2/2$ in the paging frame, where $K_2$ is a positive integer that is greater than 2 and can be exactly divided by 2; when M is equal to 4, a time domain position or start position of the first one of the M time domain resources in the paging frame is time domain unit 0 in the paging frame, a time domain position or start position of the second one of the M time domain resources in the paging frame is time domain unit $K_2/4$ in the paging frame, a time domain position or start position of the third one of the M time domain resources in the paging frame is time domain unit $K_2/2$ in the paging frame, and a time domain position or start position of the fourth one of the M time domain resources is time domain unit $3 \times K_2/4$ in the paging frame; or when M is equal to 4 and the paging frame includes 10 time domain units, a time domain position or start position of the first one of the M time domain resources in the paging frame is time domain unit 0 in the paging frame, a time domain position or start position of the second one of the M time domain resources in the paging frame is time domain unit 3 in the paging frame, a time domain position or start position of the third one of the M time domain resources in the paging frame is time domain unit 5 in the paging frame, and a time domain position or start position of the fourth one of the M time domain resources is time domain unit 8 in the paging frame.

A specific implementation in which the network device determines the position of each of the M time domain resources in the paging frame based on the value of M is similar to the specific implementation in which the terminal device determines the position of each of the M time domain resources in the paging frame based on the value of M. A difference lies in that the terminal device only needs to determine the time domain position or start position of the time domain resource on which the target paging occasion is located in the M time domain resources in the paging frame, but the network device needs to determine the time domain position or start position of each of the M time domain resources in the paging frame. For the specific implementation in which the network device determines the time domain position and start position of each time domain resource in the paging frame, refer to the embodiment shown in FIG. 2. Details are not described herein again.

Optionally, in some embodiments, the network device sends paging position information to the terminal device, where the paging position information is used to indicate time domain positions of the M time domain resources in the paging frame.

For specific content of the paging position information sent by the network device, refer to the embodiment shown in FIG. 2. Details are not described herein again.

Optionally, in some embodiments, the target paging resource includes the position information of the paging frame, and the position information of the paging frame includes a frame number of the paging frame; and that the network device determines a target paging resource includes: the network device determines the frame number of the paging frame based on a paging frame offset. A specific implementation in which the network device determines the frame number of the paging frame based on the paging frame offset is the same as the specific implementation in which the terminal device determines the frame number of the paging frame based on the paging frame offset. Details are not described herein again.

Optionally, in some embodiments, the paging frame offset is related to at least one of the following: a period of a synchronization signal block, the time domain position of the synchronization signal block actually sent by the network device, and the time domain position of the candidate synchronization signal block.

Similarly, the paging frame offset is determined based on the period of the synchronization signal block.

Similarly, the network device may determine the frame number of the paging frame based on a discontinuous reception DRX cycle, a quantity of paging occasions included in the DRX cycle, identification information of the terminal device, and the paging frame offset.

Optionally, in some embodiments, the paging resource includes the position information of the monitoring window, and the position information of the monitoring window includes a start position of each of Q monitoring windows, where one paging occasion includes the Q monitoring windows, and Q is a positive integer greater than or equal to 1; and that the network device determines a target paging resource includes: the network device determines the start position of each of the Q monitoring windows based on a monitoring window offset.

A specific implementation in which the network device determines the start position of the monitoring window based on the monitoring window offset is similar to the specific implementation in which the terminal device determines the start position of the target monitoring window based on the monitoring window offset. A difference lies in that the terminal device only needs to determine the start position of the target monitoring window, but the network device needs to determine the start position of each monitoring window. Details are not described herein again.

Similarly, before the network device determines the start position of the monitoring window based on the monitoring window offset, the method further includes: the network device determines that the $q^{th}$ monitoring window in the Q monitoring windows is located in the $$\left\lceil \frac{q}{Q_{max}} \right\rceil_{th}$$

paging frame, where $Q_{max}$ denotes a maximum quantity of monitoring windows included in a paging frame, $\lceil\ \rceil$ denotes a round-up operation, and $q=1, \ldots, Q$.

Similarly, $Q_{max}$ is determined based on at least one of duration of each of the Q monitoring windows, a quantity of synchronization signal blocks, a quantity of paging messages, and the subcarrier spacing; or $Q_{max}$ is a preset value.

Optionally, in some embodiments, the network device may also indicate the $Q_{max}$ to the terminal device, so that the terminal device determines the position of the target monitoring window based on the $Q_{max}$.

Similarly, time domain resources occupied by the Q monitoring windows are consecutive time domain resources or inconsecutive time domain resources. The inconsecutive time domain resources belong to a segment of consecutive time domain resources, and in the segment of consecutive time domain resources, other time domain resources than the time domain resources occupied by the Q monitoring windows have been determined for transmitting information other than the paging message.

The network device may use different beams in different monitoring windows in the Q monitoring windows to send paging messages to terminal devices in the beams. For example, assuming that Q is equal to 3, the network device may use a beam 1 in the first monitoring window to send a paging message to a terminal device in a range of the beam 1; the network device may use a beam 2 in the second monitoring window to send a paging message to a terminal device in a range of the beam 2; and the network device may use a beam 3 in the third monitoring window to send a paging message to a terminal device in a range of the beam 3.

Figure 7:
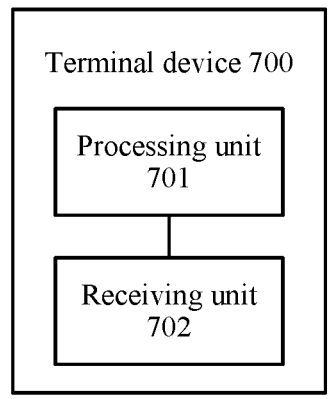
FIG. 7 is a structural block diagram of a terminal device according to an embodiment of this application.

FIG. 7 is a structural block diagram of a terminal device according to an embodiment of this application. As shown in FIG. 7, the terminal device 700 includes a processing unit 701 and a receiving unit 702.

The processing unit 701 is configured to determine a target paging resource, where the target paging resource includes at least one of the following types of information: position information of a target paging occasion, position information of a target paging frame, and position information of a target monitoring window.

The receiving unit 702 is configured to receive a target paging message on the target paging resource, where the target paging message is a paging message sent by a network device to the terminal device 700.

For specific functions and beneficial effects of the processing unit 701 and the receiving unit 702, refer to the embodiment shown in FIG. 2. Details are not described herein again.

The processing unit 701 may be implemented by a processor, and the receiving unit 702 may be implemented by a receiver.

Figure 8:
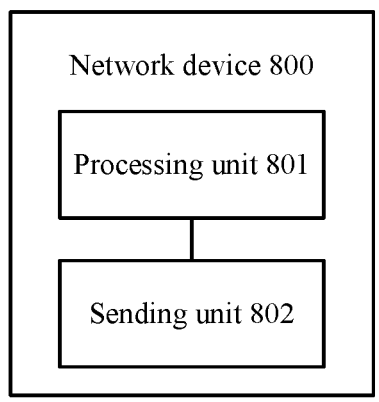
FIG. 8 is a structural block diagram of a network device according to an embodiment of this application.

FIG. 8 is a structural block diagram of a network device according to an embodiment of this application. As shown in FIG. 8, the network device 800 includes a processing unit 801 and a sending unit 802.

The processing unit 801 is configured to determine a paging resource, where the paging resource includes at least one of the following types of information: position information of N paging occasions, position information of a paging frame, and position information of a monitoring window.

The sending unit 802 is configured to send a paging message on the paging resource to a terminal device.

For specific functions and beneficial effects of the processing unit 801 and the sending unit 802, refer to the embodiments shown in FIG. 2 and FIG. 3. Details are not described herein again.

The processing unit 801 may be implemented by a processor, and the sending unit 802 may be implemented by a transmitter.

Figure 9:
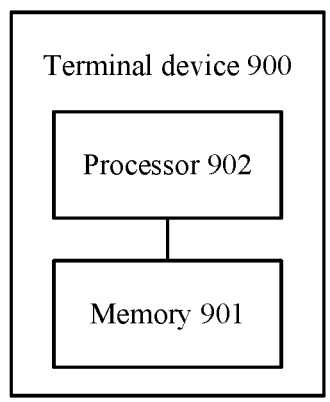
FIG. 9 is a structural block diagram of another terminal device according to an embodiment of this application.

FIG. 9 is a structural block diagram of another terminal device according to an embodiment of this application. The terminal device 900 shown in FIG. 9 includes a memory 901 and a processor 902.

The memory 901 is configured to store a program.

The processor 902 is configured to execute the program stored in the memory 901, so that when the program is executed, the terminal device goo can implement the method provided in the embodiment shown in FIG. 2.

The terminal device goo may be configured to implement a part or an entirety of the method shown in FIG. 2, by using software.

The memory 901 may be a physically independent unit, or may be integrated with the processor 902.

Optionally, when the part or the entirety of the method shown in FIG. 2 is implemented by using software, the terminal device goo may include only the processor 902. The memory 901 configured to store the program is located outside the terminal device 900. The processor 902 is connected to the memory 901 by using a circuit/wire, and is configured to read and execute the program stored in the memory 901.

The processor 902 may be a central processing unit (central processing unit, CPU), a network processor (network processor, NP), or a combination of a CPU and an NP.

The processor 902 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 901 may include a volatile memory (volatile memory), for example, a random access memory (random-access memory, RAM). The memory 901 may also include a non-volatile memory (non-volatile memory), for example, a flash memory (flash memory), a hard disk drive (hard disk drive, HDD), or a solid-state drive (solid-state drive, SSD). The memory 901 may further include a combination of the foregoing types of memories.

Figure 10:
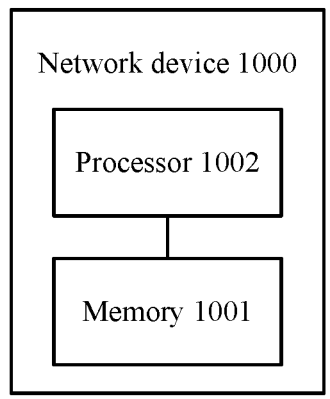
FIG. 10 is a structural block diagram of another network device according to an embodiment of this application.

FIG. 10 is a structural block diagram of another network device according to an embodiment of this application. The network device 1000 shown in FIG. to includes a memory 1001 and a processor 1002.

The memory 1001 is configured to store a program.

The processor 1002 is configured to execute the program stored in the memory 1001, so that when the program is executed, the network device 1000 can implement the method provided in the embodiment shown in FIG. 6.

The network device 1000 may be configured to implement a part or an entirety of the method shown in FIG. 6, by using software.

The memory 1001 may be a physically independent unit, or may be integrated with the processor 1002.

Optionally, when the part or the entirety of the method shown in FIG. 6 is implemented by using software, the network device 1000 may include only the processor 1002. The memory 1001 configured to store the program is located outside the network device 1000. The processor 1002 is connected to the memory 1001 by using a circuit/wire, and is configured to read and execute the program stored in the memory 1001.

The processor 1002 may be a central processing unit (central processing unit, CPU), a network processor (network processor, NP), or a combination of a CPU and an NP.

The processor 1002 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 1001 may include a volatile memory (volatile memory), for example, a random access memory (random-access memory, RAM). The memory 1001 may also include a non-volatile memory (non-volatile memory), for example, a flash memory (flash memory), a hard disk drive (hard disk drive, HDD), or a solid-state drive (solid-state drive, SSD). The memory 1001 may further include a combination of the foregoing types of memories.

Another aspect of this application provides a computer-readable storage medium, where the computer-readable storage medium stores an instruction, and when the instruction is run on a computer, the computer is enabled to perform the method shown in FIG. 2.

Another aspect of this application provides a computer program product including an instruction. When the computer program product is run on a computer, the computer is enabled to perform the method shown in FIG. 2.

Another aspect of this application provides a computer-readable storage medium. The computer-readable storage medium stores an instruction, and when the instruction is run on a computer, the computer is enabled to perform the method shown in FIG. 6.

Another aspect of this application provides a computer program product including an instruction. When the computer program product is run on a computer, the computer is enabled to perform the method shown in FIG. 6.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined, or may be integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes one or more instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a terminal device, a paging resource, wherein determining the paging resource comprises determining a frame number of a paging frame, wherein the frame number of the paging frame satisfies a relation as follows:
   (SFN−offset) mod T=(T div N)*(UE_ID mod N); or
   (SFN+offset) mod T=(T div N)*(UE_ID mod N),
   wherein the offset is a paging frame offset, the SFN is the frame number of the paging frame, T is a length of a discontinuous reception (DRX) cycle, N is a quantity of paging frames in the DRX cycle, UE_ID is identification information of the terminal device, and mod denotes a modulo operation; and
   receiving, by the terminal device, a paging message on the paging resource.

2. The method according to claim 1, wherein determining the paging resource further comprises determining a start position of a paging occasion, and wherein the start position of the paging occasion is related to a subcarrier spacing.

3. The method according to claim 2, wherein:
   there is one paging occasion in the paging frame; and
   wherein:
   for a subcarrier spacing of 15 kHz, a start position of the one paging occasion in the paging frame is slot 0, slot 2, slot 5, or slot 7; or
   for a subcarrier spacing 30 kHz, a start position of the one paging occasion in the paging frame is slot 0, slot 4, slot 10, or slot 14; or
   for a subcarrier spacing of 60 kHz, a start position of the one paging occasion in the paging frame is slot 0, slot 10, slot 20, or slot 30; or
   for a subcarrier spacing of 120 kHz, a start position of the paging occasion in the paging frame is slot 0, slot 20, slot 40, or slot 60.

4. The method according to claim 1, wherein determining the paging resource further comprises determining a start position of a paging occasion, and wherein there are two paging occasions in the paging frame, and time domain resources of the two paging occasions are consecutive.

5. The method according to claim 4, wherein start positions of the two paging occasions in the paging frame satisfy a relation as follows:
   $PO_{i\_s} = O + i\_s \times Length\_PO$,
   wherein $PO_{i\_S}$ is a start position of a paging occasion whose index is i_s in the paging frame, O is a start position of a first paging occasion in the paging frame, and Length_PO is a quantity of time domain units of one paging occasion.

6. The method according to claim 1, further comprising:
   receiving, by the terminal device, a system information block 1 (SIB1) carrying the paging frame offset.

7. A method, comprising:
   determining, by a network device, a paging resource, wherein determining the paging resource comprises determining a frame number of a paging frame, wherein the frame number of the paging frame satisfies a relation as follows:
   (SFN−offset) mod T=(T div N)*(UE_TD mod N); or
   (SFN+offset) mod T=(T div N)*(UE_TD mod N):
   wherein the offset is a paging frame offset, the SFN is the frame number of the paging frame, T is a length of a discontinuous reception (DRX) cycle, N is a quantity of paging frames in the DRX cycle, UE_ID is identification information of a terminal device, and mod is a modulo operation; and
   sending, by the network device, a paging message on the paging resource.

8. The method according to claim 7, wherein determining the paging resource further comprises determining a start position of a paging occasion, and wherein the start position of the paging occasion is related to a subcarrier spacing.

9. The method according to claim 8, wherein:
   there is one paging occasion in the paging frame; and
   wherein:
   for a subcarrier spacing of 15 kHz, a start position of the one paging occasion in the paging frame is slot 0, slot 2, slot 5, or slot 7; or
   for a subcarrier spacing 30 kHz, a start position of the one paging occasion in the paging frame is slot 0, slot 4, slot 10, or slot 14; or for a subcarrier spacing of 60 kHz, a start position of the one paging occasion in the paging frame is slot 0, slot 10, slot 20, or slot 30; or for a subcarrier spacing of 120 kHz, a start position of the paging occasion in the paging frame is slot 0, slot 20, slot 40, or slot 60.

10. The method according to claim 7, wherein determining the paging resource further comprises determining a start position of a paging occasion, and wherein there are two paging occasions in the paging frame, and time domain resources of the two paging occasions are consecutive.

11. The method according to claim 10, wherein start positions of the two paging occasions in the paging frame satisfy a relation as follows:

$PO_{i\_s}=O+i\_s\times Length\_PO$, wherein $PO_{i\_s}$ is a start position of a paging occasion whose index is i_s in the paging frame, O is a start position of a first paging occasion in the paging frame, and Length_PO is a quantity of time domain units of one paging occasion.

12. An apparatus, comprising:
a processor; and
a non-transitory computer-readable storage medium storing a program to be executed by the processor, the program including instructions for:
determine a paging resource, wherein determining the paging resource comprises determining a frame number of a paging frame, wherein the frame number of the paging frame satisfies a relation as follows:
(SFN−offset) mod T=(T div N)*(UE_TD mod N); or
(SFN+offset) mod T=(T div N)*(UE_TD mod N);
wherein the offset is a paging frame offset, the SFN is the frame number of the paging frame, T is a length of a discontinuous reception (DRX) cycle, N is a quantity of paging frames in the DRX cycle, UE_ID is identification information of the apparatus, and mod is a modulo operation; and
a receiver, configured to receive a paging message on the paging resource.

13. The apparatus according to claim 12, wherein determining the paging resource further comprises determining a start position of a paging occasion, and wherein the start position of the paging occasion is related to a subcarrier spacing.

14. The apparatus according to claim 13, wherein:
there is one paging occasion in the paging frame; and
wherein:
for a subcarrier spacing of 15 kHz, a start position of the one paging occasion in the paging frame is slot 0, slot 2, slot 5, or slot 7; or
for a subcarrier spacing 30 kHz, a start position of the one paging occasion in the paging frame is slot 0, slot 4, slot 10, or slot 14; or
for a subcarrier spacing of 60 kHz, a start position of the one paging occasion in the paging frame is slot 0, slot 10, slot 20, or slot 30; or
for a subcarrier spacing of 120 kHz, a start position of the one paging occasion in the paging frame is slot 0, slot 20, slot 40, or slot 60.

15. The apparatus according to claim 14, wherein determining the paging resource further comprises determining a start position of a paging occasion, and wherein there are two paging occasions in the paging frame, and time domain resources of the two paging occasions are consecutive.

16. The apparatus according to claim 15, wherein start positions of the two paging occasions in the paging frame satisfy a relation as follows:

$PO_{i\_s}=O+i\_s\times Length\_PO$, wherein $PO_{i\_s}$ is a start position of a paging occasion whose index is i_s in the paging frame, O is a start position of a first paging occasion in the paging frame, and Length_PO is a quantity of time domain units of one paging occasion.

17. The apparatus according to claim 12, wherein the receiver is further configured to receive a system information block 1 (SIB1) carrying the paging frame offset.

18. An apparatus, comprising:
a processor; and
a non-transitory computer-readable storage medium storing a program to be executed by the processor, the program including instructions for:
determining a paging resource, wherein determining the paging resource comprises determining a frame number of a paging frame, wherein the frame number of the paging frame satisfies a relation as follows:
(SFN−offset) mod T=(T div N)*(UE_TD mod N); or
(SFN+offset) mod T=(T div N)*(UE_TD mod N);
wherein the offset is a paging frame offset, the SFN is the frame number of the paging frame, T is a length of a discontinuous reception (DRX) cycle, N is a quantity of paging frames in the DRX cycle, UE_ID is identification information of the apparatus, and mod is a modulo operation; and
a transmitter, configured to send a paging message on the paging resource.

19. The apparatus according to claim 18, wherein the paging resource further comprises a start position of a paging occasion, and wherein the start position of the paging occasion is related to a subcarrier spacing.

20. The apparatus according to claim 19, wherein:
there is one paging occasion in the paging frame; and
wherein:
for a subcarrier spacing of 15 kHz, a start position of the one paging occasion in the paging frame is slot 0, slot 2, slot 5, or slot 7; or
for a subcarrier spacing 30 kHz, a start position of the one paging occasion in the paging frame is slot 0, slot 4, slot 10, or slot 14; or
for a subcarrier spacing of 60 kHz, a start position of the one paging occasion in the paging frame is slot 0, slot 10, slot 20, or slot 30; or
for a subcarrier spacing of 120 kHz, a start position of the one paging occasion in the paging frame is slot 0, slot 20, slot 40, or slot 60.

21. The apparatus according to claim 18, wherein the paging resource further comprises a start position of a paging occasion, and wherein there are two paging occasions in the paging frame, and time domain resources of the two paging occasions are consecutive.

22. The apparatus according to claim 21, wherein start positions of the two paging occasions in the paging frame satisfy a relation as follows:

$PO_{i\_s}=O+i\_s\times Length\_PO$, wherein $PO_{i\_s}$ is a start position of a paging occasion whose index is i_s in the paging frame, O is a start position of a first paging occasion in the paging frame, and Length_PO is a quantity of time domain units of one paging occasion.

23. The apparatus according to claim 18, wherein the transmitter is further configured to send a system information block 1 (SIB1) carrying the paging frame offset.

24. A non-transitory computer-readable storage medium, wherein the non-transitory computer-readable storage medium stores an instruction, and when the instruction is run on a computer, the computer is caused to:

determine a paging resource, wherein determining the paging resource comprises determining a frame number of a paging frame, wherein the frame number of the paging frame satisfies a relation as follows:

(SFN−offset) mod T=(T div N)*(UE_TD mod N); or
(SFN+offset) mod T=(T div N)*(UE_TD mod N), wherein the offset is a paging frame offset, the SFN is the frame number of the paging frame, T is a length of a discontinuous (DRX) cycle, N is a quantity of paging frames in the DRX cycle, UE_ID is identification information of a terminal device, and mod denotes a modulo operation; and receive a paging message on the paging resource.

25. A non-transitory computer-readable storage medium, wherein the non-transitory computer-readable storage medium stores an instruction, and when the instruction is run on a computer, the computer is caused to:

determine a paging resource, wherein determining the paging resource comprises: determining a frame number of a paging frame, wherein the frame number of the paging frame satisfies a relation as follows:

(SFN−offset) mod T=(T div N)*(UE_TD mod N); or
(SFN+offset) mod T=(T div N)*(UE_TD mod N), wherein the offset is a paging frame offset, the SFN is the frame number of the paging frame, T is a length of a discontinuous reception (DRX) cycle, N is a quantity of paging frames in the DRX cycle, UE_ID is identification information of a terminal device, and mod denotes a modulo operation; and send a paging message on the paging resource.

* * * * *

UNITED STATES PATENT AND TRADEMARK OFFICE
CERTIFICATE OF CORRECTION

PATENT NO. : 11,503,565 B2
APPLICATION NO. : 16/875626
DATED : November 15, 2022
INVENTOR(S) : Kuandong Gao Page 1 of 3

It is certified that error appears in the above-identified patent and that said Letters Patent is hereby corrected as shown below:

In the Specification

In the Detailed Description of Illustrative Embodiments, Column 12, Line 30; delete "slot to" and insert --slot 10--.

In the Detailed Description of Illustrative Embodiments, Column 13, Line 58; delete "slot to" and insert --slot 10--.

In the Detailed Description of Illustrative Embodiments, Column 15, Line 6; delete "1010001" and insert --10100011--.

In the Detailed Description of Illustrative Embodiments, Column 15, Line 11; delete "110100110100011" and insert --1101100110100011--.

In the Detailed Description of Illustrative Embodiments, Column 16, Line 31; delete "slot to" and insert --slot 10--.

In the Detailed Description of Illustrative Embodiments, Column 18, Line 35; delete "100" and insert --10--.

In the Detailed Description of Illustrative Embodiments, Column 18, Line 42; delete "100" and insert --10--.

In the Detailed Description of Illustrative Embodiments, Column 19, Line 39; delete "to" and insert --10--.

In the Detailed Description of Illustrative Embodiments, Column 19, Line 46; delete "to" and insert --10--.

In the Detailed Description of Illustrative Embodiments, Column 19, Line 56; delete "to" and insert Signed and Sealed this
Twenty-seventh Day of December, 2022

Katherine Kelly Vidal
*Director of the United States Patent and Trademark Office*

--10--.

In the Detailed Description of Illustrative Embodiments, Column 20, Line 29; delete "to" and insert --10--.

In the Detailed Description of Illustrative Embodiments, Column 20, Line 46; delete "to" and insert --10--.

In the Detailed Description of Illustrative Embodiments, Column 23, Line 64; delete "to" and insert --10--.

In the Detailed Description of Illustrative Embodiments, Column 26, Line 39; delete "to" and insert --10--.

In the Detailed Description of Illustrative Embodiments, Column 27, Line 58; delete "1200" and insert --120--.

In the Detailed Description of Illustrative Embodiments, Column 33, Line 19; delete "to" and insert --10--.

In the Detailed Description of Illustrative Embodiments, Column 33, Line 30; delete "1200" and insert --120--.

In the Detailed Description of Illustrative Embodiments, Column 33, Line 62; delete "to" and insert --10--.

In the Detailed Description of Illustrative Embodiments, Column 38, Line 47; delete "0" and insert --01--.

In the Detailed Description of Illustrative Embodiments, Column 38, Line 49; delete "to" and insert --10--.

In the Detailed Description of Illustrative Embodiments, Column 40, Line 61; delete "1200" and insert --120--.

In the Detailed Description of Illustrative Embodiments, Column 42, Line 4; delete "to" and insert --10--.

In the Detailed Description of Illustrative Embodiments, Column 42, Line 18; delete "to" and insert --10--.

In the Detailed Description of Illustrative Embodiments, Column 42, Line 24; delete "800" and insert --80--.

In the Detailed Description of Illustrative Embodiments, Column 47, Line 34; delete "800" and insert --80--.

CERTIFICATE OF CORRECTION (continued)
U.S. Pat. No. 11,503,565 B2

In the Detailed Description of Illustrative Embodiments, Column 47, Line 39; delete "800" and insert --80--.

In the Detailed Description of Illustrative Embodiments, Column 47, Line 66; delete "800" and insert --80--.

In the Detailed Description of Illustrative Embodiments, Column 48, Line 3; delete "0, 0" and insert --0, 1--.

In the Detailed Description of Illustrative Embodiments, Column 48, Line 40; delete "to" and insert --10--.

In the Detailed Description of Illustrative Embodiments, Column 50, Line 51; delete "to" and insert --10--.

In the Detailed Description of Illustrative Embodiments, Column 54, Line 9; delete "P-RNT10+1" and insert --P-RNT10+i--.

In the Detailed Description of Illustrative Embodiments, Column 59, Line 24; delete "goo" and insert --900--.

In the Detailed Description of Illustrative Embodiments, Column 59, Line 26; delete "goo" and insert --900--.

In the Detailed Description of Illustrative Embodiments, Column 59, Line 33; delete "goo" and insert --900--.

In the Detailed Description of Illustrative Embodiments, Column 59, Line 61; delete "to" and insert --10--.

In the Claims

Claim 3, Column 62, Line 13; insert --of-- between "spacing" and "30".

Claim 9, Column 62, Line 65; insert --of-- between "spacing" and "30".

Claim 12, Column 63, Line 31; insert --and-- after ";".

Claim 14, Column 63, Line 51; insert --of-- between "spacing" and "30".

Claim 18, Column 64, Line 19; insert --and-- after ";".

Claim 20, Column 64, Line 38; insert --of-- between "spacing" and "30".